United States Patent
Leitch et al.

(10) Patent No.: US 11,774,143 B2
(45) Date of Patent: Oct. 3, 2023

(54) RAIL ASSEMBLY WITH INVERTIBLE SIDE-MOUNT ADAPTER FOR DIRECT AND INDIRECT MOUNTING APPLICATIONS

(71) Applicant: RMH TECH LLC, Colorado Springs, CO (US)

(72) Inventors: Paul Benjamin Leitch, Colorado Springs, CO (US); Dustin M. M. Haddock, Colorado Springs, CO (US); Nikolaus Jo Holley, Colorado Springs, CO (US)

(73) Assignee: RMH TECH LLC, Colorado Springs, CO (US)

( * ) Notice: Subject to any disclaimer, the term of this patent is extended or adjusted under 35 U.S.C. 154(b) by 431 days.

(21) Appl. No.: 16/754,519

(22) PCT Filed: Oct. 9, 2018

(86) PCT No.: PCT/US2018/055062
§ 371 (c)(1),
(2) Date: Apr. 8, 2020

(87) PCT Pub. No.: WO2019/074956
PCT Pub. Date: Apr. 18, 2019

(65) Prior Publication Data
US 2020/0340712 A1    Oct. 29, 2020

Related U.S. Application Data

(60) Provisional application No. 62/570,053, filed on Oct. 9, 2017.

(51) Int. Cl.
*F24S 25/33* (2018.01)
*F24S 25/615* (2018.01)
(Continued)

(52) U.S. Cl.
CPC ............ *F24S 25/33* (2018.05); *F24S 25/615* (2018.05); *F24S 25/65* (2018.05);
(Continued)

(58) Field of Classification Search
CPC .......... F24S 25/33; F24S 25/65; F24S 25/615; F24S 2025/6007; F24S 2025/801; F24S 2025/807
(Continued)

(56) References Cited

U.S. PATENT DOCUMENTS 42,992 A   5/1864  Howe
97,316 A   11/1869 Rogers
(Continued)

FOREIGN PATENT DOCUMENTS

AT   13076   8/1903
AT   26329   11/1906
(Continued)

OTHER PUBLICATIONS

Notice of Acceptance for Australia Patent Application No. 2018348090, dated Nov. 9, 2021 3 pages.
(Continued)

*Primary Examiner* — Brian D Mattei
*Assistant Examiner* — Joseph J. Sadlon
(74) *Attorney, Agent, or Firm* — Sheridan Ross P.C.

(57) ABSTRACT

A rail assembly (530) includes a rail (540) and an adapter (640). The adapter (640) may be slidably interconnected with the rail (540) via a first rail channel (604a) on a first rail side (600a) of the rail (540), and may also be slidably interconnected with the rail (540) via a second rail channel (604b) on a second rail side (600b) of the rail (540). The adapter (640) may be inverted (whether installed via the first rail channel (604a) or the second rail channel (604b)) between two different orientations that dispose a mounting (Continued)

flange (670) at different elevations to accommodate two different mounting configurations.

20 Claims, 34 Drawing Sheets

(51) Int. Cl.
*F24S 25/65* (2018.01)
*F24S 25/60* (2018.01)
*F24S 25/00* (2018.01)

(52) U.S. Cl.
CPC .......... *F24S 2025/6003* (2018.05); *F24S 2025/6007* (2018.05); *F24S 2025/801* (2018.05); *F24S 2025/807* (2018.05)

(58) Field of Classification Search
USPC ....................................................... 52/173.3
See application file for complete search history.

(56) References Cited

U.S. PATENT DOCUMENTS

| | | |
|---|---|---|
| 106,580 A | 8/1870 | Hathorn |
| 189,431 A | 4/1877 | Creighton |
| 224,608 A | 2/1880 | Rendle |
| 250,580 A | 12/1881 | Rogers |
| 332,413 A | 12/1885 | List |
| 386,316 A | 7/1888 | Hawthorne |
| 405,605 A | 6/1889 | Sagendorph |
| 407,772 A | 7/1889 | Curtis et al. |
| 446,217 A | 2/1891 | Dickelman |
| 459,876 A | 9/1891 | Powers |
| 472,014 A | 3/1892 | Densmore |
| 473,512 A | 4/1892 | Laird |
| 491,173 A | 2/1893 | Hayward |
| 507,776 A | 10/1893 | Berger et al. |
| 529,774 A | 11/1894 | Baird |
| 602,983 A | 4/1898 | Folsom |
| 733,697 A | 7/1903 | Chronik |
| 756,884 A | 4/1904 | Parry |
| 831,445 A | 9/1906 | Kosmatka |
| 881,757 A | 3/1908 | Winsor |
| 884,850 A | 4/1908 | Peter |
| 927,522 A | 7/1909 | Gery |
| 933,784 A | 9/1909 | Peter |
| 939,516 A | 11/1909 | Laird |
| 1,054,091 A | 2/1913 | Darnall |
| 1,085,474 A | 1/1914 | Peterson |
| 1,136,460 A | 4/1915 | Wright |
| 1,230,363 A | 6/1917 | Baird |
| 1,279,669 A | 9/1918 | Deming |
| 1,330,309 A | 2/1920 | Dixon |
| 1,399,461 A | 12/1921 | Childs |
| 1,463,065 A | 7/1923 | Sieger |
| 1,465,042 A | 8/1923 | Hruska |
| 1,477,088 A | 12/1923 | Turner |
| 1,511,529 A | 10/1924 | Standlee |
| 1,620,428 A | 3/1927 | Becker |
| 1,735,927 A | 11/1929 | Shaffer |
| 1,735,937 A | 11/1929 | Shaffer |
| 1,893,481 A | 1/1933 | Adams |
| 1,946,862 A | 2/1934 | Koch, Jr. |
| 1,957,933 A | 5/1934 | Brandl |
| 2,079,768 A | 5/1937 | Levow |
| 2,150,497 A | 3/1939 | Fernberg |
| 2,183,008 A | 12/1939 | Camp |
| 2,183,844 A | 12/1939 | Murphy |
| 2,192,720 A | 3/1940 | Tapman |
| 2,201,320 A | 5/1940 | Place |
| 2,250,401 A | 7/1941 | Sylvester |
| 2,274,010 A | 2/1942 | Stellin |
| 2,340,692 A | 2/1944 | Ridd |
| 2,429,833 A | 10/1947 | Luce |
| 2,443,362 A | 6/1948 | Tinnerman |
| 2,448,752 A | 9/1948 | Wagner |
| 2,457,250 A | 12/1948 | Macomber |
| 2,472,586 A | 6/1949 | Harvey |
| 2,504,776 A | 4/1950 | Woodfield et al. |
| 2,525,217 A | 10/1950 | Glitsch |
| 2,574,007 A | 11/1951 | Anderson |
| 2,658,247 A | 11/1953 | Heuer |
| 2,714,037 A | 7/1955 | Singer et al. |
| 2,730,381 A | 1/1956 | Curtiss |
| 2,740,027 A | 3/1956 | Budd et al. |
| 2,808,491 A | 10/1957 | Rhee et al. |
| 2,810,173 A | 10/1957 | Bearden |
| 2,875,805 A | 3/1959 | Flora |
| 2,985,174 A | 5/1961 | Guth |
| 3,039,161 A | 6/1962 | Gagnon |
| 3,064,772 A | 11/1962 | Clay |
| 3,095,672 A | 7/1963 | Di Tullio |
| 3,112,016 A | 11/1963 | Peterson |
| 3,136,206 A | 6/1964 | Adams |
| 3,194,524 A | 7/1965 | Trumbull |
| 3,221,467 A | 12/1965 | Henkels |
| 3,231,076 A | 1/1966 | Frieman |
| 3,232,393 A | 2/1966 | Attwood |
| 3,232,573 A | 2/1966 | Berman |
| 3,242,620 A | 3/1966 | Kaiser |
| 3,247,316 A | 4/1966 | Weimer, Jr. |
| 3,288,409 A | 11/1966 | Bethea, Jr. |
| 3,296,750 A | 1/1967 | Zaleski |
| 3,298,653 A | 1/1967 | Omholt |
| 3,301,513 A | 1/1967 | Masao |
| 3,307,235 A | 3/1967 | Hennings |
| 3,318,057 A | 5/1967 | Norsworthy |
| 3,333,799 A | 8/1967 | Peterson |
| 3,335,995 A | 8/1967 | Pickles |
| 3,341,909 A | 9/1967 | Havener |
| 3,363,864 A | 1/1968 | Olgreen |
| 3,394,524 A | 7/1968 | Howarth |
| 3,425,127 A | 2/1969 | Long |
| 3,482,369 A | 12/1969 | Burke |
| 3,495,363 A | 2/1970 | Johnson |
| 3,496,691 A | 2/1970 | Seaburg et al. |
| 3,503,244 A | 3/1970 | Joslin |
| 3,523,709 A | 8/1970 | Heggy et al. |
| 3,527,619 A | 9/1970 | Miley |
| 3,565,380 A | 2/1971 | Langren |
| 3,572,623 A | 3/1971 | Lapp |
| 3,590,543 A | 7/1971 | Heirich |
| 3,656,747 A | 4/1972 | Revell, Jr. et al. |
| 3,667,182 A | 6/1972 | Stemler |
| 3,667,185 A | 6/1972 | Maurer |
| 3,715,705 A | 2/1973 | Kuo |
| 3,719,919 A | 3/1973 | Tibolla |
| 3,753,326 A | 8/1973 | Kaufman, Sr. |
| 3,778,537 A | 12/1973 | Miller |
| 3,792,560 A | 2/1974 | Naylor |
| 3,809,799 A | 5/1974 | Taylor |
| 3,810,069 A | 5/1974 | Jaconette, Jr. |
| 3,817,270 A | 6/1974 | Ehrens et al. |
| 3,824,664 A | 7/1974 | Seeff |
| 3,845,601 A | 11/1974 | Kostecky |
| 3,861,098 A | 1/1975 | Schaub |
| 3,904,161 A | 9/1975 | Scott |
| 3,914,001 A | 10/1975 | Nelson et al. |
| 3,921,253 A | 11/1975 | Nelson |
| 3,960,352 A | 6/1976 | Plattner et al. |
| 3,986,746 A | 10/1976 | Chartier |
| 3,998,018 A | 12/1976 | Hodges |
| 4,001,474 A | 1/1977 | Hereth |
| 4,007,574 A | 2/1977 | Riddell |
| 4,018,538 A | 4/1977 | Smyrni et al. |
| 4,034,532 A | 7/1977 | Reinwall, Jr. |
| 4,051,289 A | 9/1977 | Adamson |
| 4,127,975 A | 12/1978 | Judkins |
| 4,130,970 A | 12/1978 | Cable |
| 4,141,182 A | 2/1979 | McMullen |
| 4,147,257 A | 4/1979 | Zippel |
| 4,162,595 A | 7/1979 | Ramos et al. |
| 4,162,755 A | 7/1979 | Bott |
| 4,189,882 A | 2/1980 | Harrison et al. |

(56) References Cited

U.S. PATENT DOCUMENTS

| | | |
|---|---|---|
| 4,189,891 A | 2/1980 | Johnson et al. |
| 4,200,107 A | 4/1980 | Reid |
| 4,203,646 A | 5/1980 | Desso et al. |
| 4,215,677 A | 8/1980 | Erickson |
| 4,223,053 A | 9/1980 | Brogan |
| 4,252,458 A | 2/1981 | Keen |
| 4,261,338 A | 4/1981 | McAlister |
| 4,261,384 A | 4/1981 | Dahlbring |
| 4,263,474 A | 4/1981 | Tennant |
| 4,270,721 A | 6/1981 | Mainor, Jr. |
| 4,291,934 A | 9/1981 | Kund |
| 4,307,976 A | 12/1981 | Butler |
| 4,321,416 A | 3/1982 | Tennant |
| 4,351,140 A | 9/1982 | Simpson |
| 4,366,656 A | 1/1983 | Simpson |
| 4,393,859 A | 7/1983 | Marossy et al. |
| 4,449,335 A | 5/1984 | Fahey |
| 4,456,321 A | 6/1984 | Jones et al. |
| 4,461,514 A | 7/1984 | Schwarz |
| 4,467,582 A | 8/1984 | Hague |
| 4,475,776 A | 10/1984 | Teramachi |
| 4,546,586 A | 10/1985 | Knudson |
| 4,560,224 A | 12/1985 | Weisenburger |
| 4,567,706 A | 2/1986 | Wendt |
| 4,570,405 A | 2/1986 | Knudson |
| 4,588,240 A | 5/1986 | Ruehl et al. |
| 4,593,877 A | 6/1986 | van der Wyk |
| 4,601,600 A | 7/1986 | Karlsson |
| 4,656,794 A | 4/1987 | Thevenin et al. |
| 4,666,116 A | 5/1987 | Lloyd |
| 4,669,808 A | 6/1987 | Owen |
| 4,674,252 A | 6/1987 | Nicholas et al. |
| 4,682,454 A | 7/1987 | Simpson |
| 4,686,809 A | 8/1987 | Skelton |
| 4,701,586 A | 10/1987 | Hagberg |
| 4,704,058 A | 11/1987 | Crunwell |
| 4,753,425 A | 6/1988 | Yang |
| 4,773,791 A | 9/1988 | Hartkorn |
| 4,782,642 A | 11/1988 | Conville |
| 4,799,444 A | 1/1989 | Lisowski |
| 4,805,364 A | 2/1989 | Smolik |
| 4,809,476 A | 3/1989 | Satchell |
| 4,810,573 A | 3/1989 | Harriett |
| 4,835,927 A | 6/1989 | Michlovic |
| 4,840,529 A | 6/1989 | Phillips |
| 4,848,858 A | 7/1989 | Suzuki |
| 4,854,096 A | 8/1989 | Smolik |
| 4,864,081 A | 9/1989 | Bates |
| 4,878,331 A | 11/1989 | Taylor |
| 4,895,338 A | 1/1990 | Froutzis |
| 4,901,963 A | 2/1990 | Yoder |
| 4,905,444 A | 3/1990 | Semaan |
| 4,909,011 A | 3/1990 | Freeman et al. |
| 4,949,929 A | 8/1990 | Kesselman et al. |
| 4,961,712 A | 10/1990 | Schwenk et al. |
| 4,970,833 A | 11/1990 | Porter |
| 4,987,699 A | 1/1991 | Gold |
| 4,991,368 A | 2/1991 | Amstutz |
| 4,993,959 A | 2/1991 | Randolph |
| 5,007,612 A | 4/1991 | Manfre |
| 5,019,111 A | 5/1991 | Dempsey et al. |
| 5,036,949 A | 8/1991 | Crocker et al. |
| 5,039,352 A | 8/1991 | Mueller |
| 5,092,939 A | 3/1992 | Nath et al. |
| 5,094,435 A | 3/1992 | Depperman |
| 5,118,571 A | 6/1992 | Petersen |
| 5,119,612 A | 6/1992 | Taylor et al. |
| 5,125,608 A | 6/1992 | McMaster et al. |
| 5,127,205 A | 7/1992 | Eidson |
| 5,138,820 A | 8/1992 | Pearce |
| 5,140,793 A | 8/1992 | Knudson |
| 5,152,107 A | 10/1992 | Strickert |
| 5,154,385 A * | 10/1992 | Lindberg ............ A47B 57/562 248/245 |
| 5,164,020 A | 11/1992 | Wagner et al. |
| 5,176,462 A | 1/1993 | Chen |
| 5,187,911 A | 2/1993 | Cotter |
| 5,209,619 A * | 5/1993 | Rinderer ............ F16B 37/045 411/85 |
| 5,213,300 A | 5/1993 | Rees |
| 5,222,340 A | 6/1993 | Bellem |
| 5,224,427 A | 7/1993 | Riches et al. |
| 5,228,248 A | 7/1993 | Haddock |
| 5,251,993 A | 10/1993 | Sigourney |
| 5,268,038 A | 12/1993 | Riermeier et al. |
| 5,271,194 A | 12/1993 | Drew |
| 5,277,006 A | 1/1994 | Ruster |
| 5,282,340 A | 2/1994 | Cline et al. |
| 5,287,670 A | 2/1994 | Funaki |
| 5,290,366 A | 3/1994 | Riermeier et al. |
| 5,307,601 A | 5/1994 | McCracken |
| 5,312,079 A | 5/1994 | Little, Jr. |
| 5,313,752 A | 5/1994 | Hatzinikolas |
| D347,701 S | 6/1994 | McCracken |
| 5,352,154 A | 10/1994 | Rotter et al. |
| 5,356,519 A | 10/1994 | Grabscheid et al. |
| 5,356,705 A | 10/1994 | Kelch et al. |
| D351,989 S | 11/1994 | Cline et al. |
| 5,363,615 A * | 11/1994 | Christopher .......... E04B 1/0046 52/204.593 |
| 5,363,624 A | 11/1994 | Cotter |
| 5,379,567 A | 1/1995 | Vahey |
| 5,390,453 A | 2/1995 | Untiedt |
| 5,391,084 A | 2/1995 | Kreitzman |
| 5,392,574 A | 2/1995 | Sayers |
| 5,408,797 A | 4/1995 | Bellem |
| 5,409,549 A | 4/1995 | Mori |
| 5,413,063 A | 5/1995 | King |
| 5,413,397 A | 5/1995 | Gold |
| 5,417,028 A | 5/1995 | Meyer |
| 5,425,209 A | 6/1995 | Funaki |
| 5,426,906 A | 6/1995 | McCracken |
| 5,439,307 A | 8/1995 | Steinhilber |
| 5,453,027 A | 9/1995 | Buell et al. |
| D364,338 S | 11/1995 | Cline |
| 5,479,752 A | 1/1996 | Menegoli |
| 5,482,234 A | 1/1996 | Lyon |
| 5,483,772 A | 1/1996 | Haddock |
| 5,483,782 A | 1/1996 | Hall |
| 5,491,931 A | 2/1996 | Haddock |
| 5,497,591 A | 3/1996 | Nelson |
| 5,522,185 A | 6/1996 | Cline |
| 5,533,839 A | 7/1996 | Shimada |
| D372,421 S | 8/1996 | Cline |
| 5,557,903 A | 9/1996 | Haddock |
| 5,571,338 A | 11/1996 | Kadonome et al. |
| 5,596,858 A | 1/1997 | Jordan |
| 5,596,859 A | 1/1997 | Horton et al. |
| 5,598,785 A | 2/1997 | Zaguroli, Jr. |
| 5,600,971 A | 2/1997 | Suk |
| D378,343 S | 3/1997 | Macor |
| 5,609,326 A | 3/1997 | Stearns et al. |
| 5,613,328 A | 3/1997 | Alley |
| 5,640,812 A | 6/1997 | Crowley et al. |
| 5,647,178 A | 7/1997 | Cline |
| 5,660,008 A | 8/1997 | Bevilacqua |
| 5,664,750 A | 9/1997 | Cohen |
| 5,667,181 A | 9/1997 | van Leeuwen et al. |
| 5,681,191 A | 10/1997 | Robicheau et al. |
| 5,688,131 A | 11/1997 | Byfield, Jr. |
| D387,443 S | 12/1997 | Blankenbiller |
| 5,694,721 A | 12/1997 | Haddock |
| 5,697,197 A | 12/1997 | Simpson |
| 5,715,640 A | 2/1998 | Haddock |
| 5,732,513 A | 3/1998 | Alley |
| 5,743,063 A | 4/1998 | Boozer |
| 5,743,497 A | 4/1998 | Michael |
| 5,746,029 A | 5/1998 | Ullman |
| 5,755,824 A | 5/1998 | Blechschmidt et al. |
| 5,765,310 A | 6/1998 | Gold |
| 5,765,329 A | 6/1998 | Huang |
| 5,787,653 A | 8/1998 | Sakai et al. |
| 5,794,386 A | 8/1998 | Klein |
| 5,809,703 A | 9/1998 | Kelly |

(56) References Cited

U.S. PATENT DOCUMENTS

| | | |
|---|---|---|
| 5,826,379 A | 10/1998 | Curry |
| 5,826,390 A | 10/1998 | Sacks |
| 5,828,008 A | 10/1998 | Lockwood et al. |
| 5,829,723 A | 11/1998 | Brunner et al. |
| 5,842,318 A | 12/1998 | Bass et al. |
| 5,853,296 A | 12/1998 | Gunther et al. |
| 5,885,118 A | 3/1999 | Billenstein et al. |
| 5,890,340 A | 4/1999 | Kafarowski |
| 5,897,088 A | 4/1999 | Kirschner |
| 5,901,507 A | 5/1999 | Smeja et al. |
| 5,942,046 A | 8/1999 | Kahlfuss et al. |
| 5,970,586 A | 10/1999 | Demel et al. |
| 5,983,588 A | 11/1999 | Haddock |
| 5,987,714 A | 11/1999 | Smith |
| 5,994,640 A | 11/1999 | Bansemir et al. |
| 5,997,368 A | 12/1999 | Mello et al. |
| 6,029,415 A | 2/2000 | Culpepper et al. |
| 6,073,410 A | 6/2000 | Schimpf et al. |
| 6,073,920 A | 6/2000 | Colley |
| 6,079,678 A | 6/2000 | Schott et al. |
| 6,083,010 A | 7/2000 | Daoud |
| 6,088,979 A | 7/2000 | Neal |
| 6,095,462 A | 8/2000 | Morgan |
| 6,099,203 A | 8/2000 | Landes |
| 6,105,317 A | 8/2000 | Tomiuchi et al. |
| 6,106,310 A | 8/2000 | Davis et al. |
| 6,111,189 A | 8/2000 | Garvison et al. |
| 6,119,317 A | 9/2000 | Pfister |
| 6,132,070 A | 10/2000 | Vosika et al. |
| 6,158,180 A | 12/2000 | Edwards |
| 6,164,033 A | 12/2000 | Haddock |
| 6,182,403 B1 | 2/2001 | Mimura et al. |
| 6,186,799 B1 | 2/2001 | Mello |
| 6,206,991 B1 | 3/2001 | Starr |
| 6,223,477 B1 | 5/2001 | Alley |
| 6,237,297 B1 | 5/2001 | Paroly |
| 6,253,496 B1 | 7/2001 | Gilchrist |
| 6,256,934 B1 | 7/2001 | Alley |
| 6,269,596 B1 | 8/2001 | Ohtsuka et al. |
| 6,276,285 B1 | 8/2001 | Ruch |
| 6,312,283 B1 | 11/2001 | Hio |
| 6,320,114 B1 | 11/2001 | Kuechler |
| 6,336,616 B1 | 1/2002 | Lin |
| 6,360,491 B1 | 3/2002 | Ullman |
| 6,364,262 B1 | 4/2002 | Gibson et al. |
| 6,364,374 B1 | 4/2002 | Noone et al. |
| 6,370,828 B1 | 4/2002 | Genschorek |
| 6,382,569 B1 | 5/2002 | Schattner et al. |
| 6,385,914 B2 | 5/2002 | Alley |
| 6,393,796 B1 | 5/2002 | Goettl et al. |
| 6,443,680 B1 | 9/2002 | Bodin |
| 6,453,623 B1 | 9/2002 | Nelson et al. |
| 6,470,629 B1 | 10/2002 | Haddock |
| 6,497,080 B1 | 12/2002 | Malcolm |
| 6,499,259 B1 | 12/2002 | Hockman |
| 6,508,442 B1 | 1/2003 | Dolez |
| 6,521,821 B2 | 2/2003 | Makita et al. |
| 6,534,702 B1 | 3/2003 | Makita et al. |
| 6,536,166 B1 | 3/2003 | Alley |
| 6,536,729 B1 | 3/2003 | Haddock |
| 6,576,830 B2 | 6/2003 | Nagao et al. |
| 6,602,016 B2 | 8/2003 | Eckart et al. |
| 6,622,441 B2 | 9/2003 | Miller |
| 6,637,671 B2 | 10/2003 | Alley |
| 6,647,671 B1 | 11/2003 | Alley |
| 6,655,633 B1 | 12/2003 | Chapman, Jr. |
| 6,665,991 B2 | 12/2003 | Hasan |
| 6,688,047 B1 | 2/2004 | McNichol |
| D487,595 S | 3/2004 | Sherman |
| 6,715,256 B1 | 4/2004 | Fischer |
| 6,718,718 B2 | 4/2004 | Haddock |
| 6,725,623 B1 | 4/2004 | Riddell et al. |
| 6,730,841 B2 | 5/2004 | Heckeroth |
| 6,732,982 B1 | 5/2004 | Messinger |
| 6,751,919 B2 | 6/2004 | Calixto |
| D495,595 S | 9/2004 | Dressier |
| D496,738 S | 9/2004 | Sherman |
| 6,799,742 B2 | 10/2004 | Nakamura et al. |
| 6,834,466 B2 | 12/2004 | Trevorrow et al. |
| 6,918,217 B2 | 7/2005 | Jakob-Bamberg et al. |
| 6,918,727 B2 | 7/2005 | Huang |
| 6,922,948 B2 | 8/2005 | Smeja et al. |
| 6,967,278 B2 | 11/2005 | Hatsukaiwa et al. |
| 7,012,188 B2 | 3/2006 | Erling |
| 7,013,612 B2 | 3/2006 | Haddock |
| 7,063,763 B2 | 6/2006 | Chapman, Jr. |
| 7,100,338 B2 | 9/2006 | Haddock |
| 7,104,020 B1 | 9/2006 | Suttle |
| 7,127,852 B1 | 10/2006 | Dressier |
| 7,191,794 B2 | 3/2007 | Hodges |
| 7,195,513 B1 | 3/2007 | Gherardini |
| 7,219,863 B1 | 5/2007 | Collett, II |
| 7,240,770 B2 | 7/2007 | Mullins et al. |
| 7,260,918 B2 | 8/2007 | Liebendorfer |
| 7,281,695 B2 | 10/2007 | Jordan |
| 7,386,922 B2 | 6/2008 | Taylor et al. |
| 7,406,924 B1 | 8/2008 | Impey |
| 7,410,139 B1 | 8/2008 | Rorich |
| 7,431,252 B2 | 10/2008 | Birli et al. |
| 7,435,134 B2 | 10/2008 | Lenox |
| 7,451,573 B2 | 11/2008 | Orszulak et al. |
| 7,458,555 B2 | 12/2008 | Mastropaolo et al. |
| 7,459,196 B2 | 12/2008 | Sturm |
| 7,469,511 B2 | 12/2008 | Wobber |
| 7,493,730 B2 | 2/2009 | Fennell, Jr. |
| 7,513,080 B1 | 4/2009 | Showalter |
| 7,516,580 B2 | 4/2009 | Fennell, Jr. |
| 7,568,871 B2 | 8/2009 | Chopp, Jr. et al. |
| 7,578,711 B2 | 8/2009 | Robinson |
| 7,600,349 B2 | 10/2009 | Liebendorfer |
| 7,658,356 B1 | 2/2010 | Nehls |
| 7,686,625 B1 | 3/2010 | Dyer et al. |
| 7,703,256 B2 | 4/2010 | Haddock |
| 7,707,800 B2 | 5/2010 | Kannisto |
| 7,712,278 B2 | 5/2010 | Lonardi |
| 7,721,492 B2 | 5/2010 | Plaisted et al. |
| 7,731,138 B2 | 6/2010 | Wiesner et al. |
| 7,733,667 B2 | 6/2010 | Qin et al. |
| 7,758,003 B2 | 7/2010 | Pourtier et al. |
| 7,758,011 B2 | 7/2010 | Haddock |
| 7,762,027 B1 | 7/2010 | Wentworth et al. |
| 7,766,292 B2 | 8/2010 | Liebendorfer |
| 7,780,472 B2 | 8/2010 | Lenox |
| 7,788,874 B2 | 9/2010 | Miller |
| 7,788,879 B2 | 9/2010 | Brandes et al. |
| 7,824,191 B1 | 11/2010 | Browder |
| 7,827,920 B2 | 11/2010 | Beck et al. |
| 7,845,127 B2 | 12/2010 | Brescia |
| 7,847,181 B2 | 12/2010 | Brescia |
| 7,861,480 B2 | 1/2011 | Wendelburg et al. |
| 7,861,485 B1 | 1/2011 | Wentworth et al. |
| 7,874,117 B1 | 1/2011 | Simpson |
| 7,891,618 B2 | 2/2011 | Carnevali |
| 7,895,808 B1 | 3/2011 | Wentworth et al. |
| 7,905,064 B1 | 3/2011 | Wentworth et al. |
| 7,915,519 B2 | 3/2011 | Kobayashi |
| 7,926,777 B2 | 4/2011 | Koesema, Jr. |
| 7,954,287 B2 | 6/2011 | Bravo et al. |
| 7,976,257 B2 * | 7/2011 | Kufner .................. F24S 25/35 411/277 |
| 7,988,464 B2 | 8/2011 | Kossak et al. |
| 8,011,153 B2 | 9/2011 | Orchard |
| 8,066,200 B2 | 11/2011 | Hepner et al. |
| 8,070,119 B2 | 12/2011 | Taylor |
| 8,092,129 B2 | 1/2012 | Wiley et al. |
| 8,096,503 B2 | 1/2012 | Verweyen |
| D653,940 S | 2/2012 | Yasher |
| 8,109,048 B2 | 2/2012 | West |
| 8,146,299 B2 | 4/2012 | Stearns et al. |
| 8,151,522 B2 | 4/2012 | Stearns et al. |
| 8,153,700 B2 | 4/2012 | Stearns et al. |
| D658,977 S | 5/2012 | Riddell et al. |
| 8,226,061 B2 | 7/2012 | Nehls |
| 8,251,326 B2 | 8/2012 | McPheeters |

(56) References Cited

U.S. PATENT DOCUMENTS

| | | | |
|---|---|---|---|
| 8,272,172 | B2 | 9/2012 | Li |
| 8,294,026 | B2 | 10/2012 | Wang et al. |
| 8,312,678 | B1 | 11/2012 | Haddock |
| 8,316,590 | B2 | 11/2012 | Cusson |
| 8,316,621 | B2 | 11/2012 | Safari Kermanshahi et al. |
| D674,513 | S | 1/2013 | Liu |
| 8,344,239 | B2 | 1/2013 | Plaisted |
| 8,347,572 | B2 | 1/2013 | Piedmont |
| 8,375,654 | B1 | 2/2013 | West et al. |
| 8,387,319 | B1 | 3/2013 | Gilles-Gagnon et al. |
| 8,404,963 | B2 | 3/2013 | Kobayashi |
| 8,407,895 | B2 | 4/2013 | Hartelius et al. |
| 8,413,946 | B2 | 4/2013 | Hartelius et al. |
| 8,424,821 | B2 | 4/2013 | Liu |
| 8,430,372 | B2 | 4/2013 | Haddock |
| 8,448,405 | B2 | 5/2013 | Schaefer et al. |
| 8,453,986 | B2 | 6/2013 | Schnitzer |
| 8,458,967 | B2 | 6/2013 | Kalkanoglu et al. |
| 8,495,997 | B1 | 7/2013 | Laubach |
| 8,505,254 | B2 | 8/2013 | Welter et al. |
| 8,528,888 | B2 | 9/2013 | Header |
| 8,584,424 | B2 | 11/2013 | Smith |
| 8,590,223 | B2 | 11/2013 | Kilgore et al. |
| 8,627,617 | B2 | 1/2014 | Haddock et al. |
| 8,627,632 | B2* | 1/2014 | Werner ............... F24S 25/16 52/653.1 |
| D699,176 | S | 2/2014 | Salomon et al. |
| 8,640,402 | B1 | 2/2014 | Bilge |
| 8,656,649 | B2 | 2/2014 | Haddock |
| 8,683,751 | B2 | 4/2014 | Stearns |
| 8,695,290 | B1 | 4/2014 | Kim et al. |
| 8,701,354 | B2 | 4/2014 | Stearns et al. |
| 8,701,372 | B2 | 4/2014 | Nuernberger et al. |
| 8,713,881 | B2 | 5/2014 | DuPont et al. |
| 8,733,027 | B1 | 5/2014 | Marston et al. |
| 8,745,935 | B2 | 6/2014 | DuPont et al. |
| 8,752,338 | B2 | 6/2014 | Schaefer et al. |
| 8,756,870 | B2 | 6/2014 | Teller et al. |
| 8,770,885 | B2 | 7/2014 | Myers |
| 8,776,456 | B1 | 7/2014 | Schrock |
| 8,782,983 | B2 | 7/2014 | Stearns |
| 8,791,611 | B2 | 7/2014 | Arnould et al. |
| 8,806,813 | B2 | 8/2014 | Plaisted et al. |
| 8,806,815 | B1 | 8/2014 | Liu et al. |
| 8,813,441 | B2 | 8/2014 | Rizzo |
| 8,826,163 | B1 | 9/2014 | Chanin et al. |
| 8,826,618 | B2 | 9/2014 | Stearns |
| 8,829,330 | B2 | 9/2014 | Meyer et al. |
| 8,833,714 | B2 | 9/2014 | Haddock et al. |
| 8,839,573 | B2 | 9/2014 | Cusson et al. |
| 8,839,575 | B1 | 9/2014 | Liu et al. |
| 8,844,234 | B2 | 9/2014 | Haddock et al. |
| 8,850,754 | B2 | 10/2014 | Rizzo |
| 8,854,829 | B1 | 10/2014 | Bopp et al. |
| 8,875,463 | B2 | 11/2014 | Plagemann et al. |
| 8,888,431 | B2 | 11/2014 | Haney |
| 8,893,441 | B1 | 11/2014 | Hess, III et al. |
| 8,894,424 | B2 | 11/2014 | DuPont |
| D718,703 | S | 12/2014 | Rizzo |
| D718,704 | S | 12/2014 | Rizzo |
| 8,910,928 | B2 | 12/2014 | Header |
| 8,920,586 | B2* | 12/2014 | Poulakis ............... B32B 7/12 156/181 |
| 8,925,263 | B2 | 1/2015 | Haddock et al. |
| 8,935,893 | B2 | 1/2015 | Liu et al. |
| 8,938,932 | B1 | 1/2015 | Wentworth et al. |
| 8,950,157 | B1 | 2/2015 | Schrock |
| 8,955,259 | B2 | 2/2015 | Hemingway |
| 8,966,833 | B2 | 3/2015 | Ally |
| 8,991,065 | B1 | 3/2015 | Schrock |
| 9,003,728 | B2 | 4/2015 | Asci |
| 9,003,733 | B1 | 4/2015 | Simpson et al. |
| 9,010,042 | B2 | 4/2015 | Anderson et al. |
| 9,011,034 | B2 | 4/2015 | Liu |
| 9,052,123 | B2 | 6/2015 | Anderson et al. |
| 9,065,191 | B2 | 6/2015 | Martin et al. |
| 9,068,339 | B2* | 6/2015 | Schaefer ............... E04B 7/18 |
| 9,076,899 | B2 | 7/2015 | Schrock |
| 9,085,900 | B2 | 7/2015 | Haddock |
| 9,086,185 | B2 | 7/2015 | Haddock |
| 9,097,443 | B2 | 8/2015 | Liu et al. |
| 9,127,451 | B1 | 9/2015 | Boor |
| 9,134,044 | B2 | 9/2015 | Stearns et al. |
| 9,147,785 | B2 | 9/2015 | Haddock et al. |
| D740,113 | S | 10/2015 | Olenick |
| 9,166,524 | B2 | 10/2015 | West et al. |
| 9,175,878 | B2 | 11/2015 | Kemmer et al. |
| 9,175,881 | B2* | 11/2015 | Schrock ............... F16B 7/182 |
| 9,194,130 | B1* | 11/2015 | Stanley ............... E04B 1/58 |
| 9,194,613 | B2 | 11/2015 | Nuernberger et al. |
| 9,200,456 | B2 | 12/2015 | Murphy |
| 9,222,263 | B2 | 12/2015 | Haddock |
| 9,223,907 | B2 | 12/2015 | Chanin et al. |
| 9,291,369 | B2* | 3/2016 | West ............... F24S 25/61 |
| 9,306,490 | B2 | 4/2016 | Haddock et al. |
| 9,309,910 | B2 | 4/2016 | Anderson et al. |
| 9,331,629 | B2 | 5/2016 | Cheung et al. |
| 9,341,285 | B2 | 5/2016 | Magno, Jr. et al. |
| 9,447,988 | B2 | 9/2016 | Stearns et al. |
| 9,473,066 | B2 | 10/2016 | Stehan et al. |
| 9,479,110 | B2 | 10/2016 | Patton et al. |
| 9,496,697 | B1 | 11/2016 | Wentworth |
| 9,530,916 | B2 | 12/2016 | Haddock et al. |
| 9,534,390 | B2 | 1/2017 | Pendley et al. |
| 9,599,280 | B2 | 3/2017 | West et al. |
| 9,608,559 | B2 | 3/2017 | Haddock et al. |
| 9,611,652 | B2 | 4/2017 | Haddock et al. |
| 9,647,433 | B2 | 5/2017 | Meine |
| 9,647,607 | B2 | 5/2017 | Patton et al. |
| 9,689,411 | B2 | 6/2017 | Meine et al. |
| 9,712,106 | B2 | 7/2017 | Wentworth et al. |
| 9,714,670 | B2 | 7/2017 | Header |
| 9,722,532 | B2 | 8/2017 | Almy |
| 9,732,512 | B2 | 8/2017 | Haddock |
| 9,742,173 | B2 | 8/2017 | Wentworth |
| 9,755,572 | B2 | 9/2017 | Wentworth et al. |
| D800,055 | S | 10/2017 | Rothschild |
| 9,813,012 | B2 | 11/2017 | Wentworth et al. |
| 9,813,013 | B2* | 11/2017 | McPheeters ............ F24S 25/70 |
| 9,819,303 | B2 | 11/2017 | Ash |
| 9,831,817 | B2 | 11/2017 | Rothschild |
| 9,845,584 | B1 | 12/2017 | Goldammer |
| 9,850,661 | B2 | 12/2017 | Kovacs |
| 9,853,593 | B2 | 12/2017 | Cinnamon et al. |
| 9,865,938 | B2 | 1/2018 | Meine et al. |
| 9,876,463 | B2 | 1/2018 | Jasmin |
| 9,893,676 | B2 | 2/2018 | Anderson et al. |
| 9,893,677 | B1 | 2/2018 | Liu |
| 9,920,958 | B2 | 3/2018 | Haddock et al. |
| 9,926,706 | B2 | 3/2018 | Hockman |
| 9,966,745 | B2 | 5/2018 | Wentworth |
| 9,985,361 | B2 | 5/2018 | Martin |
| 10,036,414 | B2 | 7/2018 | Wiley et al. |
| 10,036,576 | B1 | 7/2018 | Robinson |
| D827,160 | S | 8/2018 | Menton |
| 10,053,856 | B2 | 8/2018 | Haddock |
| 10,054,336 | B2 | 8/2018 | Haddock et al. |
| D827,873 | S | 9/2018 | Menton |
| D827,874 | S | 9/2018 | Menton |
| 10,077,562 | B2 | 9/2018 | Haddock et al. |
| 10,103,682 | B2 | 10/2018 | Haddock et al. |
| 10,103,683 | B2 | 10/2018 | Wentworth |
| 10,106,987 | B2 | 10/2018 | Haddock et al. |
| 10,141,662 | B2 | 11/2018 | Bernard et al. |
| 10,186,791 | B2 | 1/2019 | Meine et al. |
| 10,202,991 | B2 | 2/2019 | Lewis |
| 10,205,418 | B2 | 2/2019 | Nayar |
| 10,211,773 | B2 | 2/2019 | Jasmin et al. |
| 10,211,775 | B1 | 2/2019 | Wentworth et al. |
| 10,218,305 | B1 | 2/2019 | Schrock |
| 10,240,820 | B2 | 3/2019 | Ash et al. |
| 10,291,176 | B2 | 5/2019 | Wentworth et al. |
| 10,312,855 | B2 | 6/2019 | Lester et al. |
| 10,337,764 | B2 | 7/2019 | Ash et al. |

(56) References Cited

U.S. PATENT DOCUMENTS

| | | |
|---|---|---|
| 10,359,069 B2 | 7/2019 | Ash et al. |
| 10,385,573 B2 | 8/2019 | Van Leuven |
| 10,443,896 B2 | 10/2019 | Haddock et al. |
| 10,454,190 B1 | 10/2019 | Martin |
| 10,472,828 B2 | 11/2019 | Stearns et al. |
| 10,502,457 B2 | 12/2019 | Haddock et al. |
| 10,511,252 B2 | 12/2019 | Wentworth et al. |
| 10,530,293 B2 | 1/2020 | Legall et al. |
| 10,551,090 B2 | 2/2020 | De Vogel et al. |
| 10,594,251 B2 | 3/2020 | Stearns et al. |
| 10,622,935 B1 | 4/2020 | Liu |
| 10,634,175 B2 | 4/2020 | Haddock |
| 10,640,980 B2 | 5/2020 | Haddock |
| 10,644,643 B2 | 5/2020 | Stearns et al. |
| 10,673,151 B2 | 6/2020 | Ash et al. |
| 10,686,401 B2 | 6/2020 | Ash et al. |
| 10,749,459 B1 | 8/2020 | Liu et al. |
| 10,749,466 B2 | 8/2020 | Smeja |
| 10,763,777 B2 | 9/2020 | Stearns et al. |
| 10,797,634 B1 | 10/2020 | Jasmin et al. |
| 10,816,240 B2 | 10/2020 | Robinson |
| 10,837,476 B2 | 11/2020 | Lewis |
| 10,851,826 B2 | 12/2020 | Ash et al. |
| 10,868,491 B2 | 12/2020 | Wentworth et al. |
| D909,853 S | 2/2021 | Jasmin |
| 10,931,225 B2 | 2/2021 | Yang et al. |
| 11,009,262 B2 | 5/2021 | Ash et al. |
| 11,012,023 B2 | 5/2021 | Stearns et al. |
| D923,203 S | 6/2021 | Muther |
| D923,823 S | 6/2021 | Muther |
| 11,118,353 B2 | 9/2021 | Stearns et al. |
| 11,121,484 B2 | 9/2021 | Ash et al. |
| 11,121,669 B2 | 9/2021 | Stearns et al. |
| 11,139,773 B2 | 10/2021 | Eriksson |
| 11,139,774 B2 | 10/2021 | Wentworth et al. |
| 11,189,941 B2 | 11/2021 | Ash et al. |
| 11,196,187 B2 | 12/2021 | Ash et al. |
| 11,201,581 B2 | 12/2021 | Stearns et al. |
| 11,296,648 B1 | 4/2022 | Jasmin et al. |
| 11,368,005 B2 | 6/2022 | Meine et al. |
| 11,552,591 B2 | 1/2023 | Jasmin et al. |
| 11,646,692 B2 * | 5/2023 | Wentworth ............ F24S 25/33 52/173.3 |
| 2002/0026765 A1 | 3/2002 | Vahey |
| 2002/0088196 A1 | 7/2002 | Haddock |
| 2002/0160635 A1 | 10/2002 | Kurrer et al. |
| 2003/0015637 A1 | 1/2003 | Liebendorfer |
| 2003/0062078 A1 | 4/2003 | Mimura |
| 2003/0070368 A1 | 4/2003 | Shingleton |
| 2003/0131551 A1 | 7/2003 | Mollinger et al. |
| 2003/0146346 A1 | 8/2003 | Chapman, Jr. |
| 2003/0173460 A1 | 9/2003 | Chapman, Jr. |
| 2003/0201009 A1 | 10/2003 | Nakajima et al. |
| 2004/0035065 A1 | 2/2004 | Orszulak et al. |
| 2004/0055233 A1 | 3/2004 | Showalter |
| 2004/0164208 A1 | 8/2004 | Nielson et al. |
| 2004/0231949 A1 | 11/2004 | Le et al. |
| 2004/0237465 A1 | 12/2004 | Refond |
| 2005/0102958 A1 | 5/2005 | Anderson |
| 2005/0115176 A1 | 6/2005 | Russell |
| 2005/0117997 A1 | 6/2005 | Pinzl |
| 2005/0210769 A1 | 9/2005 | Harvey |
| 2005/0257434 A1 | 11/2005 | Hockman |
| 2006/0065805 A1 | 3/2006 | Barton et al. |
| 2006/0075691 A1 | 4/2006 | Verkamlp |
| 2006/0096061 A1 | 5/2006 | Weiland et al. |
| 2006/0118163 A1 | 6/2006 | Plaisted et al. |
| 2006/0174571 A1 | 8/2006 | Panasik et al. |
| 2006/0174931 A1 | 8/2006 | Mapes et al. |
| 2006/0254192 A1 | 11/2006 | Fennell, Jr. |
| 2007/0075198 A1 | 4/2007 | Foser |
| 2007/0131273 A1 | 6/2007 | Kobayashi |
| 2007/0199590 A1 | 8/2007 | Tanaka et al. |
| 2007/0241238 A1 | 10/2007 | Neace |
| 2007/0246039 A1 | 10/2007 | Brazier et al. |
| 2007/0248434 A1 | 10/2007 | Wiley et al. |
| 2007/0289229 A1 | 12/2007 | Aldo |
| 2007/0289233 A1 | 12/2007 | Haddock |
| 2008/0035140 A1 | 2/2008 | Placer et al. |
| 2008/0041011 A1 | 2/2008 | Kannisto |
| 2008/0095591 A1 * | 4/2008 | Wu ..................... F16B 37/046 411/161 |
| 2008/0184639 A1 | 8/2008 | Cotter |
| 2008/0190047 A1 | 8/2008 | Allen |
| 2008/0236520 A1 | 10/2008 | Maehara et al. |
| 2008/0265232 A1 | 10/2008 | Terrels et al. |
| 2008/0302407 A1 | 12/2008 | Kobayashi |
| 2009/0000220 A1 | 1/2009 | Lenox |
| 2009/0007520 A1 | 1/2009 | Navon |
| 2009/0194098 A1 | 8/2009 | Placer |
| 2009/0229213 A1 | 9/2009 | Mistelski |
| 2009/0230205 A1 | 9/2009 | Hepner et al. |
| 2009/0320826 A1 | 12/2009 | Kufner |
| 2010/0058701 A1 | 3/2010 | Yao et al. |
| 2010/0133040 A1 | 6/2010 | London |
| 2010/0154784 A1 | 6/2010 | King et al. |
| 2010/0162641 A1 | 7/2010 | Reyal et al. |
| 2010/0171016 A1 | 7/2010 | Haddock |
| 2010/0175738 A1 | 7/2010 | Huss et al. |
| 2010/0192505 A1 * | 8/2010 | Schaefer ................ E04B 1/66 248/231.91 |
| 2010/0193651 A1 | 8/2010 | Railsback et al. |
| 2010/0206303 A1 | 8/2010 | Thorne |
| 2010/0212720 A1 | 8/2010 | Meyer et al. |
| 2010/0276558 A1 | 11/2010 | Faust et al. |
| 2010/0288337 A1 | 11/2010 | Rizzo |
| 2010/0293874 A1 | 11/2010 | Liebendorfer |
| 2010/0314517 A1 | 12/2010 | Patzer |
| 2011/0039458 A1 | 2/2011 | Byrne |
| 2011/0078892 A1 | 4/2011 | Hartelius et al. |
| 2011/0088340 A1 * | 4/2011 | Stobbe ..................... F24S 10/75 126/621 |
| 2011/0120047 A1 | 5/2011 | Stearns et al. |
| 2011/0138585 A1 | 6/2011 | Kmita et al. |
| 2011/0154750 A1 | 6/2011 | Welter et al. |
| 2011/0174360 A1 | 7/2011 | Plaisted et al. |
| 2011/0179606 A1 | 7/2011 | Magno, Jr. et al. |
| 2011/0209745 A1 | 9/2011 | Korman |
| 2011/0214365 A1 | 9/2011 | Aftanas |
| 2011/0214388 A1 | 9/2011 | London |
| 2011/0232212 A1 | 9/2011 | Pierson et al. |
| 2011/0239546 A1 | 10/2011 | Tsuzuki et al. |
| 2011/0247292 A1 | 10/2011 | Li |
| 2011/0260027 A1 | 10/2011 | Farnham, Jr. |
| 2011/0271611 A1 | 11/2011 | Maracci et al. |
| 2011/0272545 A1 | 11/2011 | Liu |
| 2011/0314752 A1 | 12/2011 | Meier |
| 2012/0073630 A1 | 3/2012 | Wu |
| 2012/0079781 A1 | 4/2012 | Koller |
| 2012/0085041 A1 | 4/2012 | Place |
| 2012/0099943 A1 | 4/2012 | Chiu |
| 2012/0102853 A1 | 5/2012 | Rizzo |
| 2012/0153108 A1 | 6/2012 | Schneider |
| 2012/0167364 A1 * | 7/2012 | Koch ................... F16B 2/12 29/281.1 |
| 2012/0175322 A1 | 7/2012 | Park et al. |
| 2012/0192519 A1 | 8/2012 | Ray |
| 2012/0193310 A1 | 8/2012 | Fluhrer et al. |
| 2012/0201601 A1 | 8/2012 | Rizzo |
| 2012/0244729 A1 | 9/2012 | Rivera et al. |
| 2012/0248271 A1 | 10/2012 | Zeilenga |
| 2012/0298188 A1 | 11/2012 | West et al. |
| 2012/0299233 A1 | 11/2012 | Header |
| 2012/0325761 A1 | 12/2012 | Kubsch et al. |
| 2013/0011187 A1 | 1/2013 | Schuit et al. |
| 2013/0048056 A1 | 2/2013 | Kilgore et al. |
| 2013/0089388 A1 | 4/2013 | Liu et al. |
| 2013/0091692 A1 | 4/2013 | Stanley |
| 2013/0118545 A1 | 5/2013 | Bosler et al. |
| 2013/0149030 A1 | 6/2013 | Merhar et al. |
| 2013/0167470 A1 | 7/2013 | Montgomery et al. |
| 2013/0168525 A1 | 7/2013 | Haddock |
| 2013/0220403 A1 | 8/2013 | Rizzo |
| 2013/0227833 A1 | 9/2013 | Rizzo |

(56) References Cited

U.S. PATENT DOCUMENTS

| | | |
|---|---|---|
| 2013/0263917 A1 | 10/2013 | Hamamura |
| 2013/0313043 A1 | 11/2013 | Lallier |
| 2013/0340358 A1 | 12/2013 | Danning |
| 2014/0000681 A1 | 1/2014 | Zhao et al. |
| 2014/0003861 A1 | 1/2014 | Cheung |
| 2014/0041202 A1* | 2/2014 | Schnitzer .............. F24S 25/636 403/188 |
| 2014/0069048 A1 | 3/2014 | Ally |
| 2014/0096462 A1 | 4/2014 | Haddock |
| 2014/0179133 A1 | 6/2014 | Redel |
| 2014/0220834 A1 | 8/2014 | Rizzo |
| 2014/0231605 A1 | 8/2014 | Sharpe et al. |
| 2014/0260068 A1 | 9/2014 | Pendley et al. |
| 2014/0283467 A1 | 9/2014 | Chabas et al. |
| 2014/0290718 A1* | 10/2014 | Jackson, Jr. ............. F24S 25/11 136/251 |
| 2014/0338273 A1 | 11/2014 | Stapleton |
| 2014/0341645 A1 | 11/2014 | Liu et al. |
| 2015/0052834 A1 | 2/2015 | Gies et al. |
| 2015/0060620 A1 | 3/2015 | Smeja |
| 2015/0107168 A1 | 4/2015 | Kobayashi |
| 2015/0129517 A1 | 5/2015 | Wildes |
| 2015/0171787 A1* | 6/2015 | Genschorek .......... F16B 7/0486 52/698 |
| 2015/0200620 A1 | 7/2015 | Haddock et al. |
| 2015/0214884 A1 | 7/2015 | Rizzo |
| 2015/0249423 A1 | 9/2015 | Braunstein et al. |
| 2015/0288320 A1 | 10/2015 | Stearns et al. |
| 2016/0025262 A1 | 1/2016 | Stearns et al. |
| 2016/0049901 A1 | 2/2016 | Muther et al. |
| 2016/0060869 A1 | 3/2016 | Smeja |
| 2016/0087576 A1 | 3/2016 | Johansen et al. |
| 2016/0111835 A1 | 4/2016 | Nayar |
| 2016/0111997 A1 | 4/2016 | Ganshaw et al. |
| 2016/0111998 A1 | 4/2016 | Schmid |
| 2016/0130815 A1 | 5/2016 | Menegoli |
| 2016/0160524 A1 | 6/2016 | Malins |
| 2016/0176105 A1 | 6/2016 | Stanley |
| 2016/0177984 A1 | 6/2016 | Kovacs et al. |
| 2016/0233820 A1* | 8/2016 | Redel ...................... F16B 7/187 |
| 2016/0268958 A1 | 9/2016 | Wildes et al. |
| 2017/0040928 A1 | 2/2017 | Schuit et al. |
| 2017/0067258 A1 | 3/2017 | Stearns et al. |
| 2017/0073974 A1 | 3/2017 | Kovacs |
| 2017/0107723 A1 | 4/2017 | Stearns et al. |
| 2017/0237386 A1 | 8/2017 | Stephan et al. |
| 2017/0301265 A1 | 10/2017 | Kyle et al. |
| 2017/0302221 A1 | 10/2017 | Jasmin |
| 2017/0336021 A1 | 11/2017 | Anderson |
| 2018/0013382 A1 | 1/2018 | Smeja |
| 2018/0167026 A1 | 6/2018 | Xie |
| 2019/0013772 A1 | 1/2019 | Bamat et al. |
| 2019/0049151 A1 | 2/2019 | Harris et al. |
| 2019/0106885 A1 | 4/2019 | Stearns et al. |
| 2019/0123460 A1 | 4/2019 | Ash et al. |
| 2019/0165717 A1 | 5/2019 | Haddock et al. |
| 2019/0169856 A1 | 6/2019 | Haddock et al. |
| 2019/0178274 A1 | 6/2019 | Katz |
| 2019/0195252 A1 | 6/2019 | Pryor et al. |
| 2019/0226214 A1 | 7/2019 | Van Leuven |
| 2019/0273460 A1 | 9/2019 | Kovacs |
| 2019/0285224 A1 | 9/2019 | McKechnie et al. |
| 2019/0296689 A1 | 9/2019 | Haddock et al. |
| 2019/0330853 A1 | 10/2019 | Van Leuven |
| 2019/0343085 A1 | 11/2019 | Donado |
| 2019/0345719 A1 | 11/2019 | Header |
| 2019/0363667 A1 | 11/2019 | Braunstein et al. |
| 2019/0368780 A1 | 12/2019 | Haddock et al. |
| 2019/0372501 A1 | 12/2019 | Wada et al. |
| 2020/0032523 A1 | 1/2020 | Haddock et al. |
| 2020/0144959 A1 | 5/2020 | Stearns et al. |
| 2020/0208658 A1 | 7/2020 | Roman |
| 2020/0252023 A1 | 8/2020 | Stearns et al. |
| 2020/0313604 A1 | 10/2020 | Harris et al. |
| 2020/0313611 A1 | 10/2020 | Ash et al. |
| 2020/0318349 A1 | 10/2020 | Stearns et al. |
| 2020/0321763 A1 | 10/2020 | Joshi et al. |
| 2020/0362632 A1 | 11/2020 | Fort |
| 2021/0005115 A1 | 1/2021 | Johnson |
| 2021/0028741 A1 | 1/2021 | Stearns et al. |
| 2021/0067085 A1 | 3/2021 | Stearns et al. |
| 2021/0079947 A1 | 3/2021 | Ash et al. |
| 2021/0104973 A1 | 4/2021 | Stearns et al. |
| 2021/0111546 A1 | 4/2021 | Varale |
| 2021/0159843 A1 | 5/2021 | Stearns et al. |
| 2021/0167720 A1 | 6/2021 | Stearns et al. |
| 2021/0184626 A1 | 6/2021 | Yang et al. |
| 2021/0194157 A1 | 6/2021 | Ash et al. |
| 2021/0194158 A1 | 6/2021 | Ash et al. |
| 2021/0265940 A1 | 8/2021 | Stearns et al. |
| 2021/0376781 A1 | 12/2021 | Stearns et al. |
| 2021/0376782 A1 | 12/2021 | Stearns et al. |
| 2021/0388618 A1 | 12/2021 | Stearns et al. |
| 2022/0140771 A1 | 5/2022 | Stearns et al. |
| 2022/0145634 A1 | 5/2022 | Stearns et al. |
| 2022/0149545 A1 | 5/2022 | Ash et al. |
| 2022/0178586 A1 | 6/2022 | Ash et al. |
| 2022/0278516 A1 | 9/2022 | Meine et al. |
| 2023/0036926 A1 | 2/2023 | Jovanovic et al. |

FOREIGN PATENT DOCUMENTS

| | | | |
|---|---|---|---|
| AT | 298762 | 5/1972 | |
| AU | 2005201707 | 11/2006 | |
| AU | 2009101276 | 1/2010 | |
| AU | 2009245849 | 6/2010 | |
| AU | 2014362215 | 6/2015 | |
| AU | 2017203660 | 10/2018 | |
| AU | 2016294152 | 12/2018 | |
| CA | 2704915 | 9/2011 | |
| CH | 204783 | 5/1939 | |
| CH | 388590 | 2/1965 | |
| CH | 469159 | 2/1969 | |
| CH | 671063 | 7/1989 | |
| CN | 202025767 | 11/2011 | |
| CN | 202577780 | 12/2012 | |
| CN | 103774795 | 5/2014 | |
| CN | 104254654 | 12/2014 | |
| CN | 105208941 | 12/2015 | |
| CN | 206628755 | 11/2017 | |
| CN | 206717199 | 12/2017 | |
| CN | 206737192 | 12/2017 | |
| CN | 206849001 | 1/2018 | |
| CN | 108105222 | 6/2018 | |
| CO | 6511275 | 8/2012 | |
| DE | 298762 | 4/1916 | |
| DE | 941690 | 4/1956 | |
| DE | 2126082 | 12/1972 | |
| DE | 2523087 | 11/1976 | |
| DE | 2556095 | 6/1977 | |
| DE | 3326223 | 4/1984 | |
| DE | 3617225 | 11/1987 | |
| DE | 3723020 | 1/1989 | |
| DE | 3728831 | 1/1989 | |
| DE | 9112788 | 12/1991 | |
| DE | 4115240 | 10/1992 | |
| DE | 10056177 | 5/2002 | |
| DE | 10062697 | 7/2002 | |
| DE | 10344202 | 4/2004 | |
| DE | 202005006951 | 8/2005 | |
| DE | 102005002828 | 8/2006 | |
| DE | 202006015336 | 12/2006 | |
| DE | 202006015336 U1 * | 1/2007 | ............... E04C 3/06 |
| DE | 202007002252 | 4/2007 | |
| DE | 202007018367 | 7/2008 | |
| DE | 102007036206 | 2/2009 | |
| DE | 202009010984 | 12/2009 | |
| DE | 102008032985 | 1/2010 | |
| DE | 202013002857 | 5/2013 | |
| DE | 202015102936 | 9/2016 | |
| DE | 202012013476 | 2/2017 | |
| EP | 0481905 | 4/1992 | |
| EP | 0722023 | 7/1996 | |
| EP | 0952272 | 10/1999 | |

(56) References Cited

FOREIGN PATENT DOCUMENTS

| | | |
|---|---|---|
| EP | 1126098 | 8/2001 |
| EP | 1447494 | 8/2004 |
| EP | 1804008 | 7/2007 |
| EP | 2105971 | 9/2009 |
| EP | 2327942 | 6/2011 |
| EP | 2375185 | 10/2011 |
| EP | 2746695 | 6/2014 |
| EP | 2528166 | 9/2015 |
| EP | 3092350 | 4/2019 |
| EP | 3364124 | 10/2019 |
| EP | 3552307 | 10/2019 |
| EP | 3361183 | 12/2019 |
| FR | 469159 | 7/1914 |
| FR | 1215468 | 4/1960 |
| FR | 2468209 | 4/1981 |
| FR | 2515236 | 4/1983 |
| FR | 2638772 | 5/1990 |
| FR | 2697060 | 4/1994 |
| FR | 2793827 | 11/2000 |
| FR | 2950375 | 3/2011 |
| FR | 2971577 | 8/2012 |
| FR | 2997169 | 4/2014 |
| FR | 3074369 | 12/2019 |
| GB | 2149829 | 6/1985 |
| GB | 2364077 | 1/2002 |
| GB | 2430946 | 4/2007 |
| GB | 2465484 | 5/2010 |
| GB | 2476104 | 6/2011 |
| JP | S56-158486 | 12/1981 |
| JP | H03-166452 | 7/1991 |
| JP | H04-73367 | 3/1992 |
| JP | H04-366294 | 12/1992 |
| JP | H05-346055 | 12/1993 |
| JP | H08-189150 | 7/1996 |
| JP | H09-177272 | 7/1997 |
| JP | H09-256562 | 9/1997 |
| JP | H11-172861 | 6/1999 |
| JP | 2000-120235 | 4/2000 |
| JP | 2000-179106 | 6/2000 |
| JP | 2000-234423 | 8/2000 |
| JP | 2000-303638 | 10/2000 |
| JP | 2001-193231 | 6/2001 |
| JP | 2001-303724 | 10/2001 |
| JP | 2002-146978 | 5/2002 |
| JP | 2002-180609 | 6/2002 |
| JP | 2003-096986 | 4/2003 |
| JP | 2003-155803 | 5/2003 |
| JP | 2003-213854 | 7/2003 |
| JP | 2004-060358 | 2/2004 |
| JP | 2004-068270 | 3/2004 |
| JP | 2004-092134 | 3/2004 |
| JP | 2004-124583 | 4/2004 |
| JP | 2004-156326 | 6/2004 |
| JP | 2004-264009 | 9/2004 |
| JP | 2004-278145 | 10/2004 |
| JP | 2005-171623 | 6/2005 |
| JP | 2005-322821 | 11/2005 |
| JP | 2006-097291 | 4/2006 |
| JP | 2009-052278 | 3/2009 |
| JP | 2009-179955 | 8/2009 |
| JP | 2009-185599 | 8/2009 |
| JP | 2011-069130 | 4/2011 |
| JP | 2011-185014 | 9/2011 |
| JP | 2011-236611 | 11/2011 |
| JP | 2012-144903 | 8/2012 |
| JP | 6033922 | 11/2016 |
| JP | 2018-091009 | 6/2018 |
| KR | 100957530 | 5/2010 |
| MX | 2017016056 | 8/2018 |
| NL | 2021378 | 1/2020 |
| NL | 2021379 | 1/2020 |
| NL | 2021380 | 1/2020 |
| NL | 2021740 | 5/2020 |
| PT | 3066398 | 12/2019 |
| PT | 3066399 | 12/2019 |
| WO | WO 96/08617 | 3/1996 |
| WO | WO 96/30606 | 10/1996 |
| WO | WO 97/08399 | 3/1997 |
| WO | WO 99/55982 | 11/1999 |
| WO | WO 01/39331 | 5/2001 |
| WO | WO 03/098126 | 11/2003 |
| WO | WO 2008/021714 | 2/2008 |
| WO | WO 2008/028151 | 3/2008 |
| WO | WO 2010/112049 | 10/2010 |
| WO | WO 2010/113003 | 10/2010 |
| WO | WO 2010/121830 | 10/2010 |
| WO | WO 2010/140878 | 12/2010 |
| WO | WO 2011/019460 | 2/2011 |
| WO | WO 2011/154019 | 12/2011 |
| WO | WO 2012/014203 | 2/2012 |
| WO | WO 2012/017711 | 2/2012 |
| WO | WO 2012/048056 | 4/2012 |
| WO | WO 2012/116121 | 8/2012 |
| WO | WO 2012/116777 | 9/2012 |
| WO | WO 2013/009375 | 1/2013 |
| WO | WO 2014/194576 | 12/2014 |
| WO | WO 2015/061113 | 4/2015 |
| WO | WO 2016/198305 | 12/2016 |
| WO | WO 2018/169391 | 9/2018 |
| WO | WO 2019/239024 | 12/2019 |
| WO | WO 2020/022879 | 1/2020 |
| WO | WO 2020/022880 | 1/2020 |
| WO | WO 2020/162746 | 8/2020 |
| WO | WO 2020/187472 | 9/2020 |
| WO | WO 2021/043407 | 3/2021 |
| WO | WO 2021/061866 | 4/2021 |
| WO | WO 2021/086185 | 5/2021 |
| WO | WO 2021/102062 | 5/2021 |
| WO | WO 2021/119458 | 6/2021 |
| WO | WO 2022/240909 | 11/2022 |

OTHER PUBLICATIONS

Notice of Allowance with machine translation for Chile Patent Application No. 2020-000954, dated Dec. 17, 2021 5 pages.
"ADJ Heavy Duty Lighting C-clamp," Sweetwater, 2011,3 pages [retrieved online from: http://web.archive.org/web/20111112045516/ http://www.sweetwater.com/store/detail/CClamp/].
"Aluminum," Wikipedia, Jul. 3, 2016, 21 pages [retrieved Oct. 3, 2017 from: en.wikipedia.org/w1ki/Aluminium].
"ClampFit-H Product Sheet," Schletter GmbH, Kirchdorf, Germany, Nov. 2015, 2 pages.
IDEEMATEC Tracking & Mounting Systems [online], Apr. 2008, [retrieved Mar. 6, 2012], Retrieved from http://www.ideematec.de.
"Kee Walk—Roof Top Walkway," Simplified Safety, 2011, 3 pages [retrieved online from: https://web.archive.org/web/20120207115154/ http://simplifiedsafety.com/solutions/keewalk-rooftop-walkway/].
"KeeLine® The Safety Solution for Horizontal Life Lines," Kee Safety, Ltd. 2012, 2 pages [retrieved online from: https://web.archive.org/web/20120305120830/http://keesafety.co.uk/products/kee_line].
"Miller Fusion Roof Anchor Post," Miller Fall Protection, 2011, 3 pages [retrieved online from: https://web.archive.org/web/20111211154954/www.millerfallprotection.com/fall-protection-products/roofing-products/miller-fusion-roof-anchor-post].
"New 'Alzone 360 system'", Arrid, 2008, 34 pages [retrieved online from: https://web.archive.org/web/20120317120735/www.arrid.com.au/?act=racking_parts].
"Oil Canning—Solutions," Pac-Clad, 2001, 2 pages [retrieved online from: pac-clad.com/aiapresentation/sld021.htm].
"Oil Canning," Metal Construction Association, 2003, Technical Bulletin #95-1060, 2 pages.
"REES-Snow Retention Systems," Weerbewind, 2010, 3 pages [retrieved online from: https://web.archive.org/web/20100310075027/ www.rees-oberstdorf.de/en/products/snow-retention-system.html].
"Solar mount. System," Schletter GmbH, 2012, 1 page [retrieved online from: https://web.archive.org/web/20120316154604/www.schletter.de/152-1-Solar-mounting-systems.html].
Gallo "Oil-Canning," Metal Roofing Alliance, Ask-the-experts forum, Jun. 7, 2005, 4 pages [retrieved online from: www.metalroofingalliance.

(56) References Cited

OTHER PUBLICATIONS net/v2/forums/printview.cfm?action=mboard.members/viewmessages&ForumTopicID=4921&ForumCategoryID=1].
Haddock "History and Materials," Metalmag, Metal roofing from A (Aluminum) to Z (Zinc)—Part I, Sep./Oct. 2001, 4 pages.
Haddock "Metallic Coatings for Carbon Steel," Metalmag, Metal roofing from a (Aluminum) to Z (Zinc)—Part II, Nov./Dec. 2001, 8 pages.
"Ace Clamp Cut Sheet | 5031 Z1-2," Ace Clamp, Nov. 2018, 1 page.
"S-5! WindClamp™ Install," Metal Roof Innovations, Ltd., 2014, 1 page.
"Universal Clamps Brochure for Web," Universal Clamps, 2020, 2 pages.
"Wind Clamps for Metal Roofs," Metal Roof Innovations, Ltd., 2017, Version 081717, 2 pages.
"Wind Clamp Ultra DEK," Metal Roof Innovations, Ltd., Mar. 7, 2011, Drawing No. WC14-A-0-A_CCD, 1 page.
"Wind Clamp Double LOK," Metal Roof Innovations, Ltd., Mar. 7, 2011, Drawing No. WC15-A-0-A_CCD, 1 page.
International Preliminary Report on Patentability for International (PCT) Patent Application No. PCT/US2018/055062, dated Apr. 14, 2020 26 pages.
Official Action with English Summary for Chile Patent Application No. 0954-2020, dated May 19, 2021 26 pages.
"Aerocompact® Compactmetal TR Checklist," Aerocompact, Aug. 30, 2021, CL TR ENG EU V1, 2 pages [retrieved online from: cdn.intelligencebank.com/eu/share/8MnR/YJMd/ZBPL4/original/AEROCOMPACT_CL_TR_ENG_V1_WEB].
"Aerocompact® Compactmetal TR," Aerocompact, Sep. 2, 2021, PB TR ENG EU V1, 3 pages[retrieved online from: cdn.intelligencebank.com/eu/share/8MnR/qMBXP/VYrWa/original/AEROCOMPACT_Leaflet_TR_ENG_V1_WEB].
"CompactMETAL TR59 | TR74 Assembly Instructions," Aerocompact, Sep. 2021, 27 pages.
"Grounding Clip for Electrical Protection," ARaymond, 2016, 2 pages.
"Installation Instructions for Rayvolt®—Grounding clip for Framed PV Modules," ARaymond, Feb. 2016, Version 2.2, 1 page.
Official Action for Australia Patent Application No. 2018348090, dated Aug. 20, 2021 3 pages.
Official Action for Australia Patent Application No. 2018348090, dated Oct. 14, 2021 5 pages.
Official Action with machine translation for Chile Patent Application No. 000954-2020, dated Sep. 21, 2021 27 pages.
Official Action for New Zealand Patent Application No. 764108, dated Aug. 25, 2021 5 pages.
"Fix2000 check list," Schletter GmbH, last updated Jul. 2010, 1 page.
"Standing Seam RiverClack Clamp," Shanghai Woqin New Energy Technology Co., LTD., 2018, 4 pages [retrieved online on Mar. 23, 2022 from: www.wochnmount.com/Details.html?product_id=36].
Official Action with machine translation for Colombia Patent Application No. NC2020/0005665, dated May 25, 2022 12 pages.
Official Action for Costa Rica Patent Application No. 2020-201, dated Mar. 2, 2022 7 pages.
U.S. Appl. No. 17/199,947, filed Mar. 12, 2021.
U.S. Appl. No. 17/203,481, filed Mar. 16, 2021.
U.S. Appl. No. 17/203,483, filed Mar. 16, 2021.
International Search Report and Written Opinion prepared by the ISA/U.S. Patent Office dated Dec. 21, 2018, for International Application No. PCT/US2018/055062.
"Wiley Grounding & Bonding Solutions," Hubbell, 2020, 2 pages [retrieved online from: www.hubbell.com/wiley/en/grounding-and-bonding].
Official Action for Australia Patent Application No. 2018348090, dated Nov. 6, 2020 8 pages.
"ERK-TRB-C16 RiverClack Roofing Profile Interface," Enerack, 2021, 2 pages [retrieved online from: www.enerack.com/erk-trb-c16-riverclack-roofing-profile-interface-p00231p1.html].
Extended Search Report for European Patent Application No. 18865946.0 dated May 12, 2021 6 pages.
Official Action for Panama Patent Application No. 93085-01, dated Jul. 20, 2021 4 pages.
"Code: The SR-EC-010," Lockseam Ltd., 2018, Datasheet SR-EC-010 Version 2.0, 6 pages.
"EZ Grip Metal Deck Mount," SunModo Corp., 2019, 1 page.
"EZ Grip Metal Deck Mount," SunModo Corp., 2019, Product p. 3 pages [retrieved online May 30, 2019 from: sunmodo.com/product/ez-grip-metal-deck-mount/#].
"LM-KS-700," Lumax Energy, 2018, 1 page.
"LM-TBR-VL," Lumax Energy, Oct. 2018, 1 page [retrieved online from: https://lumaxenergy.co.za/wp-content/uploads/2018/12/Lumax-Energy-LM-TBR-VL.pdf/].
"Metal Roof Deck Mount Kit," SunModo Corp., Oct. 16, 2018, Product Drawing, 1 page.
"Non-Penetrative Clamps with Roofs," Cienergy, Dec. 2021, Datasheet, 5 pages.
"PV-ezRack Klip-Iok Interface," Cienergy, 2020, 1 page.
"PV-ezRack SolarRoof-Black Anodized," Cienergy, 2020, 4 pages.
"Slot definition," Merriam-Webster Dictionary, 2022, 1 page [retrieved online Aug. 24, 2022 from www.merriam-webster.com/dictionary/slot].
"Standing Seam Rail Free One Sheet," SunModo, Corp., 2020, 2 pages.
"SunDock™ Standing Seam Rail-Free Attachment System," SunModo Corp., 2018, 1 page.
"SunDock Standing Seam PV Mounting System Installation Manual," SunModo, 2019, Doc. No. D10160-V006, 14 pages.
"Universal Klip-Iok Interface pre-assembly with Cross Connector Clamp," Cienergy, 2020, 1 page.
"Universal Klip-IIok Interface pre-assembly with Tin Interface A with ezClick module," Cienergy, 2020, 1 page.
Official Action with machine translation for Brazilian Patent Application No. BR112020007169-2, dated Sep. 7, 2022 5 pages.
Official Action with Machine Translation for Chile Patent Application No. 2021-002112, dated Nov. 8, 2022 33 pages.
Official Action with Machine Translation for Chile Patent Application No. 2021-002112, dated Feb. 1, 2023 27 pages.
Official Action with machine translation for Colombia Patent Application No. NC2020/0005665, dated Sep. 15, 2022 17 pages.
Official Action for European Patent Application No. 18865946.0, dated Aug. 3, 2022 7 pages.
Notice of Acceptance for New Zealand Patent Application No. 764108, dated Aug. 5, 2022 2 pages.

\* cited by examiner

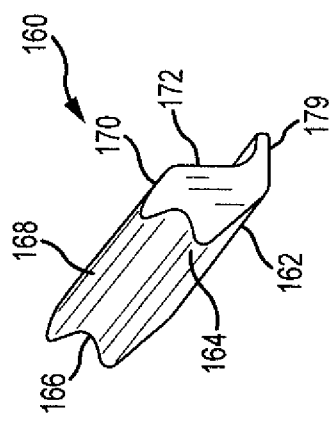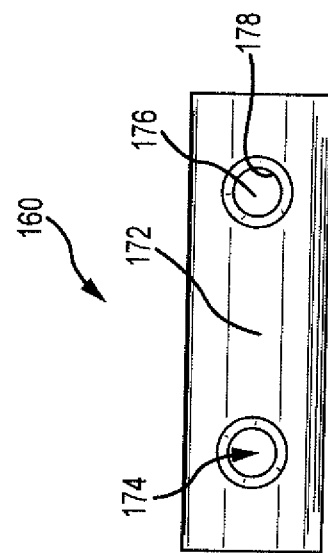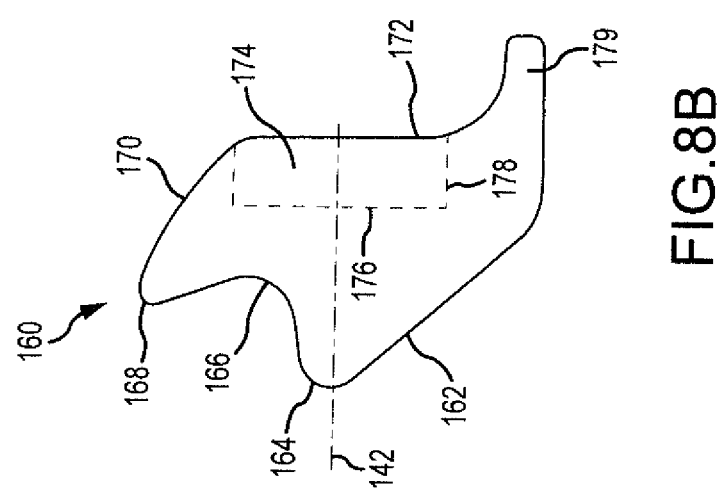

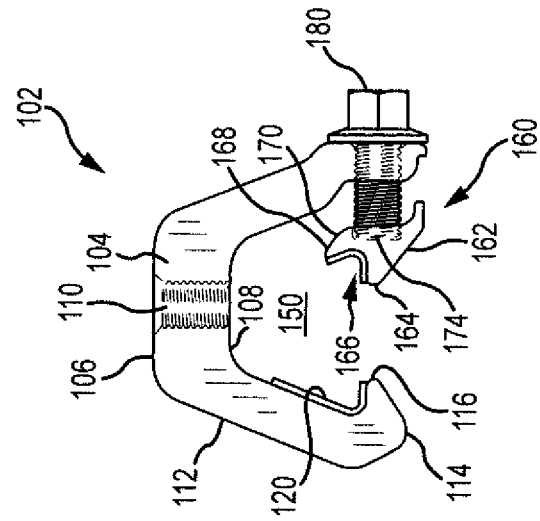
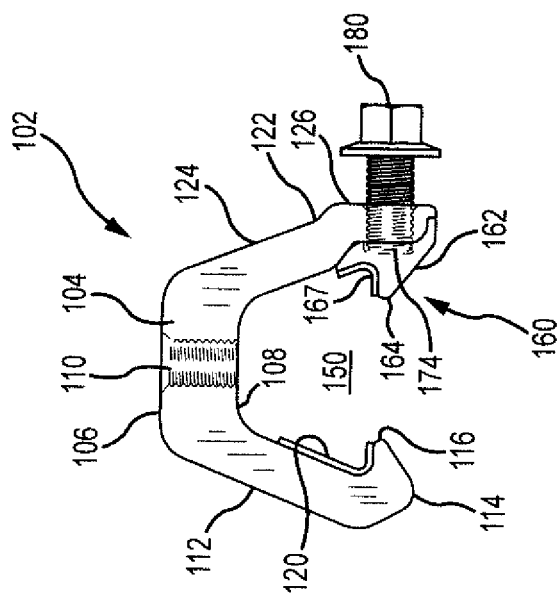

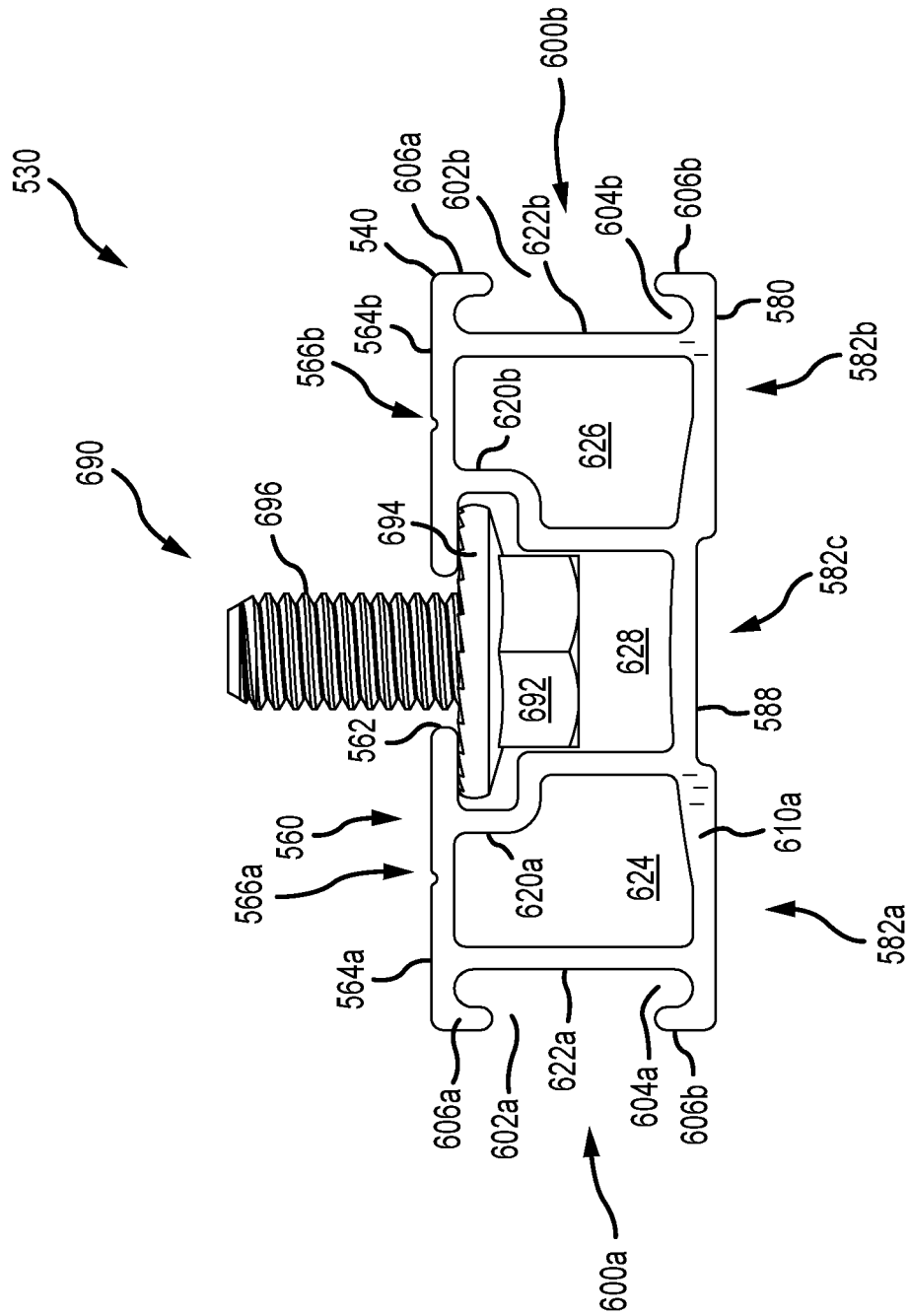

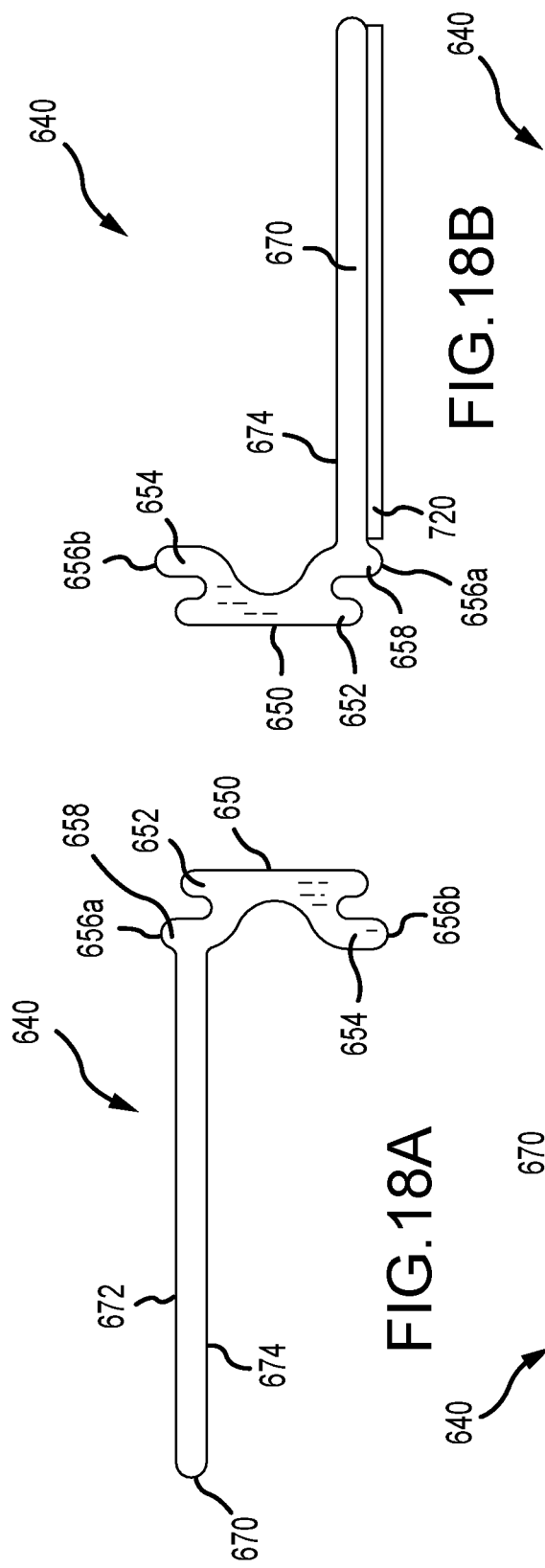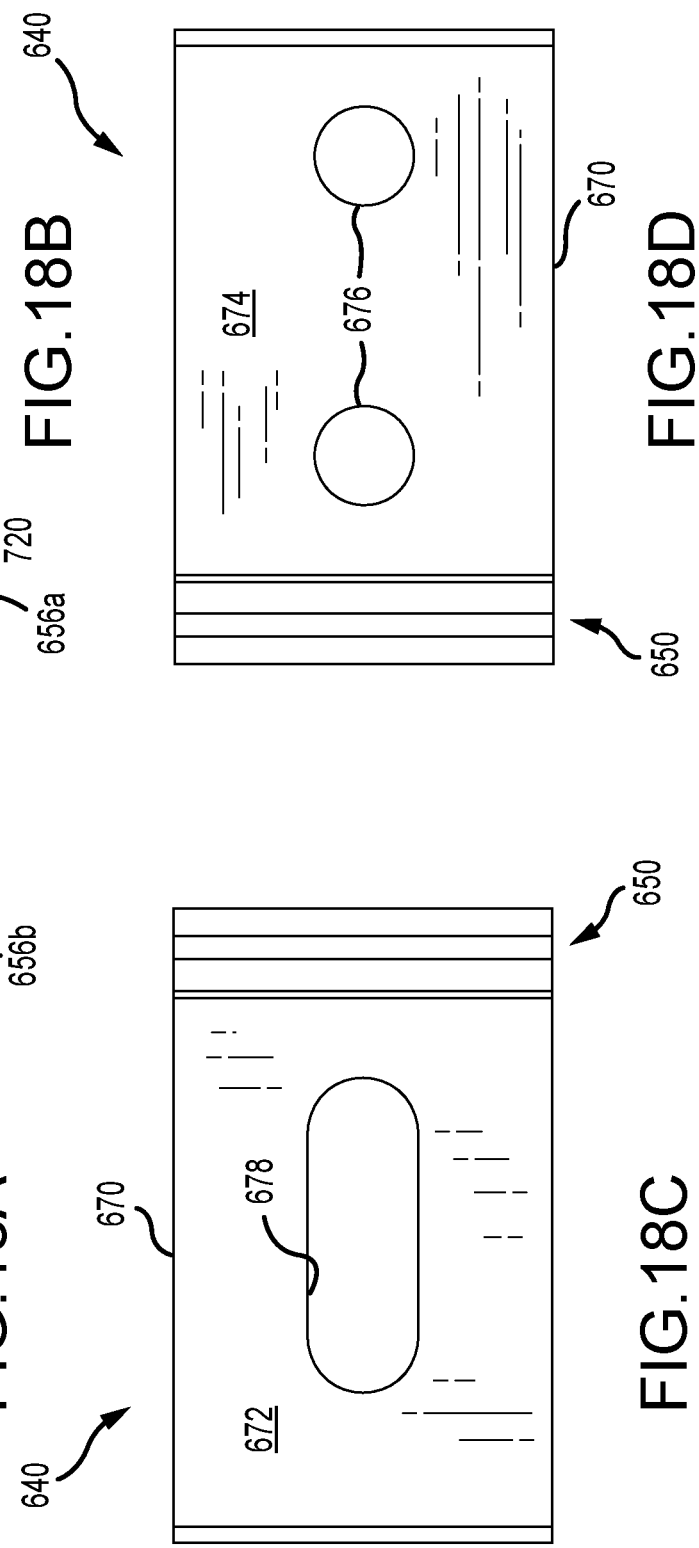

US 11,774,143 B2

RAIL ASSEMBLY WITH INVERTIBLE SIDE-MOUNT ADAPTER FOR DIRECT AND INDIRECT MOUNTING APPLICATIONS

CROSS REFERENCE TO RELATED APPLICATIONS

This application is a national stage application under 35 U.S.C. 371 and claims the benefit of PCT Application No. PCT/US2018/055062 having an international filing date of 9 Oct. 2018, which designated the United States, which PCT application claimed the benefit of U.S. Provisional Patent Application Serial No. 62/570,053, filed on 9 Oct. 2017, the entire disclosures of each of which are incorporated herein by reference.

FIELD OF THE INVENTION

The present invention generally relates to the field of mounting components to building surfaces and, more particularly, using a rail to mount components to a building surface.

BACKGROUND

Metal panels are being increasingly used to define building surfaces such as roofs and sidewalls. One type of metal panel is a standing seam panel, where the edges of adjacent standing seam panels of the building surface are interconnected in a manner that defines a standing seam. Standing seam panels are expensive compared to other metal panels, and building surfaces defined by metal panels may be more costly than other types of building surface constructions.

Other types of metal panels are commercially available and can be used to define a roofing surface. One such panel configuration is commonly referred to as a trapezoidal rib panel (e.g., formed from an appropriate metal alloy). Such a trapezoidal rib panel may include one or more trapezoidal ribs with a base section positioned on each side thereof, and furthermore may include one or more minor ribs (although some trapezoidal rib panels may in fact not use any minor ribs). In any case, an edge portion of one trapezoidal rib panel may be nested with an edge portion of an adjacent trapezoidal rib panel to collectively define a trapezoidal rib as well.

It is often desirable to install various types of structures on building surfaces, such as heating, air conditioning, and ventilation equipment. Photovoltaic or solar cells have existed for some time, and have been installed on various building roofs. A photovoltaic cell is typically incorporated into a perimeter frame of an appropriate material (e.g., aluminum) to define a photovoltaic module or solar cell module. Multiple photovoltaic modules may be arranged to define a photovoltaic module array, where rows of photovoltaic modules are typically disposed perpendicular to the pitch of a sloped roofing surface and where columns of photovoltaic modules are typically disposed along the pitch of such a sloped roofing surface (e.g., a row of photovoltaic modules of a photovoltaic module array may extend/be disposed perpendicular to the pitch of a pitched roofing surface; a column of photovoltaic modules of a photovoltaic module array may extend/be disposed along the pitch of a pitched roofing surface).

SUMMARY

The present invention pertains to a rail or a rail assembly that is attachable to a building surface, with any appropriate component or combination of components being attachable to such a rail or rail assembly. Various of the following aspects of the present invention are characterized as a "rail assembly." Each rail assembly addressed by this Summary utilizes at least a rail. If a given aspect does not require additional components for the rail assembly in its broadest terms, such an aspect of the present invention could then of course simply be referred to as a "rail."

A rail assembly may be installed on building surface (e.g., a roofing surface) of any appropriate type/configuration (e.g., defined by a plurality of metal/metal alloy panels). The rail assembly may be directly attached to such a building surface or such a rail assembly may be secured relative to such a building surface by one or more intermediate structures. For instance, the building surface may include a plurality of protrusions (hereafter rib(s) and protrusion(s) may be used interchangeably) that are spaced from one another and that are disposed in at least substantially parallel relation to one another relative to the respective length dimensions. These protrusions may be of any appropriate type/configuration, for instance in the form of a standing seam, a seam rib (e.g., of a nail strip panel), a rib (e.g., trapezoidal), a crown of a corrugated panel, or the like. These protrusions may be incorporated by a panel, may be defined by nesting/interconnecting a pair of adjacent panels, or both.

One embodiment has the plurality of ribs being orientated such that the elevation of each rib progressively changes proceeding along their respective length dimension (e.g., the length of the various ribs may collectively define a pitch of a roofing surface). In any case, the rail assembly may be installed that that a length dimension of a rail extends across multiple ribs, including where the length dimension of the rail is orthogonal to the length dimension of the ribs of the building surface. A given rail may be secured to any appropriate number of ribs. One embodiment has a bottom of the rail (e.g., at least a portion thereof) being disposed directly on an upper end (e.g., a flat upper end) of multiple ribs.

A first aspect of the present invention is embodied by a rail assembly that is attachable to a building surface, and includes a rail, an adapter, a first assembly configuration, and a second assembly configuration. The adapter includes a coupling section and a mounting flange. The rail includes a rail top and a rail bottom that are spaced from one another in a vertical dimension, along with first and second rail sides that are spaced from one another in a lateral dimension. The rail top includes an attachment fastener slot that extends along an entire length of the rail, where the length of the rail is within a longitudinal dimension that is orthogonal to the noted lateral dimension. The first rail side includes a first rail channel that extends along the entire length of the rail, while the second rail side includes a second rail channel that also extends along the entire length of the rail. The first and second rail channels may be of a common configuration and may be the mirror image of one another. In any case, the attachment fastener slot is located between the first and second rail channels in the noted lateral dimension.

The rail assembly of the first aspect is disposable in each of a first assembly configuration and a second assembly configuration. The first assembly configuration entails a first coupling portion of the coupling section for the adapter being slidably disposable in the first rail channel (of the rail) and the mounting flange of the adapter being disposed beyond the first rail channel such that the first coupling portion within the first rail channel is located between the mounting flange and the attachment fastener slot (of the rail) in the lateral dimension. The second assembly configuration entails the first coupling portion of the coupling section being slidably disposable in the second rail channel and the mounting flange being disposed beyond the second rail channel such that the first coupling portion within the second rail channel is located between the mounting flange and the attachment fastener slot in the lateral dimension. That is, in the case of the first aspect the rail and adapter are configured such that an adapter may be disposed on the first rail side, or this same adapter may be disposed on the second rail side. Obviously the same adapter may only be interconnected with only one of the first rail side and the second rail side at a given point in time and in the above-noted manner.

A second aspect of the present invention is embodied by a rail assembly that is attachable to a building surface, and includes a rail, an adapter, a first mounting configuration, and a second mounting configuration. The adapter includes a coupling section and a mounting flange. The rail includes a rail top and a rail bottom that are spaced from one another in a vertical dimension, along with first and second rail sides that are spaced from one another in a lateral dimension. The rail top includes an attachment fastener slot that extends along an entire length of the rail, where the length of the rail is within a longitudinal dimension that is orthogonal to the noted lateral dimension. The first rail side includes a first rail channel that extends along the entire length of the rail.

The rail assembly of the second aspect may utilize each of a first mounting configuration and a second mounting configuration. The first mounting configuration entails a first coupling portion of the coupling section for the adapter being disposed within the first rail channel in a first orientation relative to the rail, with the mounting flange being disposed beyond the first rail channel such that the first coupling portion (within the first rail channel) is located between the mounting flange and the attachment fastener slot in the lateral dimension. The second mounting configuration entails a first coupling portion of the coupling section being disposed within the first rail channel in a second orientation relative to the rail, with the second orientation being different from the first orientation associated with the first mounting configuration, and with the mounting flange being disposed beyond the first rail channel such that the first coupling portion (within the first rail channel) is located between the mounting flange and the attachment fastener slot in the lateral dimension. Consider the case where the rail bottom (at least part thereof) is disposed on a reference plane. The mounting flange and this reference plane are separated by a first distance within the vertical dimension for the first mounting configuration, while the mounting flange and this reference plane are separated by a second distance within the vertical dimension for the second mounting configuration, with the first distance (associated with the first mounting configuration) being greater than the second distance (associated with the second mounting configuration). That is, in the case of the second aspect the rail and adapter are configured such that the adapter may be installed on the first rail side in two different orientations (e.g., by inverting the adapter). Obviously the same adapter may installed in only one of the two orientations at a given point in time and in the above-noted manner.

A third aspect of the present invention is embodied by a rail assembly that is attachable to a building surface, and includes both a rail and an adapter. The rail includes a rail top and a rail bottom that are spaced from one another in a vertical dimension, along with first and second rail sides that are spaced from one another in a lateral dimension. The rail top includes an attachment fastener slot that extends along an entire length of the rail, where the length of the rail is within a longitudinal dimension that is orthogonal to the noted lateral dimension. The first rail side includes a first rail channel that extends along the entire length of the rail and that is defined by first and second rail lips that are separated by a first slot that leads into the first rail channel. The adapter includes a coupling section and a mounting flange. The coupling section includes an inner coupling section and an outer coupling section, with the inner coupling section being disposed within the first rail channel, and with the outer coupling section being spaced from the inner coupling section such that each of the first and second lips of the rail are captured between the inner coupling section and the outer coupling section of the adapter. The mounting flange extends from the outer coupling section at a location that is between first and second ends of the outer coupling section that are spaced from one another in the vertical dimension (e.g., the first and second ends of the outer coupling section may be characterized as the upper and lower extremes of the outer coupling section). The mounting flange is offset from each of the first and second ends of the outer coupling section in the vertical dimension, while the coupling section is located between the mounting flange and the attachment fastener slot in the lateral dimension.

A fourth aspect of the present invention is embodied by a rail assembly that is attachable to a building surface, and includes both a rail and an adapter. The rail includes a rail top and a rail bottom that are spaced from one another in a vertical dimension, along with first and second rail sides that are spaced from one another in a lateral dimension. The rail top includes an attachment fastener slot that extends along an entire length of the rail, where the length of the rail is within a longitudinal dimension that is orthogonal to the noted lateral dimension. The first rail side includes a first rail channel that extends along the entire length of the rail. The adapter includes a coupling section and a mounting flange. At least part of the coupling section is disposed within the first rail channel, while the mounting flange is disposed beyond the first rail channel such that the coupling section (while within the first rail channel) is located between the attachment fastener slot and the mounting flange in the lateral dimension. The mounting flange of the adapter includes first and second surfaces that are oppositely disposed and that are each substantially planar. The adapter includes a first projection that is adjacent to and protrudes relative to the first surface, with the first projection and the first surface facing or projecting in a common direction, and with the first projection being disposed between the rail and an entirety of the first surface in the lateral dimension.

A fifth aspect of the present invention is embodied by a rail assembly that is attachable to a building surface, and includes a rail (e.g., in the form of a one-piece body). The rail includes a rail top and a rail bottom that are spaced from one another in a vertical dimension, along with first and second rail sides that are spaced from one another in a lateral dimension. The rail top includes an attachment fastener slot that extends along an entire length of the rail, where the length of the rail is within a longitudinal dimension that is orthogonal to the noted lateral dimension. The first rail side includes a first rail channel that extends along the entire length of the rail, while the second rail side includes a second rail channel that also extends along the entire length of the rail. The rail further includes first, second, and third pockets. The first pocket has a closed perimeter and extends along the entire length of the rail, with a first rail bottom portion of the rail bottom defining a lower extreme of the first pocket, and with the first rail channel being adjacent to but isolated from the first pocket. The second pocket also has a closed perimeter and extends along the entire length of the rail, with a second rail bottom portion of the rail bottom defining a lower extreme of the second pocket, and with the second rail channel being adjacent to but isolated from the second pocket. The third pocket is disposed between the first pocket and the second pocket in the lateral dimension, and extends along the entire length of the rail. This attachment fastener slot extends to and intersects with the third pocket.

A sixth aspect of the present invention is embodied by a rail assembly that is attachable to a building surface, and includes a rail (e.g., in the form of a one-piece body). The rail includes a rail top, a rail bottom, a first rail side, a second rail side, and a pocket. The rail top includes an attachment fastener slot that extends along an entire length of the rail, where the length of the rail is within a longitudinal dimension. First and second cutouts intersect the attachment fastener slot to collectively define a rail mounting fastener access through the rail top. An effective diameter of the rail mounting fastener access is larger than a width of the entirety of the attachment fastener slot outside of/beyond the rail mounting fastener access. The first rail side includes a first rail channel that extends along the entire length of the rail, while the second rail side includes a second rail channel that also extends along the entire length of the rail. The first and second rail sides are spaced from one another in a lateral dimension that is orthogonal to the noted longitudinal dimension. The pocket is located between the first rail channel and the second rail channel in the lateral dimension, is isolated from each of the first and second rail channels, and extends along the entire length of the rail. The attachment fastener slot extends to and intersects the pocket.

A number of feature refinements and additional features are separately applicable to each of above-noted of the present invention. These feature refinements and additional features may be used individually or in any combination in relation to each of the above-noted aspects. It should be appreciated that each of the noted aspects may be used in combination one or more of the other noted aspects.

A rail in accordance with the present invention may have a channel on at least one of its two sides (e.g., for interfacing with an adapter). A given rail channel of the rail may be disposed at least substantially parallel with an attachment fastener slot, including where each rail channel of the rail is disposed in at substantially parallel relation to one another. A rail may have first and second rail channels on the first and second rail sides, respectively. Such rail channels may be of a common configuration, may be the mirror image of one another, may be at least substantially parallel to one another, or any combination thereof. One embodiment has the rail being in the form of a one-piece body (e.g., of an integral construction; individual portions are not separately attached). One embodiment has the rail being of a low profile (e.g., where a ratio of a maximum width of the rail to a maximum height of the rail is at least about 2.6). A "width" dimension for the rail may correspond with a lateral dimension. A "longitudinal" dimension for the rail may correspond with a length of the rail and is orthogonal to the lateral dimension. A "vertical" dimension for the rail may correspond with a height of the rail, where the vertical dimension is orthogonal to a plane that contains the lateral and longitudinal dimensions.

The rail assembly in accordance with the present invention may utilize an adapter having both a coupling section and a mounting flange. One embodiment has this being an integral structure or in the form of a one-piece body (e.g., of an integral construction; individual portions are not separately attached). In any case, an adapter could be used with a rail that requires only a single rail channel (e.g., second, third, and fourth aspects), or could be used with a rail that requires a pair of rail channels (e.g., first, fifth, and sixth aspects). Multiple adapters may be interconnected with a first side of a rail, multiple adapters may be interconnected with a second side of a rail, or both (e.g., multiple adapters may be spaced along the length of the rail to for securement to spaced locations along the building surface, including where the location of each adapter corresponds with a standing seam, rib, or the like). In any case, an adapter may be slid along a corresponding rail channel of the rail to the desired/required position.

A first rail side of the rail may include a first rail channel that extends along the entire length of the rail, while a second rail side of the rail may include a second rail channel that also extends along the entire length of the rail. In such a case the rail assembly may be disposed in each of a first assembly configuration and a second assembly configuration in relation to such a rail and the above-noted adapter. The first assembly configuration entails a first coupling portion of the coupling section being slidably disposable in the first rail channel and the mounting flange being disposed beyond the first rail channel such that the first coupling portion (of the adapter) within the first rail channel (of the rail) is located between the mounting flange (of the adapter) and the attachment fastener slot (of the rail) in the lateral dimension. The second assembly configuration entails the first coupling portion of the coupling section being slidably disposable in the second rail channel and the mounting flange being disposed beyond the second rail channel such that the first coupling portion within the second rail channel is located between the mounting flange and the attachment fastener slot in the lateral dimension. That is, the rail and adapter may be configured such that the noted adapter may be disposed on the first rail side, or this same adapter may be disposed on the second rail side. Obviously the same adapter may only be interconnected with one of the first rail side and the second rail side at a given point in time and in the above-noted manner.

The rail assembly may utilize both a first mounting configuration and a second mounting configuration where the rail has at least one rail channel (e.g., a first rail channel, a second rail channel, or both) and where the rail assembly utilizes the above-noted adapter. The first mounting configuration entails a first coupling portion of the coupling section being disposed within the first rail channel in a first orientation relative to the rail, with the mounting flange being disposed beyond the first rail channel such that the first coupling portion (of the adapter) is located between the mounting flange (of the adapter) and the attachment fastener slot (of the rail) in the lateral dimension. The second mounting configuration entails a first coupling portion of the coupling section being disposed within the first rail channel in a second orientation relative to the rail, with the second orientation being different from the first orientation for the first mounting configuration, and with the mounting flange being disposed beyond the first rail channel such that the first coupling portion is located between the mounting flange and the attachment fastener slot in the lateral dimension.

Consider the case where the rail bottom (at least part of) is disposed on a reference plane. The mounting flange and this reference plane are separated by a first distance within the vertical dimension for the first mounting configuration, while the mounting flange and this reference plane are separated by a second distance within the vertical dimension for the second mounting configuration, with the first distance (associated with the first mounting configuration)

being greater than the second distance (associated with the second mounting configuration), and where the measurement of the first and second distances from the noted reference plane may be to a common location on the mounting flange in the lateral dimension. That is, the rail and adapter may be configured such that the adapter may be installed on the first rail side in two different orientations (e.g., by inverting the adapter) and that changes the positioning of the mounting flange in the vertical dimension. One embodiment has the ratio of the first distance to the second distance being at least about 10. Obviously the same adapter may installed in only one of the two orientations at a given point in time and in the above-noted manner. Moreover, such an invertible adapter could be used with a rail having first and second oppositely disposed rail channels.

The rail assembly may be attached to a building surface using each of the above-noted first and second mounting configurations for the noted adapter. In the case of the first mounting configuration, a mounting device (of appropriate configuration) is attached to the building surface, the mounting flange of the adapter is disposed over/above the mounting device, and at least one fastener secures the mounting flange to this mounting device (an indirect attachment of the mounting flange to the building surface). In the case of the second mounting configuration, the mounting flange of the adapter may be disposed over/above a first rib or protrusion (e.g., a flat upper end of the first rib) of the building surface, and at least one fastener secures the mounting flange to this first rib by passing through both the mounting flange and the first rib and including a flat upper end of the first rib (a direct attachment of the mounting flange to the building surface).

Yet another option for securing a rail to a building surface is for the rail top to include first and second cutouts that each intersect with the attachment fastener slot so as to collectively define a rail mounting fastener access through the rail top. An effective diameter of such rail mounting fastener access is larger than a width of an entirety of the attachment fastener slot outside of this rail mounting fastener access. An attachment fastener pocket may be aligned with both the attachment fastener slot and the rail mounting fastener access. As such, a threaded rail mounting fastener may be directed entirely through the rail mounting fastener access, through the attachment fastener pocket, and through a corresponding portion of the rail bottom, for instance where a head of this threaded rail mounting fastener remains within the attachment fastener pocket (including in engagement with an interior surface of the rail), and where a shaft of this threaded mounting fastener extends through the corresponding portion of the rail bottom and into engagement with an underlying structure (e.g., a rib of a building surface, such as by this shaft of the threaded mounting fastener extending through a flat upper end of such a rib).

The coupling section for the above-noted adapter (coupling section and mounting flange) may include an inner coupling section and an outer coupling section. Consider the case where a rail channel for the rail (e.g., a first rail channel, a second rail channel) is defined by first and second rail lips that are separated by a slot that leads into the rail channel. The inner coupling section of the adapter may be disposed within a corresponding rail channel, and with the outer coupling section being spaced from the inner coupling section such that each of the first and second rail lips for this rail channel are captured between the inner coupling section and the outer coupling section of the adapter. The mounting flange extends from the outer coupling section at a location that is between first and second ends of the outer coupling section that are spaced from one another in the vertical dimension (e.g., the first and second ends of the outer coupling section may be characterized as the upper and lower extremes of the outer coupling section). The mounting flange is offset from each of the first and second ends of the outer coupling section in the vertical dimension, while the coupling section is located between the mounting flange and the attachment fastener slot in the lateral dimension.

The mounting flange for the above-noted adapter (coupling section and mounting flange) may include first and second surfaces that are oppositely disposed and that are each at least substantially planar. The adapter may include a first projection that is adjacent to and protrudes relative to the first surface, with the first projection and the first surface facing or projecting in a common direction, and with the first projection being disposed between the rail and an entirety of the first surface in the lateral dimension. One embodiment has the first surface of the mounting flange and an apex of the first projection being separated by a space of at least 0.050" in the vertical dimension (e.g., to accommodate a seal between the mounting flange and the flat upper end of the first rib for the above-noted second mounting configuration, and where the first projection may engage the flat upper end of the first rib). One embodiment has the first surface of the mounting flange and an apex of the first projection being separated by a space of no more than about 0.055" in the vertical dimension (e.g., to accommodate the noted seal).

One configuration for the rail utilizes a first pocket, a second pocket and a third pocket (e.g., the third pocket may correspond with the noted attachment fastener pocket). The first pocket has a closed perimeter and extends along the entire length of the rail. The second pocket also has a closed perimeter and extends along the entire length of the rail. The third pocket is disposed between the first pocket and the second pocket in the lateral dimension, and extends along the entire length of the rail. The first pocket may be located between the first rail side and the third pocket in the lateral dimension (e.g., a first wall may be disposed between the first pocket and the third pocket), while the second pocket may be located between the second rail side and the third pocket in the lateral dimension (e.g., a second wall may be disposed between the second pocket and the third pocket).

A first rail bottom portion of the rail bottom may define a lower extreme of the first pocket, a second rail bottom portion of the rail bottom may define a lower extreme of the second pocket, and a third rail bottom portion of the rail bottom may define a lower extreme of the third pocket. A lower surface of the third rail bottom portion (associated with the third pocket) may be recessed in a direction of the rail top (e.g., to accommodate receipt of a seal) relative to a lower surface of each of the first rail bottom portion (e.g., associated with the first pocket) and the second rail bottom portion (e.g., associated with the second pocket). At least part of an upper surface of each of the first rail bottom portion, the second rail bottom portion, and the third rail bottom portion may be convex relative to the first pocket, second pocket, and third pocket, respectively.

An attachment fastener pocket (e.g., the noted third pocket) may include upper and lower sections, with the attachment fastener slot extending to the upper section such that the upper section of the attachment fastener pocket is located between the attachment fastener slot and the lower section of the attachment fastener pocket in the vertical dimension. One embodiment has the upper section of the attachment fastener pocket and the lower section of the attachment fastener pocket being of different widths. The upper section of the attachment fastener pocket may be of a first width, while the lower section of the attachment fastener pocket may be of a second width, with the second width being of a smaller magnitude than the first width (e.g., the upper section of the attachment fastener pocket may be wider in the lateral dimension compared to the lower section of the attachment fastener pocket). Consider the case where an attachment fastener is movable along the attachment fastener slot in the longitudinal dimension and includes a first head, a threaded shaft, and a second head. At least one of the first and second heads may be rotatable relative to the shaft. The first head of the attachment fastener may be disposed above the rail top of the rail, the second head of the attachment fastener may include a flange and a body and may be disposed within the attachment fastener pocket, and the shaft of the attachment fastener may extend from the first head, through the attachment fastener slot, and at least to the second head. A flange for the second head of the attachment fastener may be disposed and retained within the upper section of the third pocket, while a body of the second head for the attachment fastener may be disposed within the lower section of the third pocket.

At least one attachment fastener may be slid along the attachment fastener slot to the desired/required position to interconnect a component with the rail (including where multiple attachment fasteners are spaced along the attachment fastener slot to interconnect a single component with the rail, to interconnect multiple components with the rail, or both). The rail top of the rail could also incorporate at least one groove, and a self-tapping screw could be directed through such a groove to attach an appropriate structure to the rail. For instance, a first groove may extend along the entire length of the rail in alignment with the noted first pocket, a second groove may extend along the entire length of the rail in alignment with the noted second pocket, or both. Such a rail thereby provides multiple options for securing a given structure to the rail (e.g., using an attachment fastener and the noted attachment fastener slot; using one or more self-tapping screws that extend through the rail top within a corresponding groove).

Any feature of any other various aspects of the present invention that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that a rail assembly includes/utilizes "a rail channel" alone does not mean that the rail assembly includes/utilizes only a single rail channel). Moreover, any failure to use phrases such as "at least one" also does not limit the corresponding feature to the singular (e.g., indicating that a rail assembly includes/utilizes "a rail channel" alone does not mean that the rail assembly includes only a single rail channel). Use of the phrase "at least generally" or the like in relation to a particular feature encompasses the corresponding characteristic and insubstantial variations thereof (e.g., indicating that a surface is at least generally/substantially flat encompasses the surface actually being planar or flat). Finally, a reference of a feature in conjunction with the phrase "in one embodiment" does not limit the use of the feature to a single embodiment.

Various aspects of the present invention are also addressed by the following paragraphs and in the noted combinations:

1. A rail assembly attachable to a building surface, comprising:

a rail comprising: 1) a rail top and a rail bottom that are spaced from one another in a vertical dimension; and 2) first and second rail sides that are spaced from one another in a lateral dimension, wherein said rail top comprises an attachment fastener slot that extends along an entire length of said rail that is within a longitudinal dimension that is orthogonal to said lateral dimension, wherein said first rail side comprises a first rail channel that extends along said entire length of said rail, wherein said second rail side comprises a second rail channel that extends along said entire length of said rail, wherein said first and second rail channels are of a common configuration and are the mirror image of one another, and wherein said attachment fastener slot is located between said first and second rail channels in said lateral dimension;

an adapter comprising a one-piece body, wherein said one-piece body comprises a coupling section and a mounting flange;

a first assembly configuration where a first coupling portion of said coupling section is slidably disposable in said first rail channel and said mounting flange is disposed beyond said first rail channel such that said first coupling portion within said first rail channel is located between said mounting flange and said attachment fastener slot in said lateral dimension; and a second assembly configuration where said first coupling portion is slidably disposable in said second rail channel and said mounting flange is disposed beyond said second rail channel such that said first coupling portion within said second rail channel is located between said mounting flange and said attachment fastener slot in said lateral dimension.

2. The rail assembly of Paragraph 1, further comprising:

a first mounting configuration where: 1) said first coupling portion of said coupling section is disposed within said first rail channel in a first orientation relative to said rail; 2) said mounting flange is disposed beyond said first rail channel such that said first coupling portion within said first rail channel is located between said mounting flange and said attachment fastener slot in said lateral dimension; and 3) said mounting flange and a reference plane are separated by a first distance within said vertical dimension when said rail bottom is positioned on said reference plane; and a second mounting configuration where: 1) said first coupling portion is disposed within said first rail channel in a second orientation relative to said rail that is different from said first orientation; 2) said mounting flange is disposed beyond said first rail channel such that said first coupling portion within said first rail channel is located between said mounting flange and said attachment fastener slot in said lateral dimension; and 3) said mounting flange and said reference plane are separated by a second distance within said vertical dimension when said rail bottom is disposed on said reference plane, wherein said first distance is greater than said second distance.

3. The rail assembly of Paragraph 2, further comprising:

a building surface;

a mounting device attached to said building surface, wherein said rail assembly is disposed in said first mounting configuration, and wherein said mounting flange is positioned above said mounting device; and at least one fastener that secures said mounting flange to said mounting device.

4. The rail assembly of Paragraph 2, further comprising:

a building surface comprising a plurality of ribs, wherein each said rib comprises a flat upper end, wherein said rail assembly is disposed in said second mounting configuration, and wherein said mounting flange is positioned above said flat upper end of a first rib; and at least one fastener that secures said mounting flange to said first rib by passing through said flat upper end of said first rib.

5. The rail assembly of Paragraph 4, further comprising a seal disposed between said mounting flange and said flat upper end of said first rib.
6. The rail assembly of Paragraph 5, wherein said adapter comprises a first projection that engages said flat upper end of said first rib such that said mounting flange and said flat upper end of said first rib are maintained in spaced relation to one another.
7. The rail assembly of Paragraph 6, wherein said mounting flange and said flat upper end of said first rib are separated by a space of at least 0.050" measured within said vertical dimension.
8. The rail assembly of any of Paragraphs 6-7, wherein said mounting flange and said flat upper end of said rib are separated by a space of no more than about 0.055" measured within said vertical dimension.
9. The rail assembly of any of Paragraphs 2-8, wherein a ratio of said first distance to said second distance is at least about 10 for said rail, wherein said first distance is a distance between said reference plane to a closest surface of said mounting flange for said first mounting configuration, and wherein said second distance is a distance between said reference plane to a closest surface of said mounting flange for said second mounting configuration.
10. The rail assembly of any of Paragraphs 1-5, wherein said first rail channel is defined in part by first and second rail lips that are separated by a first slot that leads into said first rail channel, wherein said coupling section comprises an inner coupling section disposed within said first rail channel and that comprises said first coupling portion, wherein said coupling section of said adapter further comprises an outer coupling section that is spaced from said inner coupling section such that each of said first and second rail lips are captured between said inner coupling section and said outer coupling section, wherein said mounting flange extends from said outer coupling section at a location that is between first and second ends of said outer coupling section that are spaced from one another in said vertical dimension such that said mounting flange is offset from each of said first and second ends of said outer coupling section in said vertical dimension, and wherein said coupling section is located between said mounting flange and said attachment fastener slot in said lateral dimension.
11. The rail assembly of any of Paragraphs 1-5 and 10, wherein said mounting flange comprises first and second surfaces that are oppositely disposed and that are each planar, wherein said adapter further comprises a first projection that is adjacent to and protrudes relative to said first surface, wherein said first projection and said first surface face in a common direction and with said first projection being disposed between said rail and an entirety of said first surface in said lateral dimension.
12. The rail assembly of Paragraph 11, wherein said first surface of said mounting flange and an apex of said first projection are separated by a space of at least 0.050" measured within said vertical dimension.
13. The rail assembly of any of Paragraphs 11-12, wherein said first surface of said mounting flange and an apex of said first projection are separated by a space of no more than about 0.055" measured within said vertical dimension.
14. The rail assembly of any of Paragraphs 1-13, further comprising:
a first pocket having a closed perimeter and that extends along said entire length of said rail;
a second pocket having a closed perimeter and that extends along said entire length of said rail; and
a third pocket that is disposed between said first pocket and said second pocket in said lateral dimension and that extends along said entire length of said rail, wherein said attachment fastener slot extends to and intersects said third pocket.
15. The rail assembly of Paragraph 14, wherein said first pocket is located between said first rail side and said third pocket in said lateral dimension, and wherein said second pocket is located between said second rail side and said third pocket in said lateral dimension.
16. The rail assembly of any of Paragraphs 14-15, wherein a first rail bottom portion of said rail bottom defines a lower extreme of said first pocket, wherein a second rail bottom portion of said rail bottom defines a lower extreme of said second pocket, wherein a third rail bottom portion of said rail bottom defines a lower extreme of said third pocket, and wherein a lower surface of said third rail bottom portion is recessed in a direction of said rail top relative to a lower surface of each of said first and second rail bottom portions.
17. The rail assembly of Paragraph 16, further comprising:
a first wall between said first pocket and said third pocket; and
a second wall between said second pocket and said third pocket, wherein an upper surface of said third rail bottom portion is convex proceeding from an intersection with said first wall to an intersection with said second wall, wherein at least part of an upper surface of said first rail bottom portion is convex relative to said first pocket, and wherein at least part of an upper surface of said second rail bottom portion is convex relative to said second pocket.
18. The rail assembly of Paragraph 16, further comprising a seal within a recess defined by said third rail bottom portion being recessed in a direction of said rail top relative to each of said first and second rail bottom portions.
19. The rail assembly of any of Paragraphs 14-18, wherein said rail top further comprises first and second cutouts that intersect said attachment fastener slot to collectively define a rail mounting fastener access through said rail top, wherein an effective diameter of said rail mounting fastener access is larger than a width of an entirety of said attachment fastener slot outside of said rail mounting fastener access, wherein said rail assembly further comprises:
a threaded rail mounting fastener, where a maximum diameter of said threaded rail mounting fastener is less than said effective diameter of said rail mounting fastener access.
20. The rail assembly of any of Paragraphs 14-19, wherein said third pocket comprises upper and lower sections, wherein said attachment fastener slot extends to said upper section such that said upper section is located between said attachment fastener slot and said lower section in said vertical dimension, and wherein said upper section and said lower section are of different widths.

21. The rail assembly of Paragraph 20, wherein said upper section is of a first width, wherein said lower section is of a second width, and wherein said second width is of a smaller magnitude than said first width.
22. The rail assembly of Paragraph 21, further comprising an attachment fastener that is movable along said attachment fastener slot in said longitudinal dimension and that comprises a first head, a threaded shaft, and a second head, wherein at least one of said first and said second heads is rotatable relative to said shaft, wherein said shaft extends through said attachment fastener slot and said first head is disposed beyond said rail top, wherein said second head comprises a flange and a body, wherein said flange is disposed and retained within said upper section of said third pocket, and wherein said body is disposed within said lower section of said third pocket.
23. The rail assembly of any of Paragraphs 14-22, further comprising:
a first groove on said rail top that extends along said entire length of said rail in alignment with said first pocket within said vertical dimension; and
a second groove on said rail top that extends along said entire length of said rail in alignment with said second pocket within said vertical dimension.
24. The rail assembly of Paragraph 23, further comprising a self-tapping screw that extends through said rail top within said first groove and that terminates within said first pocket.
25. The rail assembly of any of Paragraphs 1-13:
wherein said rail top further comprises first and second cutouts that intersect said attachment fastener slot to collectively define a rail mounting fastener access through said rail top, wherein an effective diameter of said rail mounting fastener access is larger than a width of an entirety of said attachment fastener slot outside of said rail mounting fastener access;
wherein said rail bottom comprises first, second, and third rail bottom portions, wherein said third rail bottom portion is located between said first and second rail bottom portions in said lateral dimension; and
wherein said rail further comprises an attachment fastener pocket that is located between said first rail side and said second rail side in said lateral dimension, wherein said attachment fastener pocket is isolated from each of said first and second rail channels, wherein said attachment fastener pocket extends along said entire length of said one-piece body, wherein said attachment fastener slot extends to and intersects said attachment fastener pocket, wherein a lower extreme of said attachment fastener pocket is defined by said third rail bottom portion, and wherein a lower surface of said third rail bottom portion is recessed in a direction of said rail top relative to a lower surface of each of said first and second rail bottom portions; and
a threaded rail mounting fastener, where a maximum diameter of said threaded rail mounting fastener is less than said effective diameter of said rail mounting fastener access.
26. The rail assembly of Paragraph 25, further comprising:
a building surface, wherein at least part of said rail bottom is positioned directly on said building surface, and wherein said threaded rail mounting fastener extends through said third rail bottom portion in alignment with said rail mounting fastener access and also through an aligned portion of said building surface.
27. The rail assembly of Paragraph 26, wherein said building surface comprises a first rib with a flat upper end, wherein said rail intersects a length dimension of said first rib, and wherein said threaded rail mounting fastener extends through said third rail bottom portion in alignment with said rail mounting fastener access and also through said flat upper end of said first rib.
28. The rail assembly of any of Paragraphs 25-27, further comprising a seal within a recess defined by said third rail bottom portion being recessed in a direction of said rail top relative to each of said first and second rail bottom portions, wherein said threaded rail mounting fastener also extends through said seal.
29. The rail assembly of any of Paragraphs 1-13 and 25-28, wherein said rail comprises an attachment fastener pocket, wherein said attachment fastener slot extends to and intersects said attachment fastener pocket, said rail assembly further comprising:
an attachment fastener that is movable along said attachment fastener slot in said longitudinal dimension and that comprises a first head, a threaded shaft, and a second head, wherein at least one of said first and said second heads is rotatable relative to said shaft, wherein said shaft extends through said attachment fastener slot and said first head is disposed beyond said rail top, wherein said second head comprises a flange and a body, wherein said flange is disposed and retained within an upper section of said attachment fastener pocket, wherein said body is disposed within a lower section of said attachment fastener pocket and with said upper section of said attachment fastener pocket being at a higher elevation in said vertical dimension compared to said lower section of said attachment fastener pocket, and wherein said upper section of said attachment fastener pocket is wider in said lateral dimension than said lower section of said attachment fastener pocket.
30. The rail assembly of any of Paragraphs 1-29, wherein a ratio of a maximum width of said rail to a maximum height of said rail is at least 2.6.
31. A rail assembly attachable to a building surface, comprising:
a rail comprising: 1) a rail top and a rail bottom that are spaced from one another in a vertical dimension; and 2) first and second rail sides that are spaced from one another in a lateral dimension, wherein said rail top comprises an attachment fastener slot that extends along an entire length of said rail that is within a longitudinal dimension that is orthogonal to said lateral dimension, and wherein said first rail side comprises a first rail channel that extends along said entire length of said rail;
an adapter that is slidably engaged with said first rail channel, wherein said adapter comprises a coupling section and a mounting flange;
a first mounting configuration where: 1) a first coupling portion of said coupling section is disposed within said first rail channel in a first orientation relative to said rail; 2) said mounting flange is disposed beyond said first rail channel such that said first coupling portion within said first rail channel is located between said mounting flange and said attachment fastener slot in said lateral dimension; and 3) said mounting flange and a reference plane are separated by a first distance within said vertical dimension when said rail bottom is positioned on said reference plane; and
a second mounting configuration where: 1) said first coupling portion is disposed within said first rail channel in a second orientation relative to said rail that is different from said first orientation; 2) said mounting flange is disposed beyond said first rail channel such that said first coupling portion within said first rail channel is located between said mounting flange and said attachment fastener slot in said lateral dimension; and 3) said mounting flange and said reference plane are separated by a second distance within said vertical dimension when said rail bottom is disposed on said reference plane, wherein said first distance is greater than said second distance.

32. The rail assembly of Paragraph 31, The rail assembly of claim 31, wherein said second rail side comprises a second rail channel that extends along said entire length of said rail, wherein said first and second rail channels are of a common configuration and are the mirror image of one another, wherein said attachment fastener slot is located between said first and second rail channels in said lateral dimension, and wherein said second rail channel would also accommodate a slidable interconnection with said coupling section of said adapter.

33. The rail assembly of any of Paragraphs 31-32, wherein said adapter comprises a one-piece body.

34. The rail assembly of any of Paragraphs 31-33, further comprising:
a building surface;
a mounting device attached to said building surface, wherein said rail assembly is disposed in said first mounting configuration, and wherein said mounting flange is positioned above said mounting device; and
at least one fastener that secures said mounting flange to said mounting device.

35. The rail assembly of any of Paragraphs 31-33, further comprising:
a building surface comprising a plurality of ribs, wherein each said rib comprises a flat upper end, wherein said rail assembly is disposed in said second mounting configuration, and wherein said mounting flange is positioned above said flat upper end of a first rib; and
at least one fastener that secures said mounting flange to said first rib by passing through said flat upper end of said first rib.

36. The rail assembly of Paragraph 35, further comprising a seal disposed between said mounting flange and said flat upper end of said first rib.

37. The rail assembly of Paragraph 36, wherein said adapter comprises a first projection that engages said flat upper end of said first rib such that said mounting flange and said flat upper end of said first rib are maintained in spaced relation to one another.

38. The rail assembly of Paragraph 37, wherein said mounting flange and said flat upper end of said first rib are separated by a space of at least 0.050" measured within said vertical dimension.

39. The rail assembly of any of Paragraphs 37-38, wherein said mounting flange and said flat upper end of said rib are separated by a space of no more than about 0.055" measured within said vertical dimension.

40. The rail assembly of any of Paragraphs 31-39, wherein a ratio of said first distance to said second distance is at least about 10 for said rail, wherein said first distance is a distance between said reference plane to a closest surface of said mounting flange for said first mounting configuration, and wherein said second distance is a distance between said reference plane to a closest surface of said mounting flange for said second mounting configuration.

41. The rail assembly of any of Paragraphs 31-36, wherein said first rail channel is defined in part by first and second rail lips that are separated by a first slot that leads into said first rail channel, wherein said coupling section comprises an inner coupling section disposed within said first rail channel and that comprises said first coupling portion, wherein said coupling section of said adapter further comprises an outer coupling section that is spaced from said inner coupling section such that each of said first and second rail lips are captured between said inner coupling section and said outer coupling section, wherein said mounting flange extends from said outer coupling section at a location that is between first and second ends of said outer coupling section that are spaced from one another in said vertical dimension such that said mounting flange is offset from each of said first and second ends of said outer coupling section in said vertical dimension, and wherein said coupling section is located between said mounting flange and said attachment fastener slot in said lateral dimension.

42. The rail assembly of any of Paragraphs 31-36 and 41, wherein said mounting flange comprises first and second surfaces that are oppositely disposed and that are each planar, wherein said adapter further comprises a first projection that is adjacent to and protrudes relative to said first surface, wherein said first projection and said first surface face in a common direction and with said first projection being disposed between said rail and an entirety of said first surface in said lateral dimension.

43. The rail assembly of Paragraph 42, wherein said first surface of said mounting flange and an apex of said first projection are separated by a space of at least 0.050" measured within said vertical dimension.

44. The rail assembly of any of Paragraph 42-43, wherein said first surface of said mounting flange and an apex of said first projection are separated by a space of no more than about 0.055" measured within said vertical dimension.

45. The rail assembly of any of Paragraphs 31-44, further comprising:
a first pocket having a closed perimeter and that extends along said entire length of said rail;
a second pocket having a closed perimeter and that extends along said entire length of said rail; and
a third pocket that is disposed between said first pocket and said second pocket in said lateral dimension and that extends along said entire length of said rail, wherein said attachment fastener slot extends to and intersects said third pocket.

46. The rail assembly of Paragraph 45, wherein said first pocket is located between said first rail side and said third pocket in said lateral dimension, and wherein said second pocket is located between said second rail side and said third pocket in said lateral dimension.

47. The rail assembly of any of Paragraphs 45-46, wherein a first rail bottom portion of said rail bottom defines a lower extreme of said first pocket, wherein a second rail bottom portion of said rail bottom defines a lower extreme of said second pocket, wherein a third rail bottom portion of said rail bottom defines a lower extreme of said third pocket, and wherein a lower surface of said third rail bottom portion is recessed in a direction of said rail top relative to a lower surface of each of said first and second rail bottom portions.

48. The rail assembly of Paragraph 47, further comprising:
a first wall between said first pocket and said third pocket; and
a second wall between said second pocket and said third pocket, wherein an upper surface of said third rail bottom portion is convex proceeding from an intersection with said first wall to an intersection with said second wall, wherein at least part of an upper surface of said first rail bottom portion is convex relative to said first pocket, and wherein at least part of an upper surface of said second rail bottom portion is convex relative to said second pocket.

49. The rail assembly of any of Paragraphs 47-48, further comprising a seal within a recess defined by said third rail bottom portion being recessed in a direction of said rail top relative to each of said first and second rail bottom portions.

50. The rail assembly of any of Paragraphs 45-49, wherein said rail top further comprises first and second cutouts that intersect said attachment fastener slot to collectively define a rail mounting fastener access through said rail top, wherein an effective diameter of said rail mounting fastener access is larger than a width of an entirety of said attachment fastener slot outside of said rail mounting fastener access, wherein said rail assembly further comprises:

a threaded rail mounting fastener, where a maximum diameter of said threaded rail mounting fastener is less than said effective diameter of said rail mounting fastener access.

51. The rail assembly of any of Paragraphs 45-50, wherein said third pocket comprises upper and lower sections, wherein said attachment fastener slot extends to said upper section such that said upper section is located between said attachment fastener slot and said lower section in said vertical dimension, and wherein said upper section and said lower section are of different widths.

52. The rail assembly of Paragraph 51, wherein said upper section is of a first width, wherein said lower section is of a second width, and wherein said second width is of a smaller magnitude than said first width.

53. The rail assembly of Paragraph 52, further comprising an attachment fastener that is movable along said attachment fastener slot in said longitudinal dimension and that comprises a first head, a threaded shaft, and a second head, wherein at least one of said first and said second heads is rotatable relative to said shaft, wherein said shaft extends through said attachment fastener slot and said first head is disposed beyond said rail top, wherein said second head comprises a flange and a body, wherein said flange is disposed and retained within said upper section of said third pocket, and wherein said body is disposed within said lower section of said third pocket.

54. The rail assembly of any of Paragraphs 45-53, further comprising:

a first groove on said rail top that extends along said entire length of said rail in alignment with said first pocket within said vertical dimension; and a second groove on said rail top that extends along said entire length of said rail in alignment with said second pocket within said vertical dimension.

55. The rail assembly of Paragraph 54, further comprising a self-tapping screw that extends through said rail top within said first groove and that terminates within said first pocket.

56. The rail assembly of any of Paragraphs 31-44:

wherein said rail top further comprises first and second cutouts that intersect said attachment fastener slot to collectively define a rail mounting fastener access through said rail top, wherein an effective diameter of said rail mounting fastener access is larger than a width of an entirety of said attachment fastener slot outside of said rail mounting fastener access;

wherein said rail bottom comprises first, second, and third rail bottom portions, wherein said third rail bottom portion is located between said first and second rail bottom portions in said lateral dimension; and wherein said rail further comprises an attachment fastener pocket that is located between said first rail side and said second rail side in said lateral dimension, wherein said attachment fastener pocket extends along said entire length of said rail, wherein said attachment fastener slot extends to and intersects said attachment fastener pocket, wherein a lower extreme of said attachment fastener pocket is defined by said third rail bottom portion, and wherein a lower surface of said third rail bottom portion is recessed in a direction of said rail top relative to a lower surface of each of said first and second rail bottom portions; and a threaded rail mounting fastener, where a maximum diameter of said threaded rail mounting fastener is less than said effective diameter of said rail mounting fastener access.

57. The rail assembly of Paragraph 56, further comprising:

a building surface, wherein at least part of said rail bottom is positioned directly on said building surface, and wherein said threaded rail mounting fastener extends through said third rail bottom portion in alignment with said rail mounting fastener access and also through an aligned portion of said building surface.

58. The rail assembly of Paragraph 57, wherein said building surface comprises a first rib with a flat upper end, wherein said rail intersects a length dimension of said first rib, and wherein said threaded rail mounting fastener extends through said third rail bottom portion in alignment with said rail mounting fastener access and also through said flat upper end of said first rib.

59. The rail assembly of any of Paragraphs 56-58, further comprising a seal within a recess defined by said third rail bottom portion being recessed in a direction of said rail top relative to each of said first and second rail bottom portions, wherein said threaded rail mounting fastener also extends through said seal.

60. The rail assembly of any of Paragraphs 31-44, wherein said rail comprises an attachment fastener pocket, wherein said attachment fastener slot extends to and intersects said attachment fastener pocket, said rail assembly further comprising:

an attachment fastener that is movable along said attachment fastener slot in said longitudinal dimension and that comprises a first head, a threaded shaft, and a second head, wherein at least one of said first and said second heads is rotatable relative to said shaft, wherein said shaft extends through said attachment fastener slot and said first head is disposed beyond said rail top, wherein said second head comprises a flange and a body, wherein said flange is disposed and retained within an upper section of said attachment fastener pocket, wherein said body is disposed within a lower section of said attachment fastener pocket and with said upper section of said attachment fastener pocket being at a higher elevation in said vertical dimension compared to said lower section of said attachment fastener pocket, and wherein said upper section of said attachment fastener pocket is wider in said lateral dimension than said lower section of said attachment fastener pocket.

61. The rail assembly of any of Paragraphs 31-60, wherein a ratio of a maximum width of said rail to a maximum height of said rail is at least 2.6.

62. A rail assembly attachable to a building surface, comprising:

a rail comprising: 1) a rail top and a rail bottom that are spaced from one another in a vertical dimension; and 2) first and second rail sides that are spaced from one another in a lateral dimension, wherein said rail top comprises an attachment fastener slot that extends along an entire length of said rail that is within a longitudinal dimension that is orthogonal to said lateral dimension, and wherein said first rail side comprises a first rail channel that extends along said entire length of said rail and that is defined in part by first and second rail lips that are separated by a first slot that leads into said first rail channel;

an adapter comprising a coupling section and a mounting flange, wherein said coupling section comprises an inner coupling section disposed within said first rail channel and an outer coupling section that is spaced from said inner coupling section such that each of said first and second rail lips are captured between said inner coupling section and said outer coupling section, wherein said mounting flange extends from said outer coupling section at a location that is between first and second ends of said outer coupling section that are spaced from one another in said vertical dimension such that said mounting flange is offset from each of said first and second ends of said outer coupling section in said vertical dimension, and wherein said coupling section is located between said mounting flange and said attachment fastener slot in said lateral dimension.

63. The rail assembly of Paragraph 62, wherein said second rail side comprises a second rail channel that extends along said entire length of said rail, wherein said first and second rail channels are of a common configuration and are the mirror image of one another, wherein said attachment fastener slot is located between said first and second rail channels in said lateral dimension, and wherein each of said first rail channel and said second rail channel accommodate a slidable interconnection with said coupling section of said adapter.

64. The rail assembly of Paragraph 63, further comprising:

a first assembly configuration where a first coupling portion of said coupling section is slidably disposable in said first rail channel and said mounting flange is disposed beyond said first rail channel such that said first coupling portion within said first rail channel is located between said mounting flange and said attachment fastener slot in said lateral dimension; and a second assembly configuration where said first coupling portion is slidably disposable in said second rail channel and said mounting flange is disposed beyond said second rail channel such that said first coupling portion within said second rail channel is located between said mounting flange and said attachment fastener slot in said lateral dimension.

65. The rail assembly of any of Paragraphs 62-64, wherein said adapter comprises a one-piece body.

66. The rail assembly of any of Paragraphs 62-65, further comprising:

a first mounting configuration where: 1) said inner coupling section is disposed within said first rail channel in a first orientation relative to said rail; 2) said mounting flange is disposed beyond said first rail channel such that said inner coupling section within said first rail channel is located between said mounting flange and said attachment fastener slot in said lateral dimension; and 3) said mounting flange and a reference plane are separated by a first distance within said vertical dimension when said rail bottom is positioned on said reference plane; and a second mounting configuration where: 1) said inner coupling section is disposed within said first rail channel in a second orientation relative to said rail that is different from said first orientation; 2) said mounting flange is disposed beyond said first rail channel such that said inner coupling section within said first rail channel is located between said mounting flange and said attachment fastener slot in said lateral dimension; and 3) said mounting flange and said reference plane are separated by a second distance within said vertical dimension when said rail bottom is disposed on said reference plane, wherein said first distance is greater than said second distance.

67. The rail assembly of Paragraph 66, further comprising:

a building surface;

a mounting device attached to said building surface, wherein said rail assembly is disposed in said first mounting configuration, and wherein said mounting flange is positioned above said mounting device; and at least one fastener that secures said mounting flange to said mounting device.

68. The rail assembly of Paragraph 66, further comprising:

a building surface comprising a plurality of ribs, wherein each said rib comprises a flat upper end, wherein said rail assembly is disposed in said second mounting configuration, and wherein said mounting flange is positioned above said flat upper end of a first rib; and at least one fastener that secures said mounting flange to said first rib by passing through said flat upper end of said first rib.

69. The rail assembly of Paragraph 68, further comprising a seal disposed between said mounting flange and said flat upper end of said first rib.

70. The rail assembly of Paragraph 69, wherein said adapter comprises a first projection that engages said flat upper end of said first rib such that said mounting flange and said flat upper end of said first rib are maintained in spaced relation to one another.

71. The rail assembly of Paragraph 70, wherein said mounting flange and said flat upper end of said first rib are separated by a space of at least 0.050" measured within said vertical dimension.

72. The rail assembly of any of Paragraphs 70-71, wherein said mounting flange and said flat upper end of said rib are separated by a space of no more than about 0.055" measured within said vertical dimension.

73. The rail assembly of any of Paragraphs 66-72, wherein a ratio of said first distance to said second distance is at least about 10 for said rail, wherein said first distance is a distance between said reference plane to a closest surface of said mounting flange for said first mounting configuration, and wherein said second distance is a distance between said reference plane to a closest surface of said mounting flange for said second mounting configuration.

74. The rail assembly of any of Paragraphs 62-73, wherein said mounting flange comprises first and second surfaces that are oppositely disposed and that are each planar, wherein said adapter further comprises a first projection that is adjacent to and protrudes relative to said first surface, wherein said first projection and said first surface face in a common direction and with said first projection being disposed between said rail and an entirety of said first surface in said lateral dimension.

75. The rail assembly of Paragraph 74, wherein said first surface of said mounting flange and an apex of said first projection are separated by a space of at least 0.050" measured within said vertical dimension.

76. The rail assembly of any of Paragraphs 74-75, wherein said first surface of said mounting flange and an apex of said first projection are separated by a space of no more than about 0.055" measured within said vertical dimension.

77. The rail assembly of any of Paragraphs 62-76, further comprising:
a first pocket having a closed perimeter and that extends along said entire length of said rail;
a second pocket having a closed perimeter and that extends along said entire length of said rail; and
a third pocket that is disposed between said first pocket and said second pocket in said lateral dimension and that extends along said entire length of said rail, wherein said attachment fastener slot extends to and intersects said third pocket.

78. The rail assembly of Paragraph 77, wherein said first pocket is located between said first rail side and said third pocket in said lateral dimension, and wherein said second pocket is located between said second rail side and said third pocket in said lateral dimension.

79. The rail assembly of any of Paragraphs 77-78, wherein a first rail bottom portion of said rail bottom defines a lower extreme of said first pocket, wherein a second rail bottom portion of said rail bottom defines a lower extreme of said second pocket, wherein a third rail bottom portion of said rail bottom defines a lower extreme of said third pocket, and wherein a lower surface of said third rail bottom portion is recessed in a direction of said rail top relative to a lower surface of each of said first and second rail bottom portions.

80. The rail assembly of Paragraph 79, further comprising:
a first wall between said first pocket and said third pocket; and
a second wall between said second pocket and said third pocket, wherein an upper surface of said third rail bottom portion is convex proceeding from an intersection with said first wall to an intersection with said second wall, wherein at least part of an upper surface of said first rail bottom portion is convex relative to said first pocket, and wherein at least part of an upper surface of said second rail bottom portion is convex relative to said second pocket.

81. The rail assembly of any of Paragraphs 79-80, further comprising a seal within a recess defined by said third rail bottom portion being recessed in a direction of said rail top relative to each of said first and second rail bottom portions.

82. The rail assembly of any of Paragraphs 77-81, wherein said rail top further comprises first and second cutouts that intersect said attachment fastener slot to collectively define a rail mounting fastener access through said rail top, wherein an effective diameter of said rail mounting fastener access is larger than a width of an entirety of said attachment fastener slot outside of said rail mounting fastener access, wherein said rail assembly further comprises:
a threaded rail mounting fastener, where a maximum diameter of said threaded rail mounting fastener is less than said effective diameter of said rail mounting fastener access.

83. The rail assembly of any of Paragraphs 77-82, wherein said third pocket comprises upper and lower sections, wherein said attachment fastener slot extends to said upper section such that said upper section is located between said attachment fastener slot and said lower section in said vertical dimension, and wherein said upper section and said lower section are of different widths.

84. The rail assembly of Paragraph 83, wherein said upper section is of a first width, wherein said lower section is of a second width, and wherein said second width is of a smaller magnitude than said first width.

85. The rail assembly of Paragraph 84, further comprising an attachment fastener that is movable along said attachment fastener slot in said longitudinal dimension and that comprises a first head, a threaded shaft, and a second head, wherein at least one of said first and said second heads is rotatable relative to said shaft, wherein said shaft extends through said attachment fastener slot and said first head is disposed beyond said rail top, wherein said second head comprises a flange and a body, wherein said flange is disposed and retained within said upper section of said third pocket, and wherein said body is disposed within said lower section of said third pocket.

86. The rail assembly of any of Paragraphs 77-85, further comprising:
a first groove on said rail top that extends along said entire length of said rail in alignment with said first pocket within said vertical dimension; and
a second groove on said rail top that extends along said entire length of said rail in alignment with said second pocket within said vertical dimension.

87. The rail assembly of Paragraph 86, further comprising a self-tapping screw that extends through said rail top within said first groove and that terminates within said first pocket.

88. The rail assembly of any of Paragraph 62-76:
wherein said rail top further comprises first and second cutouts that intersect said attachment fastener slot to collectively define a rail mounting fastener access through said rail top, wherein an effective diameter of said rail mounting fastener access is larger than a width of an entirety of said attachment fastener slot outside of said rail mounting fastener access;
wherein said rail bottom comprises first, second, and third rail bottom portions, wherein said third rail bottom portion is located between said first and second rail bottom portions in said lateral dimension; and
wherein said rail further comprises an attachment fastener pocket that is located between said first rail side and said second rail side in said lateral dimension, wherein said attachment fastener pocket extends along said entire length of said rail, wherein said attachment fastener slot extends to and intersects said attachment fastener pocket, wherein a lower extreme of said attachment fastener pocket is defined by said third rail bottom portion, and wherein a lower surface of said third rail bottom portion is recessed in a direction of said rail top relative to a lower surface of each of said first and second rail bottom portions; and
a threaded rail mounting fastener, where a maximum diameter of said threaded rail mounting fastener is less than said effective diameter of said rail mounting fastener access.

89. The rail assembly of Paragraph 88, further comprising:
a building surface, wherein at least part of said rail bottom is positioned directly on said building surface, and wherein said threaded rail mounting fastener extends through said third rail bottom portion in alignment with said rail mounting fastener access and also through an aligned portion of said building surface.

90. The rail assembly of Paragraph 89, wherein said building surface comprises a first rib with a flat upper end, wherein said rail intersects a length dimension of said first rib, and wherein said threaded rail mounting fastener extends through said third rail bottom portion in alignment with said rail mounting fastener access and also through said flat upper end of said first rib.

91. The rail assembly of any of Paragraphs 88-90, further comprising a seal within a recess defined by said third rail bottom portion being recessed in a direction of said rail top relative to each of said first and second rail bottom portions, wherein said threaded rail mounting fastener also extends through said seal.

92. The rail assembly of any of Paragraphs 62-76, wherein said rail comprises an attachment fastener pocket, wherein said attachment fastener slot extends to and intersects said attachment fastener pocket, said rail assembly further comprising:

an attachment fastener that is movable along said attachment fastener slot in said longitudinal dimension and that comprises a first head, a threaded shaft, and a second head, wherein at least one of said first and said second heads is rotatable relative to said shaft, wherein said shaft extends through said attachment fastener slot and said first head is disposed beyond said rail top, wherein said second head comprises a flange and a body, wherein said flange is disposed and retained within an upper section of said attachment fastener pocket, wherein said body is disposed within a lower section of said attachment fastener pocket and with said upper section of said attachment fastener pocket being at a higher elevation in said vertical dimension compared to said lower section of said attachment fastener pocket, and wherein said upper section of said attachment fastener pocket is wider in said lateral dimension than said lower section of said attachment fastener pocket.

93. The rail assembly of any of Paragraphs 62-92, wherein a ratio of a maximum width of said rail to a maximum height of said rail is at least 2.6.

94. A rail assembly attachable to a building surface, comprising:

a rail comprising: 1) a rail top and a rail bottom that are spaced from one another in a vertical dimension; and 2) first and second rail sides that are spaced from one another in a lateral dimension, wherein said rail top comprises an attachment fastener slot that extends along an entire length of said rail that is within a longitudinal dimension that is orthogonal to said lateral dimension, and wherein said first rail side comprises a first rail channel that extends along said entire length of said rail;

an adapter comprising a coupling section and a mounting flange, wherein at least part of said coupling section is disposed within said first rail channel and said mounting flange is disposed beyond said first rail channel such that said coupling section within said first rail channel is located between said attachment fastener slot and said mounting flange in said lateral dimension, wherein said mounting flange comprises a first and second surfaces that are oppositely disposed and that are each planar, wherein said adapter further comprises a first projection that is adjacent to and protrudes relative to said first surface, wherein said first projection and said first surface face in a common direction and with said first projection being disposed between said rail and an entirety of said first surface in said lateral dimension.

95. The rail assembly of Paragraph 94, wherein said second rail side comprises a second rail channel that extends along said entire length of said rail, wherein said first and second rail channels are of a common configuration and are the mirror image of one another, wherein said attachment fastener slot is located between said first and second rail channels in said lateral dimension, and wherein said each of said first rail channel and second rail channel accommodate a slidable interconnection with said coupling section of said adapter.

96. The rail assembly of Paragraph 95, further comprising:

a first assembly configuration where a first coupling portion of said coupling section is slidably disposable in said first rail channel and said mounting flange is disposed beyond said first rail channel such that said first coupling portion within said first rail channel is located between said mounting flange and said attachment fastener slot in said lateral dimension; and a second assembly configuration where said first coupling portion is slidably disposable in said second rail channel and said mounting flange is disposed beyond said second rail channel such that said first coupling portion within said second rail channel is located between said mounting flange and said attachment fastener slot in said lateral dimension.

97. The rail assembly of any of Paragraphs 94-96, wherein said adapter comprises a one-piece body.

98. The rail assembly of any of Paragraphs 94-97, further comprising:

a first mounting configuration where: 1) a first coupling portion of said coupling section is disposed within said first rail channel in a first orientation relative to said rail; 2) said mounting flange is disposed beyond said first rail channel such that said first coupling portion within said first rail channel is located between said mounting flange and said attachment fastener slot in said lateral dimension; and 3) said mounting flange and a reference plane are separated by a first distance within said vertical dimension when said rail bottom is positioned on said reference plane; and a second mounting configuration where: 1) said first coupling portion is disposed within said first rail channel in a second orientation relative to said rail that is different from said first orientation; 2) said mounting flange is disposed beyond said first rail channel such that said first coupling portion within said first rail channel is located between said mounting flange and said attachment fastener slot in said lateral dimension; and 3) said mounting flange and said reference plane are separated by a second distance within said vertical dimension when said rail bottom is disposed on said reference plane, wherein said first distance is greater than said second distance.

99. The rail assembly of Paragraph 98, further comprising:

a building surface;

a mounting device attached to said building surface, wherein said rail assembly is disposed in said first mounting configuration, and wherein said mounting flange is positioned above said mounting device; and at least one fastener that secures said mounting flange to said mounting device.

100. The rail assembly of Paragraph 98, further comprising:

a building surface comprising a plurality of ribs, wherein each said rib comprises a flat upper end, wherein said rail assembly is disposed in said second mounting configuration, and wherein said mounting flange is positioned above said flat upper end of a first rib; and at least one fastener that secures said mounting flange to said first rib by passing through said flat upper end of said first rib.

101. The rail assembly of Paragraph 100, further comprising a seal disposed between said mounting flange and said flat upper end of said first rib.

102. The rail assembly of Paragraph 101, wherein said first projection engages said flat upper end of said first rib such that said mounting flange and said flat upper end of said first rib are maintained in spaced relation to one another.

103. The rail assembly of Paragraph 102, wherein said mounting flange and said flat upper end of said first rib are separated by a space of at least 0.050" measured within said vertical dimension.

104. The rail assembly of any of Paragraphs 102-103, wherein said mounting flange and said flat upper end of said rib are separated by a space of no more than about 0.055" measured within said vertical dimension.

105. The rail assembly of any of Paragraphs 98-104, wherein a ratio of said first distance to said second distance is at least about 10 for said rail, wherein said first distance is a distance between said reference plane to a closest surface of said mounting flange for said first mounting configuration, and wherein said second distance is a distance between said reference plane to a closest surface of said mounting flange for said second mounting configuration.

106. The rail assembly of Paragraphs 94-105, wherein said first surface of said mounting flange and an apex of said first projection are separated by a space of at least 0.050" measured within said vertical dimension.

107. The rail assembly of Paragraph 106, wherein said first surface of said mounting flange and said apex of said first projection are separated by a space of no more than about 0.055" measured within said vertical dimension.

108. The rail assembly of any of Paragraphs 94-107, further comprising:

a first pocket having a closed perimeter and that extends along said entire length of said rail;

a second pocket having a closed perimeter and that extends along said entire length of said rail; and a third pocket that is disposed between said first pocket and said second pocket in said lateral dimension and that extends along said entire length of said rail, wherein said attachment fastener slot extends to and intersects said third pocket.

109. The rail assembly of Paragraph 108, wherein said first pocket is located between said first rail side and said third pocket in said lateral dimension, and wherein said second pocket is located between said second rail side and said third pocket in said lateral dimension.

110. The rail assembly of any of Paragraphs 108-109, wherein a first rail bottom portion of said rail bottom defines a lower extreme of said first pocket, wherein a second rail bottom portion of said rail bottom defines a lower extreme of said second pocket, wherein a third rail bottom portion of said rail bottom defines a lower extreme of said third pocket, and wherein a lower surface of said third rail bottom portion is recessed in a direction of said rail top relative to a lower surface of each of said first and second rail bottom portions.

111. The rail assembly of Paragraph 110, further comprising:

a first wall between said first pocket and said third pocket; and a second wall between said second pocket and said third pocket, wherein an upper surface of said third rail bottom portion is convex proceeding from an intersection with said first wall to an intersection with said second wall, wherein at least part of an upper surface of said first rail bottom portion is convex relative to said first pocket, and wherein at least part of an upper surface of said second rail bottom portion is convex relative to said second pocket.

112. The rail assembly of any of Paragraphs 110-111, further comprising a seal within a recess defined by said third rail bottom portion being recessed in a direction of said rail top relative to each of said first and second rail bottom portions.

113. The rail assembly of any of Paragraphs 108-112, wherein said rail top further comprises first and second cutouts that intersect said attachment fastener slot to collectively define a rail mounting fastener access through said rail top, wherein an effective diameter of said rail mounting fastener access is larger than a width of an entirety of said attachment fastener slot outside of said rail mounting fastener access, wherein said rail assembly further comprises:

a threaded rail mounting fastener, where a maximum diameter of said threaded rail mounting fastener is less than said effective diameter of said rail mounting fastener access.

114. The rail assembly of any of Paragraphs 108-113, wherein said third pocket comprises upper and lower sections, wherein said attachment fastener slot extends to said upper section such that said upper section is located between said attachment fastener slot and said lower section in said vertical dimension, and wherein said upper section and said lower section are of different widths.

115. The rail assembly of Paragraph 114, wherein said upper section is of a first width, wherein said lower section is of a second width, and wherein said second width is of a smaller magnitude than said first width.

116. The rail assembly of Paragraph 115, further comprising an attachment fastener that is movable along said attachment fastener slot in said longitudinal dimension and that comprises a first head, a threaded shaft, and a second head, wherein at least one of said first and said second heads is rotatable relative to said shaft, wherein said shaft extends through said attachment fastener slot and said first head is disposed beyond said rail top, wherein said second head comprises a flange and a body, wherein said flange is disposed and retained within said upper section of said third pocket, and wherein said body is disposed within said lower section of said third pocket.

117. The rail assembly of any of Paragraphs 108-116, further comprising:

a first groove on said rail top that extends along said entire length of said rail in alignment with said first pocket within said vertical dimension; and a second groove on said rail top that extends along said entire length of said rail in alignment with said second pocket within said vertical dimension.

118. The rail assembly of Paragraph 117, further comprising a self-tapping screw that extends through said rail top within said first groove and that terminates within said first pocket.

119. The rail assembly of any of Paragraphs 94-107:

wherein said rail top further comprises first and second cutouts that intersect said attachment fastener slot to collectively define a rail mounting fastener access through said rail top, wherein an effective diameter of said rail mounting fastener access is larger than a width of an entirety of said attachment fastener slot outside of said rail mounting fastener access;

wherein said rail bottom comprises first, second, and third rail bottom portions, wherein said third rail bottom portion is located between said first and second rail bottom portions in said lateral dimension; and wherein said rail further comprises an attachment fastener pocket that is located between said first rail side and said second rail side in said lateral dimension, wherein said attachment fastener pocket extends along said entire length of said rail, wherein said attachment fastener slot extends to and intersects said attachment fastener pocket, wherein a lower extreme of said attachment fastener pocket is defined by said third rail bottom portion, and wherein a lower surface of said third rail bottom portion is recessed in a direction of said rail top relative to a lower surface of each of said first and second rail bottom portions; and a threaded rail mounting fastener, where a maximum diameter of said threaded rail mounting fastener is less than said effective diameter of said rail mounting fastener access.

120. The rail assembly of Paragraph 119, further comprising:
a building surface, wherein at least part of said rail bottom is positioned directly on said building surface, and wherein said threaded rail mounting fastener extends through said third rail bottom portion in alignment with said rail mounting fastener access and also through an aligned portion of said building surface.

121. The rail assembly of Paragraph 120, wherein said building surface comprises a first rib with a flat upper end, wherein said rail intersects a length dimension of said first rib, and wherein said threaded rail mounting fastener extends through said third rail bottom portion in alignment with said rail mounting fastener access and also through said flat upper end of said first rib.

122. The rail assembly of any of Paragraphs 119-121, further comprising a seal within a recess defined by said third rail bottom portion being recessed in a direction of said rail top relative to each of said first and second rail bottom portions, wherein said threaded rail mounting fastener also extends through said seal.

123. The rail assembly of any of Paragraphs 94-107, wherein said rail comprises an attachment fastener pocket, wherein said attachment fastener slot extends to and intersects said attachment fastener pocket, said rail assembly further comprising:
an attachment fastener that is movable along said attachment fastener slot in said longitudinal dimension and that comprises a first head, a threaded shaft, and a second head, wherein at least one of said first and said second heads is rotatable relative to said shaft, wherein said shaft extends through said attachment fastener slot and said first head is disposed beyond said rail top, wherein said second head comprises a flange and a body, wherein said flange is disposed and retained within an upper section of said attachment fastener pocket, wherein said body is disposed within a lower section of said attachment fastener pocket and with said upper section of said attachment fastener pocket being at a higher elevation in said vertical dimension compared to said lower section of said attachment fastener pocket, and wherein said upper section of said attachment fastener pocket is wider in said lateral dimension than said lower section of said attachment fastener pocket.

124. The rail assembly of any of Paragraphs 94-123, wherein a ratio of a maximum width of said rail to a maximum height of said rail is at least 2.6.

125. A rail assembly attachable to a building surface, wherein said rail assembly comprises a rail that in turn comprises a one-piece body, wherein said one-piece body comprises:
a rail top comprising an attachment fastener slot that extends along an entire length of said one-piece body that is within a longitudinal dimension;
a rail bottom that is spaced from said rail top in a vertical dimension;
a first rail side comprising a first rail channel that extends along said entire length of said one-piece body;
a second rail side comprising a second rail channel that extends along said entire length of said one-piece body, wherein said first and second rail sides are spaced from one another in a lateral dimension that is orthogonal to said longitudinal dimension;
a first pocket having a closed perimeter and that extends along said entire length of said one-piece body, wherein a first rail bottom portion of said rail bottom defines a lower extreme of said first pocket;
a second pocket having a closed perimeter and that extends along said entire length of said one-piece body, wherein a second rail bottom portion of said rail bottom defines a lower extreme of said second pocket; and
a third pocket that is disposed between said first pocket and said second pocket in said lateral dimension and that extends along said entire length of said one-piece body, wherein said attachment fastener slot extends to and intersects said third pocket, wherein a third rail bottom portion of said rail bottom defines a lower extreme of said third pocket, and wherein a lower surface of said third rail bottom portion is recessed in a direction of said rail top relative to a lower surface of each of said first and second rail bottom portions;
wherein said first rail channel is adjacent to but isolated from said first pocket, and wherein said second rail channel is adjacent to but isolated from said second pocket.

126. The rail assembly of Paragraph 125, further comprising:
a first wall between said first pocket and said third pocket; and
a second wall between said second pocket and said third pocket, wherein an upper surface of said third rail bottom portion is convex proceeding from an intersection with said first wall to an intersection with said second wall, wherein at least part of an upper surface of said first rail bottom portion is convex relative to said first pocket, and wherein at least part of an upper surface of said second rail bottom portion is convex relative to said second pocket.

127. The rail assembly of any of Paragraphs 125-126, further comprising a seal within a recess defined by said third rail bottom portion being recessed in a direction of said rail top relative to each of said first and second rail bottom portions.

128. The rail assembly of any of Paragraphs 125-126, wherein said rail top further comprises first and second cutouts that intersect said attachment fastener slot to collectively define a rail mounting fastener access through said rail top, wherein an effective diameter of said rail mounting fastener access is larger than a width of an entirety of said attachment fastener slot outside of said rail mounting fastener access, wherein said rail assembly further comprises:

a threaded rail mounting fastener, where a maximum diameter of said threaded rail mounting fastener is less than said effective diameter of said rail mounting fastener access.

129. The rail assembly of Paragraph 128, further comprising:
a building surface, wherein at least part of said rail bottom is positioned directly on said building surface, and wherein said threaded rail mounting fastener extends through said third rail bottom portion in alignment with said rail mounting fastener access and also through an aligned portion of said building surface.

130. The rail assembly of Paragraph 129, wherein said building surface comprises a first rib with a flat upper end, wherein said rail intersects a length dimension of said first rib, and wherein said threaded rail mounting fastener extends through said third rail bottom portion in alignment with said rail mounting fastener access and also through said flat upper end of said first rib.

131. The rail assembly of any of Paragraphs 128-130, further comprising a seal within a recess defined by said third rail bottom portion being recessed in a direction of said rail top relative to each of said first and second rail bottom portions, wherein said threaded rail mounting fastener also extends through said seal.

132. The rail assembly of any of Paragraphs 125-131, wherein said third pocket comprises upper and lower sections, wherein said attachment fastener slot extends to said upper section such that said upper section is located between said attachment fastener slot and said lower section in said vertical dimension, and wherein said upper section and said lower section are of different widths.

133. The rail assembly of Paragraph 132, wherein said upper section is of a first width, wherein said lower section is of a second width, and wherein said second width is of a smaller magnitude than said first width.

134. The rail assembly of Paragraph 133, further comprising an attachment fastener that is movable along said attachment fastener slot in said longitudinal dimension and that comprises a first head, a threaded shaft, and a second head, wherein at least one of said first and said second heads is rotatable relative to said shaft, wherein said shaft extends through said attachment fastener slot and said first head is disposed beyond said rail top, wherein said second head comprises a flange and a body, wherein said flange is disposed and retained within said upper section of said third pocket, and wherein said body is disposed within said lower section of said third pocket.

135. The rail assembly of any of Paragraphs 125-134, further comprising:
a first groove on said rail top that extends along said entire length of said rail in alignment with said first pocket within said vertical dimension; and
a second groove on said rail top that extends along said entire length of said rail in alignment with said second pocket within said vertical dimension.

136. The rail assembly of Paragraph 135, further comprising a self-tapping screw that extends through said rail top within said first groove and that terminates within said first pocket.

137. The rail assembly of any of Paragraphs 125-136, wherein a ratio of a maximum width of said rail to a maximum height of said rail is at least 2.6.

138. The rail assembly of any of Paragraphs 125-133, further comprising an attachment fastener that is movable along said attachment fastener slot in said longitudinal dimension and that comprises a first head, a threaded shaft, and a second head, wherein at least one of said first and said second heads is rotatable relative to said shaft, wherein said shaft extends through said attachment fastener slot and said first head is disposed beyond said rail top, wherein said second head is disposed within said third pocket.

139. The rail assembly of any of Paragraphs 125-138, wherein said first and second rail channels are of a common configuration and are the mirror image of one another.

140. The rail assembly of any of Paragraphs 125-139, further comprising:
an adapter comprising a coupling section and a mounting flange.

141. The rail assembly of Paragraph 140, wherein said adapter comprises a one-piece body.

142. The rail assembly of any of Paragraphs 140-141, further comprising:
a first assembly configuration where a first coupling portion of said coupling section is slidably disposable in said first rail channel and said mounting flange is disposed beyond said first rail channel such that said first coupling portion within said first rail channel is located between said mounting flange and said attachment fastener slot in said lateral dimension; and
a second assembly configuration where said first coupling portion is slidably disposable in said second rail channel and said mounting flange is disposed beyond said second rail channel such that said first coupling portion within said second rail channel is located between said mounting flange and said attachment fastener slot in said lateral dimension.

143. The rail assembly of any of Paragraphs 140-142, further comprising:
a first mounting configuration where: 1) a first coupling portion of said coupling section is disposed within said first rail channel in a first orientation relative to said rail; 2) said mounting flange is disposed beyond said first rail channel such that said first coupling portion within said first rail channel is located between said mounting flange and said attachment fastener slot in said lateral dimension; and 3) said mounting flange and a reference plane are separated by a first distance within said vertical dimension when said rail bottom is positioned on said reference plane; and
a second mounting configuration where: 1) said first coupling portion is disposed within said first rail channel in a second orientation relative to said rail that is different from said first orientation; 2) said mounting flange is disposed beyond said first rail channel such that said first coupling portion within said first rail channel is located between said mounting flange and said attachment fastener slot in said lateral dimension; and 3) said mounting flange and said reference plane are separated by a second distance within said vertical dimension when said rail bottom is disposed on said reference plane, wherein said first distance is greater than said second distance.

144. The rail assembly of Paragraph 143, further comprising:
a building surface;
a mounting device attached to said building surface, wherein said rail assembly is disposed in said first mounting configuration, and wherein said mounting flange is positioned above said mounting device; and
at least one fastener that secures said mounting flange to said mounting device.

145. The rail assembly of Paragraph 143, further comprising:
a building surface comprising a plurality of ribs, wherein each said rib comprises a flat upper end, wherein said rail assembly is disposed in said second mounting configuration, and wherein said mounting flange is positioned above said flat upper end of a first rib; and
at least one fastener that secures said mounting flange to said first rib by passing through said flat upper end of said first rib.

146. The rail assembly of Paragraph 145, further comprising a seal disposed between said mounting flange and said flat upper end of said first rib.

147. The rail assembly of Paragraph 146, wherein said adapter comprises a first projection that engages said flat upper end of said first rib such that said mounting flange and said flat upper end of said first rib are maintained in spaced relation to one another.

148. The rail assembly of Paragraph 147, wherein said mounting flange and said flat upper end of said first rib are separated by a space of at least 0.050" measured within said vertical dimension.

149. The rail assembly of any of Paragraphs 147-148, wherein said mounting flange and said flat upper end of said rib are separated by a space of no more than about 0.055" measured within said vertical dimension.

150. The rail assembly of any of Paragraphs 143-149, wherein a ratio of said first distance to said second distance is at least about 10 for said rail, wherein said first distance is a distance between said reference plane to a closest surface of said mounting flange for said first mounting configuration, and wherein said second distance is a distance between said reference plane to a closest surface of said mounting flange for said second mounting configuration.

151. The rail assembly of any of Paragraphs 140-150, wherein said first rail channel is defined in part by first and second rail lips that are separated by a first slot that leads into said first rail channel, wherein said coupling section comprises an inner coupling section disposed within said first rail channel, wherein said coupling section of said adapter further comprises an outer coupling section that is spaced from said inner coupling section such that each of said first and second rail lips are captured between said inner coupling section and said outer coupling section, wherein said mounting flange extends from said outer coupling section at a location that is between first and second ends of said outer coupling section that are spaced from one another in said vertical dimension such that said mounting flange is offset from each of said first and second ends of said outer coupling section in said vertical dimension, and wherein said coupling section is located between said mounting flange and said attachment fastener slot in said lateral dimension.

152. The rail assembly of any of Paragraphs 140-151, wherein said mounting flange comprises first and second surfaces that are oppositely disposed and that are each planar, wherein said adapter further comprises a first projection that is adjacent to and protrudes relative to said first surface, wherein said first projection and said first surface face in a common direction and with said first projection being disposed between said rail and an entirety of said first surface in said lateral dimension.

153. The rail assembly of Paragraph 152, wherein said first surface of said mounting flange and an apex of said first projection are separated by a space of at least 0.050" measured within said vertical dimension.

154. The rail assembly of any of Paragraphs 152-153, wherein said first surface of said mounting flange and an apex of said first projection are separated by a space of no more than about 0.055" measured within said vertical dimension.

155. A rail assembly attachable to a building surface, wherein said rail assembly comprises a rail that in turn comprises a one-piece body, wherein said one-piece body comprises:
a rail top comprising: 1) an attachment fastener slot that extends along an entire length of said one-piece body that is within a longitudinal dimension; and 2) first and second cutouts that intersect said attachment fastener slot to collectively define a rail mounting fastener access through said rail top, wherein an effective diameter of said rail mounting fastener access is larger than a width of an entirety of said attachment fastener slot outside of said rail mounting fastener access;
a rail bottom that is spaced from said rail top in a vertical dimension and that comprises first, second, and third rail bottom portions;
a first rail side comprising a first rail channel that extends along said entire length of said one-piece body;
a second rail side comprising a second rail channel that extends along said entire length of said one-piece body, wherein said first and second rail sides are spaced in a lateral dimension that is orthogonal to said longitudinal dimension, and wherein said third rail bottom portion is located between said first and second rail bottom portions in said lateral dimension;
a pocket that is located between said first rail channel and said second rail channel in said lateral dimension, wherein said pocket is isolated from each of said first and second rail channels, wherein said pocket extends along said entire length of said one-piece body, wherein said attachment fastener slot extends to and intersects said pocket, wherein a lower extreme of said pocket is defined by said third rail bottom portion, and wherein a lower surface of said third rail bottom portion is recessed in a direction of said rail top relative to a lower surface of each of said first and second rail bottom portions; and
wherein said rail assembly further comprises a threaded rail mounting fastener, where a maximum diameter of said threaded attachment fastener is less than said effective diameter of said attachment fastener access.

156. The rail assembly of Paragraph 155, wherein said first and second rail channels are of a common configuration and are the mirror image of one another.

157. The rail assembly of any of Paragraphs 155-156, further comprising:
a first pocket having a closed perimeter and that extends along said entire length of said rail;
a second pocket having a closed perimeter and that extends along said entire length of said rail, wherein said pocket is a third pocket that is disposed between said first pocket and said second pocket in said lateral dimension and that extends along said entire length of said rail.

158. The rail assembly of Paragraph 157, wherein said first pocket is located between said first rail side and said third pocket in said lateral dimension, and wherein said second pocket is located between said second rail side and said third pocket in said lateral dimension.

159. The rail assembly of any of Paragraphs 157-158, wherein said first rail bottom portion defines a lower extreme of said first pocket, wherein said second rail bottom portion defines a lower extreme of said second pocket, and wherein said third rail bottom portion defines a lower extreme of said third pocket.

160. The rail assembly of Paragraph 159, further comprising:
a first wall between said first pocket and said third pocket; and
a second wall between said second pocket and said third pocket, wherein an upper surface of said third rail bottom portion is convex proceeding from an intersection with said first wall to an intersection with said second wall, wherein at least part of an upper surface of said first rail bottom portion is convex relative to said first pocket, and wherein at least part of an upper surface of said second rail bottom portion is convex relative to said second pocket.

161. The rail assembly of any of Paragraphs 159-160, further comprising a seal within a recess defined by said third rail bottom portion being recessed in a direction of said rail top relative to each of said first and second rail bottom portions.

162. The rail assembly of any of Paragraphs 157-161, wherein said third pocket comprises upper and lower sections, wherein said attachment fastener slot extends to said upper section such that said upper section is located between said attachment fastener slot and said lower section in said vertical dimension, and wherein said upper section and said lower section are of different widths.

163. The rail assembly of Paragraph 162, wherein said upper section is of a first width, wherein said lower section is of a second width, and wherein said second width is of a smaller magnitude than said first width.

164. The rail assembly of Paragraph 163, further comprising an attachment fastener that is movable along said attachment fastener slot in said longitudinal dimension and that comprises a first head, a threaded shaft, and a second head, wherein at least one of said first and said second heads is rotatable relative to said shaft, wherein said shaft extends through said attachment fastener slot and said first head is disposed beyond said rail top, wherein said second head comprises a flange and a body, wherein said flange is disposed and retained within said upper section of said third pocket, and wherein said body is disposed within said lower section of said third pocket.

165. The rail assembly of any of Paragraphs 157-164, further comprising:
a first groove on said rail top that extends along said entire length of said rail in alignment with said first pocket within said vertical dimension; and
a second groove on said rail top that extends along said entire length of said rail in alignment with said second pocket within said vertical dimension.

166. The rail assembly of Paragraph 165, further comprising a self-tapping screw that extends through said rail top within said first groove and that terminates within said first pocket.

167. The rail assembly of any of Paragraphs 155-163, further comprising:
an attachment fastener that is movable along said attachment fastener slot in said longitudinal dimension and that comprises a first head, a threaded shaft, and a second head, wherein at least one of said first and said second heads is rotatable relative to said shaft, wherein said shaft extends through said attachment fastener slot and said first head is disposed beyond said rail top, wherein said second head comprises a flange and a body, wherein said flange is disposed and retained within an upper section of said pocket, and wherein said body is disposed within a lower section of said pocket.

168. The rail assembly of any of Paragraphs 155-167, wherein a ratio of a maximum width of said rail to a maximum height of said rail is at least 2.6.

169. The rail assembly of any of Paragraphs 155-168, further comprising:
an adapter comprising a coupling section and a mounting flange.

170. The rail assembly of Paragraph 169, wherein said adapter comprises a one-piece body.

171. The rail assembly of any of Paragraphs 169-170, further comprising:
a first assembly configuration where a first coupling portion of said coupling section is slidably disposable in said first rail channel and said mounting flange is disposed beyond said first rail channel such that said first coupling portion within said first rail channel is located between said mounting flange and said attachment fastener slot in said lateral dimension; and
a second assembly configuration where said first coupling portion is slidably disposable in said second rail channel and said mounting flange is disposed beyond said second rail channel such that said first coupling portion within said second rail channel is located between said mounting flange and said attachment fastener slot in said lateral dimension.

172. The rail assembly of any of Paragraphs 169-171, further comprising:
a first mounting configuration where: 1) a first coupling portion of said coupling section is disposed within said first rail channel in a first orientation relative to said rail; 2) said mounting flange is disposed beyond said first rail channel such that said first coupling portion within said first rail channel is located between said mounting flange and said attachment fastener slot in said lateral dimension; and 3) said mounting flange and a reference plane are separated by a first distance within said vertical dimension when said rail bottom is positioned on said reference plane; and
a second mounting configuration where: 1) said first coupling portion is disposed within said first rail channel in a second orientation relative to said rail that is different from said first orientation; 2) said mounting flange is disposed beyond said first rail channel such that said first coupling portion within said first rail channel is located between said mounting flange and said attachment fastener slot in said lateral dimension; and 3) said mounting flange and said reference plane are separated by a second distance within said vertical dimension when said rail bottom is disposed on said reference plane, wherein said first distance is greater than said second distance.

173. The rail assembly of Paragraph 172, further comprising:
a building surface;
a mounting device attached to said building surface, wherein said rail assembly is disposed in said first mounting configuration, and wherein said mounting flange is positioned above said mounting device; and
at least one fastener that secures said mounting flange to said mounting device.

174. The rail assembly of Paragraph 172, further comprising:
a building surface comprising a plurality of ribs, wherein each said rib comprises a flat upper end, wherein said rail assembly is disposed in said second mounting configuration, and wherein said mounting flange is positioned above said flat upper end of a first rib; and at least one fastener that secures said mounting flange to said first rib by passing through said flat upper end of said first rib.

175. The rail assembly of Paragraph 174, further comprising a seal disposed between said mounting flange and said flat upper end of said first rib.
176. The rail assembly of Paragraph 175, wherein said adapter comprises a first projection that engages said flat upper end of said first rib such that said mounting flange and said flat upper end of said first rib are maintained in spaced relation to one another.
177. The rail assembly of Paragraph 176, wherein said mounting flange and said flat upper end of said first rib are separated by a space of at least 0.050" measured within said vertical dimension.
178. The rail assembly of any of Paragraphs 176-177, wherein said mounting flange and said flat upper end of said rib are separated by a space of no more than about 0.055" measured within said vertical dimension.
179. The rail assembly of any of Paragraphs 172-178, wherein a ratio of said first distance to said second distance is at least about 10 for said rail, wherein said first distance is a distance between said reference plane to a closest surface of said mounting flange for said first mounting configuration, and wherein said second distance is a distance between said reference plane to a closest surface of said mounting flange for said second mounting configuration.
180. The rail assembly of any of Paragraphs 169-179, wherein said first rail channel is defined in part by first and second rail lips that are separated by a first slot that leads into said first rail channel, wherein said coupling section comprises an inner coupling section disposed within said first rail channel, wherein said coupling section of said adapter further comprises an outer coupling section that is spaced from said inner coupling section such that each of said first and second rail lips are captured between said inner coupling section and said outer coupling section, wherein said mounting flange extends from said outer coupling section at a location that is between first and second ends of said outer coupling section that are spaced from one another in said vertical dimension such that said mounting flange is offset from each of said first and second ends of said outer coupling section in said vertical dimension, and wherein said coupling section is located between said mounting flange and said attachment fastener slot in said lateral dimension.
181. The rail assembly of any of Paragraphs 169-180, wherein said mounting flange comprises first and second surfaces that are oppositely disposed and that are each planar, wherein said adapter further comprises a first projection that is adjacent to and protrudes relative to said first surface, wherein said first projection and said first surface face in a common direction and with said first projection being disposed between said rail and an entirety of said first surface in said lateral dimension.
182. The rail assembly of Paragraph 181, wherein said first surface of said mounting flange and an apex of said first projection are separated by a space of at least 0.050" measured within said vertical dimension.
183. The rail assembly of any of Paragraphs 181-182, wherein said first surface of said mounting flange and an apex of said first projection are separated by a space of no more than about 0.055" measured within said vertical dimension.

184. A method of installing a rail assembly on a building surface, comprising:
disposing a rail on said building surface, said rail comprising: 1) a rail top and a rail bottom that are spaced from one another in a vertical dimension; and 2) first and second rail sides that are spaced from one another in a lateral dimension, wherein said rail top comprises an attachment fastener slot that extends along an entire length of said rail that is within a longitudinal dimension that is orthogonal to said lateral dimension, and wherein said first rail side comprises a first rail channel that extends along said entire length of said rail;
selecting between a first mounting configuration and a second mounting configuration that each require an adapter to be slidably interconnected with said first rail channel, wherein said adapter comprises a mounting flange that is disposed beyond said first rail channel when said adapter is slidably interconnected with said first rail channel, wherein said first mounting configuration requires said adapter to be in a first orientation relative to said rail and where said mounting flange is secured to a mounting device that in turn is secured relative to said building surface, and wherein said second mounting configuration requires said adapter to be in a second orientation relative to said rail and where said mounting flange is secured directly to said building surface, and wherein said first and second orientations for said adapter are different; and
positioning said adapter relative to said building surface using a selected one of said first mounting configuration and said second mounting configuration.

BRIEF DESCRIPTION OF THE FIGURES

FIG. 8A is a perspective view of the insert used by the mounting device in FIG. 2.

FIG. 8B is an end view of the insert of FIG. 8A.

FIG. 8C is a side view of the insert of FIG. 8A.

FIG. 9A is an end view of the insert positioned within a variation of the mounting body for the mounting device in FIG. 2, prior to activation of the clamping fastener(s).

FIG. 9B is an end view of the insert positioned within a variation of the mounting body for the mounting device in FIG. 2, after activation of the clamping fastener(s).

FIG. 15A is an end view of the rail of FIG. 13A, using one fastener configuration for securing an attachment relative to the rail.

FIG. 18A is a side view of the adapter for the mounting configuration shown in FIG. 17A.

FIG. 18B is a side view of the adapter from FIG. 17A and the rail of FIG. 13A, but with the adapter being in an inverted position relative to the rail to provide another embodiment of a mounting configuration for securing the rail relative to a building surface.

FIG. 18C is a top view of the adapter shown in FIG. 17A, where the adapter incorporates an elongated mounting slot.

FIG. 18D is a top view of the adapter shown in FIG. 17A, where the adapter incorporates a pair of mounting holes.

DETAILED DESCRIPTION

Figure 1:
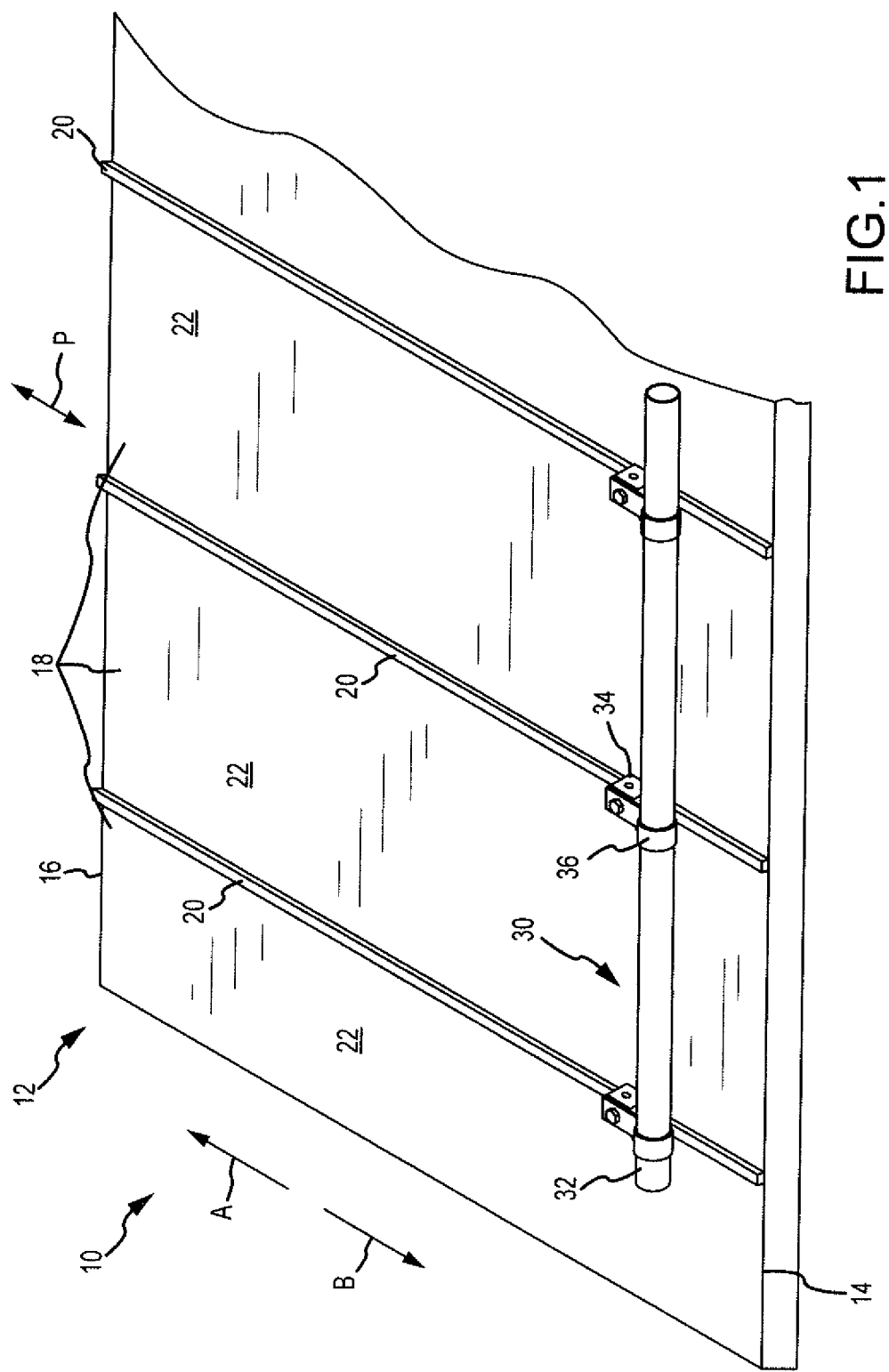
FIG. 1 is a perspective view of one type of an attachment (in the form of a cross member assembly for snow retention) installed on a building/roofing surface.

FIG. 1 presents one embodiment of what may be referred to as a building or roofing system 10 (hereafter "roofing system 10"). The system 10 includes a cross member assembly 30 that is installed on a building/roofing surface 12 (e.g., to provide a snow retention function). Only a portion of the building surface 12 is illustrated in FIG. 1. The building surface 12 may be of any appropriate type (e.g., a siding or roofing surface of a building) and may be defined in any appropriate manner (e.g., by a plurality of interconnected metal panels). In the illustrated embodiment, the building surface 12 is in the form of a roofing surface 12. In this regard, the roofing surface 12 has a pitch P (a slope or incline, the direction or orientation of which is indicated by the double-headed arrow in FIG. 1). As used herein, the arrow A identifies the direction of increasing slope (e.g., the "uphill" direction, the direction of increasing elevation along the roofing surface 12, or the up-slope direction). Conversely, the arrow B identifies the direction of decreasing slope (e.g., the "downhill" direction, the direction of decreasing elevation along the roofing surface 12, or the down-slope direction).

Generally, the roofing surface 12 may be defined in any appropriate manner and may be of any appropriate configuration. For instance, the roofing surface 12 may include one or more roofing sections, each of which may be of any appropriate pitch/slope and/or shape. The cross member assembly 30 may be installed at any appropriate location on the roofing surface 12 and in any appropriate manner, and furthermore the cross member assembly 30 may be of any appropriate length. Multiple cross member assemblies 30 may be used and disposed in any appropriate arrangement.

The roofing surface 12 illustrated in FIG. 1 is but one representative configuration that may be utilized by the roofing system 10. The roofing surface 12 may be of any pitch, but at least generally slopes downwardly in a direction denoted by arrow B in FIG. 1 from a peak 16 of the roofing surface 12 to an edge 14 of the roofing surface 12. Multiple panels 18 (e.g., metal panels) collectively define the roofing surface 12. The interconnection of each adjacent pair of panels 18 in the illustrated embodiment defines what may be characterized as a "panel joint." In the illustrated embodiment, the panel joint is in the form of a standing seam 20 (only schematically illustrated in FIG. 1).

The standing seams 20 may at least generally proceed in the direction of or along the slope or pitch P of the roofing surface 12 (e.g., the pitch of the length dimension of the standing seams 20 may match the pitch P of the corresponding portion of the roofing surface 12). Each panel 18 includes at least one base section 22 that is at least generally flat or planar and that is disposed between each adjacent pair of standing seams 20 on the roofing surface 12. Each panel 18 could include one or more crests, minor ribs, intermediate ribs, striations, fluting, or flutes between its corresponding pair of standing seams 20 so as to provide multiple base sections 22 on each panel 18 (not shown).

The panels 18 may be of any appropriate configuration so to allow them to be interconnected or nested in a manner that defines a standing seam 20, and the standing seams 20 may be disposed in any appropriate orientation relative to the base sections 22 of the panels 18 that define the standing seams 20. Generally, the standing seams 20 may be characterized as at least initially extending orthogonally (e.g., perpendicularly) relative to the base sections 22 of the corresponding panels 18. The illustrated standing seams 20 may be characterized as having a vertical end section, or as being of a vertical standing seam configuration. However, the end sections of the various standing seams 20 could also have portions that are horizontally disposed (e.g., at least generally parallel with the base sections 22 of the corresponding panels 18), or as being of a horizontal standing seam configuration.

The cross member assembly 30 is installed on the roofing surface 12. The cross member assembly 30 generally includes at least one mounting device 34, an adapter 36 for each mounting device 34, and a cross member 32 that extends through at least one adapter 36. That is, each adapter 36 is configured to receive at least a portion of the cross member 32. While the cross member 32 may provide the function of a snow retention device, or a structure that at least attempts to impede or retard the movement of snow and/or ice down the inclined roofing surface 12, the cross member 32 may provide any appropriate function or combination of functions. In any case, the adapter 36 and cross member 32 may be collectively referred to as an "attachment" that is interconnected with the roofing surface 12 by multiple mounting devices 34 in the illustrated embodiment. The mounting devices 34 may be used to install any appropriate type of attachment on the roofing surface 12.

Figure 2:
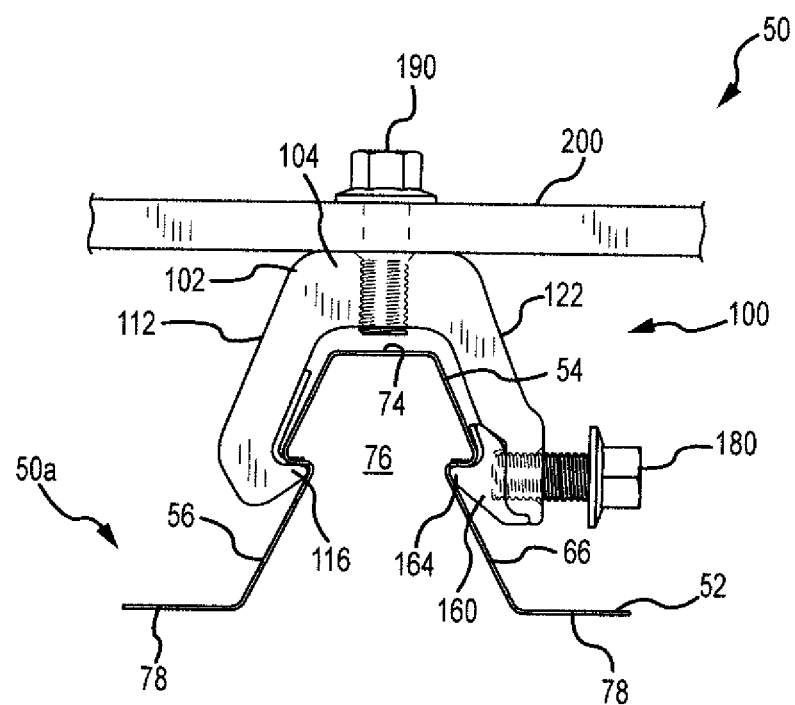
FIG. 2 is an end view of a building/roofing system that uses one embodiment of a mounting device, having a separate mounting body and insert, to interconnect an attachment to a rib of a building/roofing surface.

Another embodiment of a building/roofing system is illustrated in FIG. 2, is identified by reference numeral 50, and is also addressed in U.S. Pat. No. 9,085,900, which issued on Jul. 21, 2015, and the entire disclosure of which is incorporated by reference herein. The building/roofing system 50 includes at least one mounting device 100 and a building/roofing surface 50a. The building/roofing surface 50a may be defined by a plurality of panels 52 that are interconnected in any appropriate manner (e.g., one edge portion of one panel 52 may be "nested" or disposed in overlapping relation with an edge portion of another panel 52), with each panel 52 having at least one hollow rib 54. A hollow rib 54 may be defined by the interconnection of adjacent panels 52 of the panel assembly as well. Typically the building/roofing system 50 will utilize a plurality of mounting devices 100 to mount an attachment 200 of any appropriate type/configuration (e.g., a frame for equipment of any type; a walkway) to the building/roofing surface 50a.

The discussion presented above with regard to the building/roofing surface 12 is equally applicable to the building/roofing surface 50a. Generally, the attachment 200 is positioned directly on a mounting body 102 of the mounting device 100, and is secured thereto by one or more attachment fasteners 190 (e.g., a threaded member, such as a bolt having a threaded shaft and head).

Figure 3:
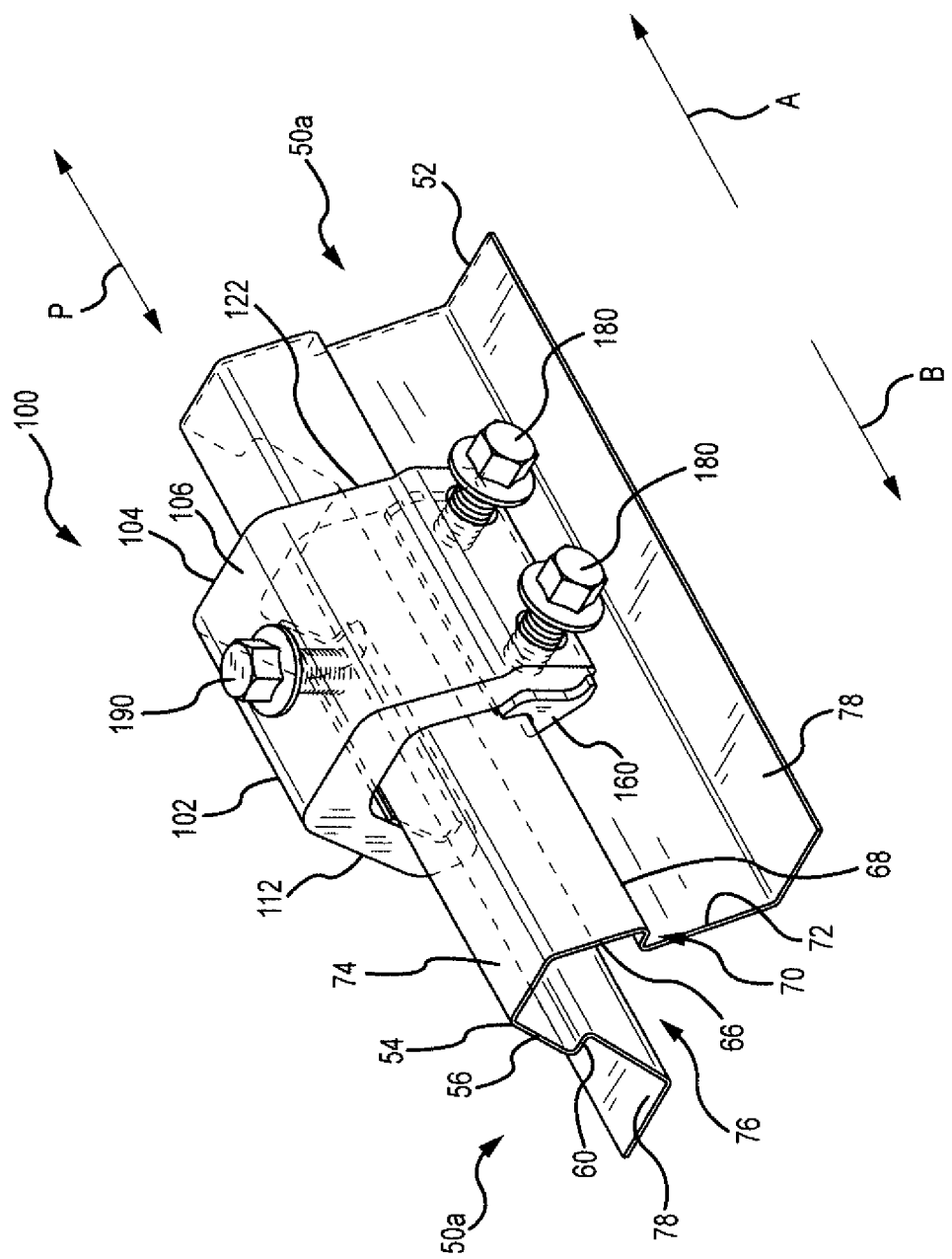
FIG. 3 is a perspective view of the mounting device and associated rib from the building/roofing system of FIG. 2.

FIG. 3 is a perspective view of the mounting device 100 and rib 54 from the building/roofing system 50 of FIG. 2. The length dimension of the various ribs 54 of the building/roofing surface 50a (coinciding with the length dimension of the corresponding panels 52) will typically be installed such that the length dimension of the ribs 54 will coincide with or define the pitch P when used as a roofing surface and as discussed above. Again, the arrow A identifies the direction of increasing slope for the roofing surface 50a (e.g., the "uphill" direction, the direction of increasing elevation along the roofing surface 50a, or the up-slope direction), while the arrow B identifies the direction of decreasing slope for the roofing surface 50a (e.g., the "downhill" direction, the direction of decreasing elevation along the roofing surface 50a, or the down-slope direction).

Figure 4:
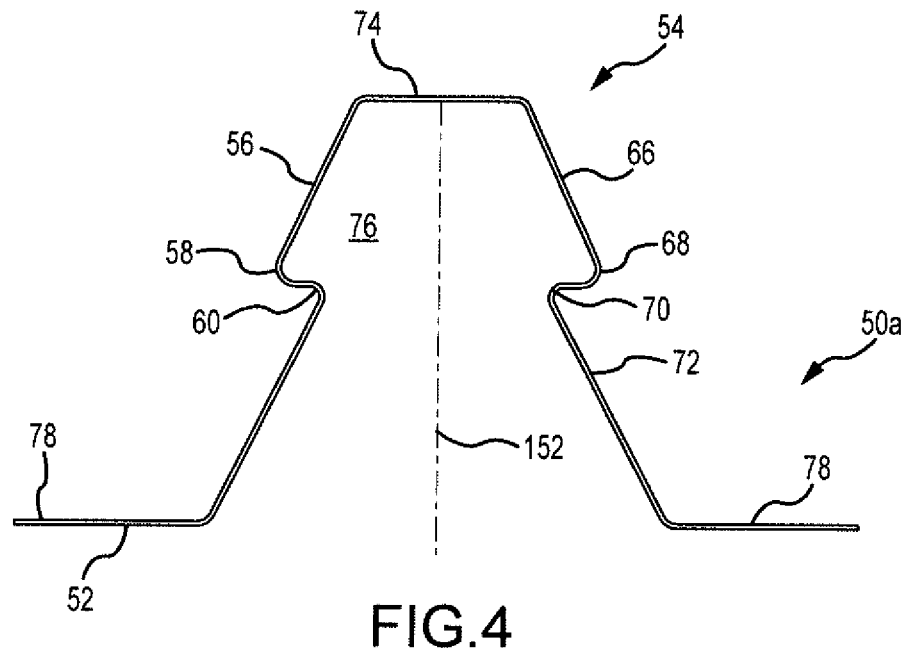
FIG. 4 is an enlarged end view of the rib from the building/roofing surface in FIG. 2.

FIG. 4 presents an enlarged end view of a rib 54 from the building/roofing surface 50a shown in FIGS. 2-3. The rib 54 (on which the mounting device 100 is installed) may be formed in the panel 52 in any appropriate manner. As noted, a rib 54 may be defined by interconnected panels 52. In any case, the panel 52 may be of any appropriate configuration and may be formed from any appropriate material or combination of materials (e.g., metal; metal alloy). Each panel 52 may include one or more ribs 54 and one or more base sections 78. The entirety of each base section 78 may be flat or planar. However, one or more small structures may be formed/shaped into one of more base sections 78 of a given panel 52, for instance one or more crests, minor ribs, intermediate ribs, pencil ribs, striations, fluting, flutes, or the like.

The rib 54 includes a first sidewall 56, a second sidewall 66, and an upper end or crown 74 that collectively define a hollow interior 76 for the rib 54. The hollow interior 76 may be in the form of a continuous open space. In one embodiment, the adjacentmost portions of the first sidewall 56 and second sidewall 66 (measured on the interior 76 of the hollow rib 54) are separated by an open space of at least about ½ inch. Generally, the first sidewall 56 and the second sidewall 66 are spaced from each other, and at least generally converge toward one another progressing from the adjacent base section 78 of the panel 52 to the upper end 74 of the rib 54 (the first and second sidewalls 56, 66 diverge relative to one another proceeding away from the upper end 74). The first sidewall 56 and the second sidewall 66 may be the mirror image of one another. In the illustrated embodiment, the upper end 74 of the rib 54 is a flat surface that is parallel to the pitch P of the roofing surface 50a or to a plane that defines the inclination of the roofing surface 50a.

The first sidewall 56 of the rib 54 may be characterized as including a projection 58. A recess 60 (e.g., a curved or arcuate surface that extends along the length of the rib 54) is disposed directly below the projection 58. Similarly, the second sidewall 66 of the rib 54 may be characterized as including a projection 68. A recess 70 (e.g., a curved or arcuate surface that extends along the length of the rib 54) is disposed directly below the projection 68. In one embodiment, the distance between the recesses 60, 70 is at least about ½ inch (measured within the interior 76). In any case, a transition section 72 of the second sidewall 66 extends from the recess 70 at least toward the corresponding base section 78 of the panel 52. In the illustrated embodiment, the transition section 72 is a flat surface that extends all the way from the recess 70 to the corresponding base section 78.

Additional views of the mounting device 100 are presented in FIGS. 5, 6, 7A, and 7B. The mounting device 100 may be installed on the rib 54, as well as on other hollow rib profiles. The mounting device 100 generally includes a mounting body 102 and a separate insert 160. The mounting body 102 may be formed from any appropriate material or combination of materials (e.g., a metal; a metal alloy), and may be formed in any appropriate manner (e.g., extrusion). In one embodiment, the mounting body 102 is of a one-piece or integral construction (e.g., lacking any joint or joints between adjacent components or portions of the mounting body 102).

The mounting body 102 for the mounting device 100 includes a base 104, a first leg 112, and a second leg 122 that collectively define a rib receptacle 150. The base 104, first leg 112, and second leg 122 are retained in a fixed position relative to one another. A reference plane 152 extends through this rib receptacle 150, and is oriented to contain both the height dimension and the length dimension of the rib 54 when the mounting device 100 is installed on the rib 54 (e.g., the reference plane 152 may be characterized as extending along the pitch P of the roofing surface 50a and perpendicularly to a reference plane that contains the base section(s) 78 of the panels 52 (or oriented perpendicularly to the pitch P)). A reference plane 154 may be positioned above the mounting device 100 and is perpendicular to the reference plane 152.

The base 104 of the mounting body 102 may be characterized as being disposed in overlying relation to the upper end 74 of the rib 54 when the mounting device 100 is installed on the rib 54. As shown in FIG. 2, the base 104 may actually be spaced from the upper end 74 of the rib 54 in the installed configuration. In any case, the base 104 may be characterized as having an upper section 106 and an oppositely disposed lower section 108. A threaded hole 110 is accessible via the upper section 106 of the base 104 (e.g., the threaded hole 110 may extend to the upper section 106, although a countersink could extend from the upper section 106 to the threaded hole 110). In the illustrated embodiment, the threaded hole 110 extends completely through the base 104 (i.e., the threaded hole 110 may extend from the upper section 106 to the lower section 108 of the base 104). More than one threaded hole 110 could be provided for the base 104. Generally, the threaded hole 110 is used to secure the attachment 200 to the mounting device 100 (e.g., FIG. 2; more specifically to clamp the attachment 200 against the upper section 106 of the base 104 using one or more threaded attachment fasteners 190). In the illustrated embodiment, the length dimension of each threaded hole 110 is contained within or is parallel to the reference plane 152.

The first leg 112 of the mounting body 102 may be characterized as extending from one side of the base 104, while the second leg 122 of the mounting body 102 may be characterized as extending from an opposite side of the base 104. In any case, the first leg 112 is disposed alongside at least an upper portion of the first sidewall 56 of the rib 54 when the mounting device 100 is installed on the rib 54. An included angle between the first leg 122 and the lower section 108 of the base 104 (measured within the rib receptacle 150) may be greater than 90° or in the form of an obtuse angle.

The first leg 112 of the mounting body 102 includes a free end 114 having a projection 116 (e.g., the first leg 112 may be characterized as a cantilever—being supported on only one end thereof (at the base 104)). The projection 116 may be defined by an arcuate or curved surface, and defines a pocket 118 on the inside surface of the first leg 112. A pad 120 having a higher coefficient of friction than the mounting body 102 may be positioned along the pocket 118, and may extend along the inside surface of the first leg 112 in the direction of the base 104 (e.g., FIGS. 9A and 9B).

The projection 116 for the first leg 112 may be characterized as extending at least generally in the direction in which the second leg 122 of the mounting body 102 is spaced from the first leg 112 of the mounting body 102 (or toward the reference plane 152), as extending at least generally in the direction in which the base 104 is spaced from the free end 114 of the first leg 112 (or toward the reference plane 154), or both. The projection 116 may be characterized as "pointing" both at least generally upwardly (or toward the reference plane 154) and toward the noted reference plane 152 when the mounting device 100 in installed on a rib 54 of the building/roofing surface 50a. In any case, the projection 116 is disposed within the recess 60 on the first sidewall 56 of the rib 54 (and directly below the projection 58 on the first sidewall 56 of the rib 54) when the mounting device 100 in installed on the rib 54 of the building/roofing surface 50a. Contact between the first leg 112 of the mounting body 102 and the rib 54 of the building/roofing surface 50a may be limited to the projection 116/pocket 118 and the recess 60/projection 58 (e.g., the remainder of the first leg 112 the mounting body 102 may be maintained in spaced relation to the rib 54).

The second leg 122 of the mounting body 102 is disposed alongside at least an upper portion of the second sidewall 66 of the rib 54 when the mounting device 100 is installed on the rib 54. A first section 124 of the second leg 122 extends from the base 104 in one orientation, while a second section 126 of the second leg 122 extends from the first section 124 in a different orientation. An included angle between the first section 124 of the second leg 122 and the lower section 108 of the base 104 (measured within the rib receptacle 150) may be greater than 90° or in the form of an obtuse angle. The second section 126 of the second leg 122 may be characterized as being disposed at least generally parallel with the reference plane 152.

The second leg 122 of the mounting body 102 is actually spaced from the second sidewall 66 of the rib 54 when the mounting device 100 is fully installed on the rib 54—no portion of the second leg 122 of the mounting body 102 contacts the second sidewall 66 of the rib 54 at this time. Instead, the insert 160 is used to contact the second sidewall 66 of the rib 54. The second leg 122 the mounting body 102 includes a number of features to accommodate the insert 160. One is that the inside or interior surface of the second leg 122 (that projects toward/interfaces with the rib receptacle 150) may be characterized as including an insert receptacle 128. An upper surface 130 and a side surface 132 collectively define this insert receptacle 128. Generally, the insert 160 may be positioned against the side surface 132 of the second leg 122 that collectively defines the insert receptacle 128 with the upper surface 130 (the insert 160 could also be positioned against the upper surface 130 (FIG. 9A), but is spaced therefrom in the FIG. 5 configuration), and a lip 179 of the insert 160 may be positioned within a recess 138 formed on a free end 134 of the second leg 122, all when the mounting body 102 and insert 160 have been positioned on the rib 54, but prior to activation of the clamping fasteners 180 (e.g., the FIG. 5 configuration).

The second leg 122 of the mounting body 102 may be characterized as a cantilever in that it is supported on only one end thereof—at its intersection with the base 104 (i.e., the second leg 122 includes the noted free end 134, which is spaced from the base 104). A rounded portion 136 is included on the free end 134 of the second leg 122. This rounded portion 136 defines at least part of the boundary for the recess 138 (which may receive the lip 179 of the insert 160). Moreover, this rounded portion 136 may be used to reposition the insert 160 during installation of the mounting device 100 on the rib 54.

A pair of threaded holes 140 extend completely through the second section 126 of the second leg 122 of the mounting body 102. The length dimension of each threaded hole 140 is identified by reference numeral 142, and is oriented orthogonally to the reference plane 152 in the illustrated embodiment. Each threaded hole 140 for the second leg 122 receives a single clamping fastener 180. Any appropriate number of threaded holes 140 may be incorporated by the second section 126 of the second leg 122 (including more than two threaded holes 140). Generally, one or more clamping fasteners 180 are directed through the second section 126 of the second leg 122, engage the insert 160, and move the insert 160 away from the second leg 122 when installing the mounting device 100 on a rib 54. As the insert 160 is engaged with the second sidewall 66 of the rib 54, this motion of the insert 160 may compress the rib 54 to a degree (in a lateral dimension coinciding with the dimension in which the first sidewall 56 of the rib 54 is spaced from its corresponding second sidewall 66).

Figure 5:
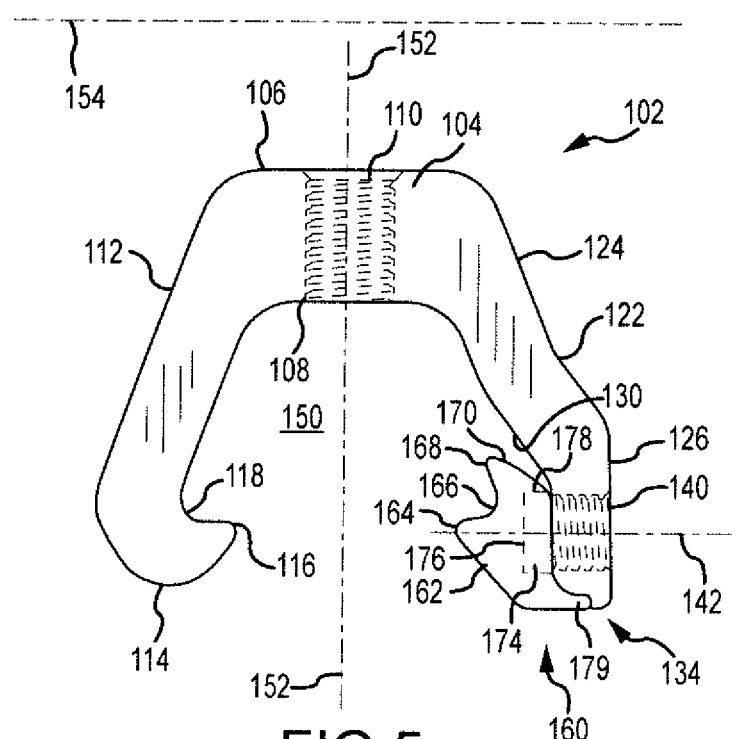
FIG. 5 is an enlarged end view of the mounting body and insert used by the mounting device in FIG. 2.
Figure 6:
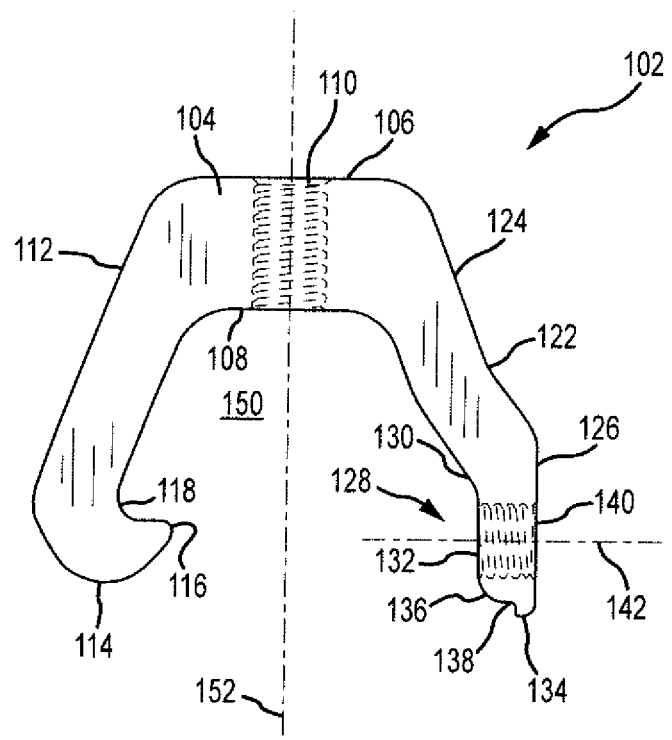
FIG. 6 is an enlarged end view of the mounting body used by the mounting device in FIG. 2.
Figure 7B:
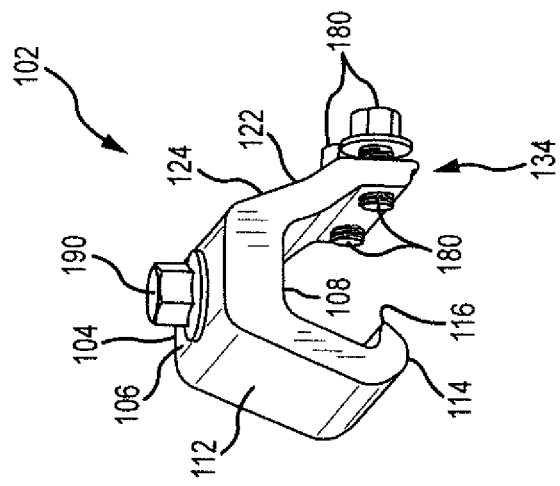
FIG. 7B is a perspective view of the mounting body used by the mounting device in FIG. 2, illustrating a pair of clamping fasteners and attachment fastener each being threadably engaged with the mounting body.
Figure 7A:
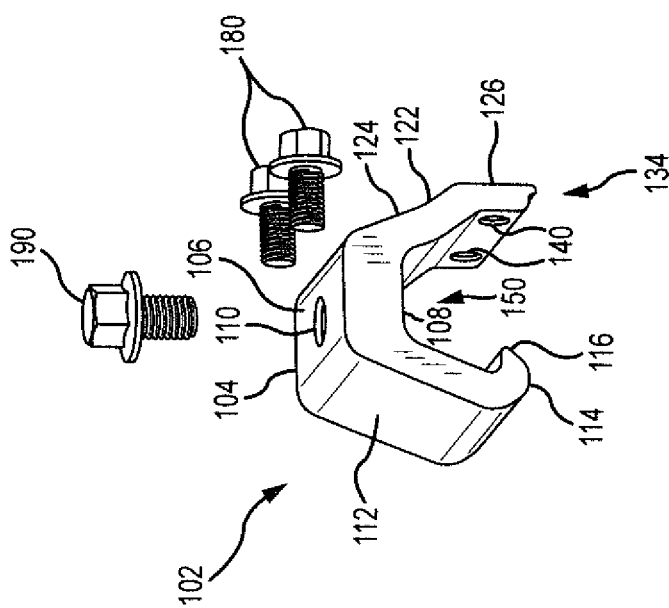
FIG. 7A is a perspective view of the mounting body used by the mounting device in FIG. 2, along with a pair of clamping fasteners and an attachment fastener prior to being engaged with the mounting body.

Additional views for the insert 160 of the mounting device 100 are presented in FIGS. 8A-8C (the insert 160 also being shown in FIGS. 2, 3, and 5). The insert 160 includes a second projection 164 that extends along the entire length of the insert 160 (this length dimension being the left-to-right direction in FIG. 8C). The projection 164 may be defined by an arcuate or curved surface, and defines a pocket 166 on the inside surface of the insert 160. A pad 167 having a higher coefficient of friction than the insert 160 may be positioned along the pocket 166 (e.g., FIGS. 9A and 9B).

The projection 164 for the insert 160 may be characterized as extending at least generally in the direction in which the first leg 112 of the mounting body 102 is spaced from the second leg 122 of the mounting body 102 (or toward the reference plane 152), as extending at least generally in the direction in which the base 104 is spaced from the free end 134 of the second leg 122 (or toward the reference plane 154), or both. The projection 164 may be characterized as "pointing" both at least generally upwardly (or toward the reference plane 154) and toward the reference plane 152 when the mounting device 100 in installed on a rib 54 of the building/roofing surface 50a. In any case, the projection 164 is disposed within the recess 70 on the second sidewall 66 of the rib 54 (and directly below the projection 68 on the second sidewall 66 of the rib 54) when the mounting device 100 in installed on the rib 54 of the building/roofing surface 50a. Contact between the insert 160 and the rib 54 of the building/roofing surface 50a (when the mounting device 100 is completely installed on the rib 54) may be limited to the projection 164/pocket 166 and the recess 70/projection 68 (e.g., the remainder of the insert 160 may be maintained in spaced relation to the rib 54).

The insert 160 includes a number of additional features that facilitate installation of the mounting device 100. The insert 160 includes a first or alignment surface 162 (which may extend along the entire length of the insert 160). Prior to rotating or pivoting the mounting body 102 onto the rib 54 (to capture the insert 160 within the rib receptacle 150 of the mounting body 102), the alignment surface 162 of the insert 160 may be positioned against the transition section 72 on the second sidewall 66 of the rib 54 (adjacent to the recess 70).

The noted pocket 166 is located between the second projection 164 of the insert 160 and a third projection 168. This pocket 166 may be characterized as a concave surface on the exterior of the insert 160, and nonetheless provides an interface for the projection 68 on the second sidewall 66 of the rib 54 (e.g., at least part of this projection 68 on the second sidewall 66 of the rib 54 may be captured within this pocket 166). Both the pocket 166 and the third projection 168 may extend along the entire length of the insert 160.

A fastener receptacle surface 172 is on the perimeter or exterior of the insert 160, and is disposed at least generally opposite of the second projection 164. A plurality of clamping fastener receptacles 174 are formed on the fastener receptacle surface 172 (two in the illustrated embodiment) and extend into the interior of the insert 160. There should be one clamping fastener receptacle 174 for each clamping fastener 180 to be used by the mounting device 100. A tapered surface 170 extends from the fastener receptacle surface 172 to the third projection 168. The tapered surface 170 and the alignment surface 162 are disposed in the same general orientation (e.g., having a common sign for their respective slopes, although the magnitude of their respective slopes may differ), but are not parallel to each other in the illustrated embodiment. The tapered surface 170 also may have a slight curvature (e.g., convexly-shaped).

Each clamping fastener receptacle 174 may be characterized as a "blind hole"—no clamping fastener receptacle 174 extends completely through the insert 160. In this regard, each clamping fastener receptacle 174 includes a closed end or base 176 (located within the interior of the insert 160) and an annular sidewall 178 that extends from this base 176 to the fastener receptacle surface 172 of the insert 160. The centerline of each clamping fastener receptacle 174 (e.g., coinciding with the above-noted length dimension 142 for the threaded holes 140 through the second leg 122 of the mounting body 102) may be at least generally aligned with the second projection 164 of the insert 160 (FIG. 8B). In any case, the end of a given clamping fastener 180 will be directed into a corresponding clamping fastener receptacle 174, and will engage its base 176 to move the insert 160 at least generally away from the second leg 122 of the mounting body 102 to clamp the mounting device 100 onto the rib 54. Each clamping fastener receptacle 174 is un-threaded—there is no threadable connection between a giving clamping fastener 180 and its corresponding clamping fastener receptacle 174.

FIGS. 9A and 9B illustrate two representative positions for the insert 160 relative to the mounting body 102. FIG. 9A illustrates a representative position of the insert 160 within the insert receptacle 128 of the mounting body 102, along with the disposal of a clamping fastener 180 within a corresponding clamping fastener receptacle 174 of the insert 160. Note that the tapered surface 170 of the insert 160 may be positioned against the upper surface 130 on the interior of the second leg 122 of the mounting body 102, although the tapered surface 170 of the insert 160 could be oriented so as to be spaced from the interior of the second leg 122 at this time (e.g., FIG. 5). Having a gap between the tapered surface 170 of the insert 160 and the interior of the second leg 122 of the mounting body 102 may be advantageous in relation to assembly of the mounting device 100 on a rib 54 (e.g., to accommodate movement of the insert 160 into a position for being secured to the rib 54). In any case, also note that the lip 179 of the insert 160 may also be positioned within the recess 138 on the free end 134 of the second leg 122 of the mounting body 102. Each clamping fastener 180 may be threadably engaged with the second leg 122 of the mounting body 102 (e.g., threaded into a threaded hole 140 of the second leg 122) and may extend into a corresponding clamping fastener receptacle 174 on the insert 160. FIG. 9B illustrates the position of the insert 160 relative to the mounting body 102 when the clamping fasteners 180 are in the fully engaged position (e.g., with the head of the clamping fasteners 180 being positioned against the exterior of the second leg 122). Note that the insert 160 is now spaced from the second leg 122 of the mounting body 102.

Panels having different hollow rib configurations may be used with the mounting device 100 of FIG. 2. Another mounting device configuration for hollow rib-type panels for building/roofing surfaces is disclosed in U.S. Pat. No. 7,703,256, which issued on Apr. 27, 2010, and the entire disclosure of which is incorporated herein.

Figure 10A:
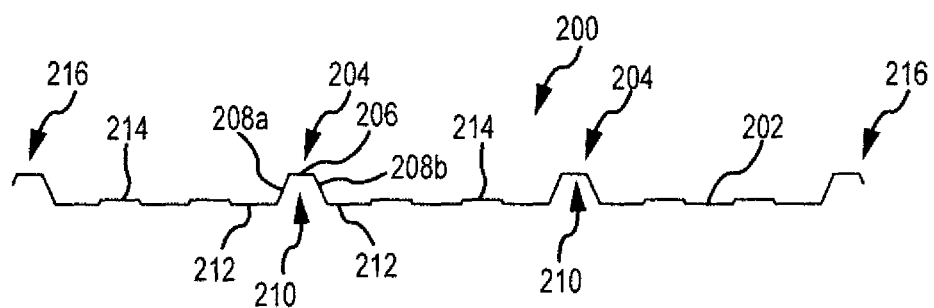
FIG. 10A is an end view of a representative trapezoidal rib panel.

Another example of a panel configuration is commonly referred to as a trapezoidal rib panel (e.g., formed from an appropriate metal alloy). A representative trapezoidal rib panel is illustrated in FIG. 10A and is identified by reference numeral 202. A plurality of these panels 202 may be assembled to define a building surface or a trapezoidal rib panel surface 200 (e.g., a roof or roofing surface). A given trapezoidal rib panel 202 may include one or more trapezoidal ribs 204 with a base section 212 positioned on each side thereof, and furthermore may include one or more minor ribs 214. A given trapezoidal rib panel 202 may in fact not use any minor ribs 214. In any case, an edge portion 216 of one trapezoidal rib panel 202 may be nested with an edge portion 216 of an adjacent trapezoidal rib panel 202 to collectively define a trapezoidal rib 204 as well.

Each trapezoidal rib 204 may include an upper rib wall 206 in the form of a flat or planar surface. Each trapezoidal rib 204 may also include a pair of sides 208a, 208b. The sides 208a, 208b are spaced from each other and are disposed in non-parallel relation. Typically the sides 208a, 208b of a trapezoidal rib 204 will be the mirror image of each other in relation to their respective orientations. In any case, the upper rib wall 206 and the two sides 208a, 208b collectively define a hollow interior or open space 210 for the trapezoidal rib 204.

Figure 10B:
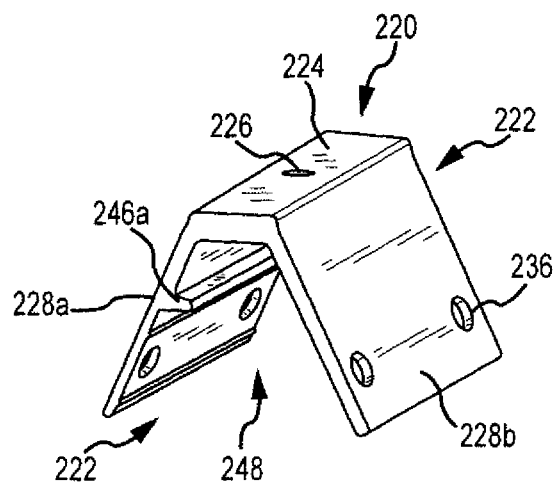
FIG. 10B is a perspective view of a representative embodiment of a mounting bracket for use with trapezoidal rib panels.

One embodiment of a mounting device that is adapted for use with trapezoidal rib panels is illustrated in FIG. 10B, is addressed in more detail in U.S. Pat. No. 9,611,652 (which issued on Apr. 4, 2017, and the entire disclosure of which is incorporated by reference herein), and may be used to install various types of attachments on such trapezoidal rib panels. The mounting device shown in FIG. 10B is in the form of a mounting device or bracket 220 that is of one-piece construction (e.g., no joint of any kind between any adjacent portions of the mounting bracket 220; the mounting bracket 220 is not an assembly of two or more separately-formed and separately-joined portions). In one embodiment, the mounting bracket 220 is in the form of extrusion to provide such a one-piece construction. The mounting bracket 220 may be formed from any appropriate material or combination of materials (e.g., an aluminum alloy; other metal alloys).

The mounting bracket 220 includes an upper wall or mounting surface 224 and a pair of side legs 228a, 228b that extend downwardly from the upper wall 224 when the mounting bracket 220 is installed on a trapezoidal rib 204. The upper wall 224 is the uppermost portion of the mounting bracket 220 when positioned on a trapezoidal rib 204, extends between a pair of open ends 222 of the mounting bracket 220, and is in the form of a single flat surface (rectangular in the illustrated embodiment). In one embodiment, the upper wall 224 provides a flat surface area, defined by a perimeter which in turn defines an area of at least 2.5 inches$^2$, to provide an appropriate surface for supporting attachments of any appropriate type. In this regard, the upper wall 224 includes a mounting hole 226 that extends completely through this upper wall 224.

A single mounting hole 226 is shown in the illustrated embodiment (e.g., located equidistantly from the two ends 222, although such may not be required in all instances). Multiple mounting holes could be incorporated by the upper wall 224 if required by a particular application or if otherwise desired. Each given mounting hole 226 may be threaded or unthreaded. In the case of a threaded mounting hole 226, a threaded attachment fastener (e.g., a threaded stud or bolt) could have its threads engaged with the threads of a particular mounting hole 226 to secure at least one attachment relative to the mounting bracket 220. An attachment fastener could also extend through a particular mounting hole 226 without having any type of threaded engagement with the mounting bracket 220, and a nut could be threaded onto an end of this attachment fastener to secure at least one attachment relative to the mounting bracket 220.

Any appropriate configuration may be utilized by each mounting hole 226 through the upper wall 224 of the mounting bracket 220. Representative configurations for each mounting hole 226 include circular or round. A given mounting hole could also be in the form of a slot that is elongated in the dimension of the spacing between the two ends 222. Such an elongated slot allows the position of an attachment fastener to be adjusted relative to the mounting bracket 220, for instance after the mounting bracket 220 has already been anchored relative to a building surface and which may be of significant benefit for at least certain installations on a building surface (e.g., an attachment fastener can be moved to any position along the length of the mounting slot, and can then be secured relative to the mounting bracket 220 by the above-noted nut).

The bracket side legs 228a, 228b are spaced from one another, and will typically be the mirror image of each other with regard to their respective orientations (e.g., an included angle between the underside of the upper wall 224 and the inside surface 230 each of the side legs 228, 228b being greater than 90° as shown). The bracket side leg 228a is positioned along an upper portion of the side 208a of a trapezoidal rib 204 (FIG. 10A), while the opposite bracket side leg 228b is positioned along an upper portion of the opposite side 208b of this same trapezoidal rib 204 (FIG. 10A). The bracket side legs 228a, 228b may be disposed in overlying relation with respect to any relevant portion of the corresponding side 208a, 208b of the trapezoidal rib 204. It should be appreciated that the bracket side legs 228a, 228b will typically be disposed in at least generally parallel relation to their corresponding side 208a, 208 of the trapezoidal rib 204.

The mounting bracket 220 further includes a pair of rib offsetting members that are disposed within a hollow interior 248 of the mounting bracket 220 (e.g., the partially enclosed space collectively defined by the upper wall 224 and the pair of bracket side legs 228a, 228b). Only the rib offsetting member 246a for the side leg 228a being shown in FIG. 10B—the other rib offsetting member would be similarly disposed on the interior surface of the side leg 228b that faces the side leg 228a. Each rib offsetting member is disposed in spaced relation to the upper wall 224 of the mounting bracket 220. The rib offsetting member 246a extends from the bracket side leg 228a toward, but not to, the opposite bracket side leg 228b. The other rib offsetting member extends from the bracket side leg 228b toward, but not to, the opposite bracket side leg 228a.

The underside of each rib offsetting member for the mounting bracket 220 is positioned on the upper rib wall 206 of the trapezoidal rib 204 to dispose the upper wall 224 of the mounting bracket 220 above and in spaced relation to the upper rib wall 206 of the trapezoidal rib 204 (FIG. 10A). The hollow interior 248 of the mounting bracket 220 may be characterized as including a first open space that is positioned above the rib offsetting members (and below the upper wall 224 of the bracket 220), a second open space between the opposing free ends of the rib offsetting members 246a, 246b, and a third open space or rib receptacle 242 that is positioned below the rib offsetting members 246a, 246b. That is, the two rib offsetting members 246a, 246b, and each of the bracket side legs 228a, 228b may be characterized as collectively defining the rib receptacle (e.g., by defining the portion of the hollow interior 248 of the mounting bracket 220 in which a trapezoidal rib 204 may be disposed). At least an upper portion of a trapezoidal rib 204 may be disposed within the rib receptacle 242 of the mounting bracket 220 when the mounting bracket 220 is installed on such a trapezoidal rib 204 (e.g., FIG. 10A).

At least one fastener extends through the bracket side leg 228a (two being accommodated in the illustrated embodiment), and terminates within the hollow interior 210 of the trapezoidal rib 204 when securing the mounting bracket 220 to a trapezoidal rib 204 (e.g., FIG. 10A). At least one fastener also extends through the bracket side leg 228b (two being accommodated in the illustrated embodiment) and also terminates within the hollow interior 210 of the trapezoidal rib 204 when securing the mounting bracket 220 to a trapezoidal rib 204 (e.g., FIG. 10A). Any appropriate type/number of fasteners may be used to separately secure each bracket side leg 228a, 228b to the trapezoidal rib 204. As the upper wall 224 of the mounting bracket 220 is used as a supporting surface, no fasteners extend through the upper wall 224 of the mounting bracket 220 and through any portion of the trapezoidal rib 204. Moreover, all fasteners that are used to secure the mounting bracket 220 to the trapezoidal rib 204 terminate within the hollow interior 210 of the trapezoidal rib 204 (e.g., no fastener extends through the mounting bracket 220, through the trapezoidal rib panel 202, and into any underlying deck or supporting structure).

Figure 11A:
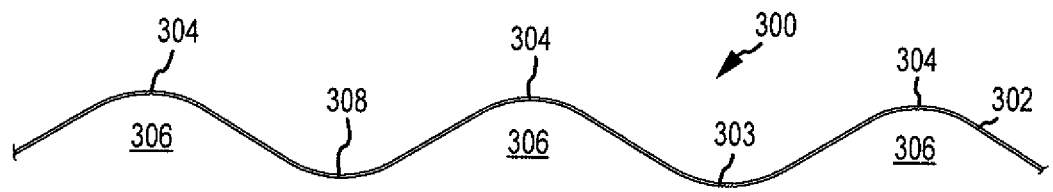
FIG. 11A is an end view of part of a representative corrugated panel.

Another example of a panel configuration is commonly referred to as a corrugated panel (e.g., formed from an appropriate metal or metal alloy). A representative corrugated panel is illustrated in FIG. 11A and is identified by reference numeral 302. A plurality of corrugated panels 302 may be assembled to define a building surface or a corrugated panel surface 300 (e.g., a roof or roofing surface).

A corrugated panel 302 is defined by a plurality of panel crowns 304 and a plurality of panel valleys 308. In the illustrated embodiment, a panel valley 308 is disposed between each adjacent pair of panel crowns 304. The corrugated panel 302 may be of a sinusoidal or "sine wave" configuration in an end view. In any case, typically a corrugated panel 302 will be installed in a roofing application such that the length dimension of its panel crowns 304 and panel valleys 308 each extend along the roof pitch (e.g., the elevation of each panel crown 304 and each panel valley 308 may continually change proceeding along its length dimension). A "panel crown" 304 of a corrugated panel 302 may also be referred to as a "rib" or "the high." A "panel valley" 308 of a corrugated panel 302 may also be referred to as a "trough" or "the low."

Figure 11B:
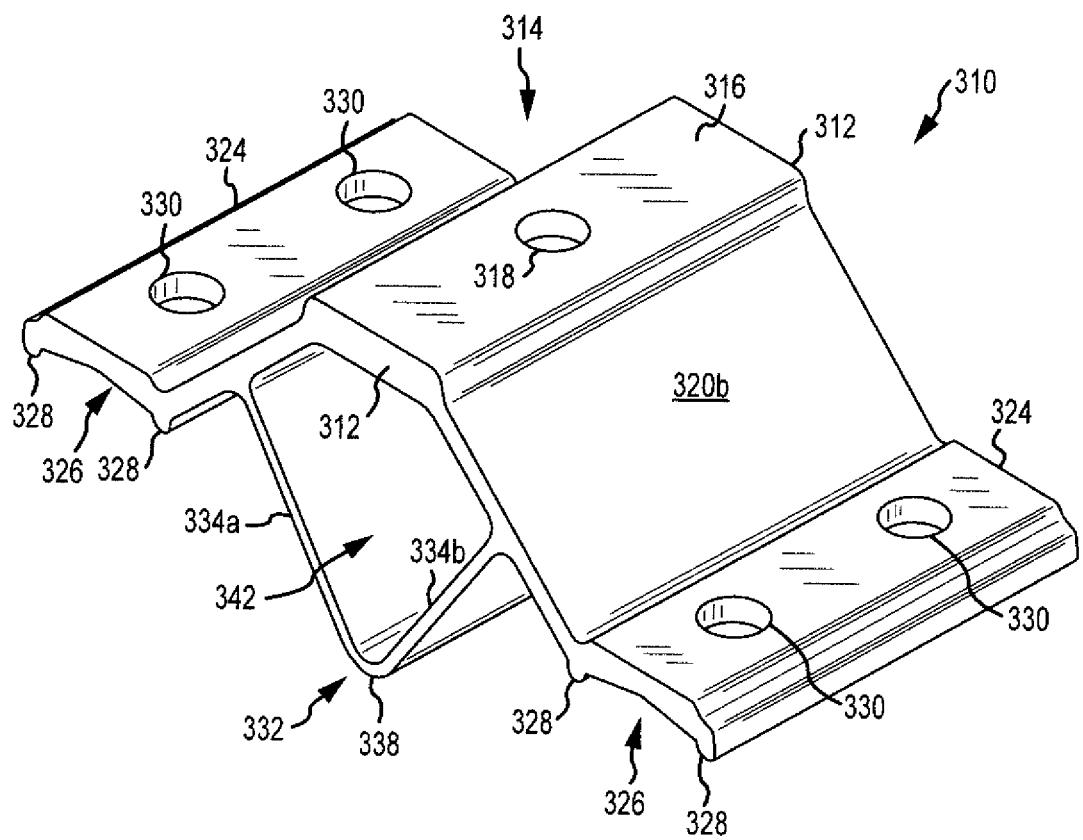
FIG. 11B is a perspective view of a representative embodiment of a mounting bracket for use with corrugated panels.

One embodiment of a mounting device that is adapted for use with corrugated panels is illustrated in FIG. 11B, is addressed in more detail in U.S. Pat. No. 9,611,652 (which issued on Apr. 4, 2017, and the entire disclosure of which is incorporated by reference herein), and may be used to install various types of attachments on such corrugated panels. The mounting device shown in FIG. 11B is in the form of a mounting device or bracket 310 that may be of one-piece construction (e.g., no joint of any kind between any adjacent portions of the mounting bracket 310; the mounting bracket 310 is not an assembly of two or more separately-formed and separately-joined portions). In one embodiment, the mounting bracket 310 is in the form of extrusion to provide such a one-piece construction. The mounting bracket 310 may be formed from any appropriate material or combination of materials (e.g., an aluminum alloy; other metal alloys).

The mounting bracket 310 includes what may be characterized as a valley section 314 that is positioned above a panel valley 308 when the mounting bracket 310 is positioned on a corrugated panel 302 (FIG. 11A). In the illustrated embodiment, the entirety of the valley section 314 is defined by an upper wall or mounting surface 316. The upper wall 316 is the uppermost portion of the mounting bracket 310 when disposed in an upright position (FIG. 11B), extends between a pair of ends 312 of the mounting bracket 310, and is in the form of an at least substantially flat surface (e.g., having a rectangular perimeter in the illustrated embodiment). In one embodiment, the perimeter of the upper wall 316 defines an area of at least 2.5 inches$^2$ to provide an appropriate surface for supporting attachments of any appropriate type (discussed below). In this regard, the upper wall 316 includes a mounting hole 318 that extends completely through this upper wall 316. One or more mounting holes 318 may be used to secure at least one attachment relative to the mounting bracket 310 (e.g., using one or more attachment fasteners of any appropriate type).

A single mounting hole 318 is shown in the illustrated embodiment (e.g., located equidistantly from the two ends 312, although such may not be required in all instances). Multiple mounting holes could be incorporated by the upper wall 316 if required by a particular application or if otherwise desired. Each given mounting hole 318 may be threaded or unthreaded. In the case of a threaded mounting hole 318, a threaded attachment fastener (e.g., a threaded stud or bolt) could have its threads engaged with the threads of a particular mounting hole 318 to secure at least one attachment relative to the mounting bracket 310. An attachment fastener could also extend through a particular mounting hole 318 without having any type of threaded engagement with the mounting bracket 310, and a nut could be threaded onto an end of this attachment fastener (this end being disposed within an open space 342 of the mounting bracket 310, discussed below) to secure at least one attachment relative to the mounting bracket 310.

Any appropriate configuration may be utilized by each mounting hole 318 through the upper wall 316 of the mounting bracket 310. Representative configurations for each mounting hole 318 include circular or round. A given mounting hole could also be in the form of a slot that is elongated in the dimension that the ends 312 are spaced from one another. Such an elongated slot allows the position of an attachment fastener to be adjusted relative to the mounting bracket 310, for instance after the mounting bracket 310 has already been anchored relative to a building surface and which may be of significant benefit for at least certain installations on a building surface (e.g., an attachment fastener can be moved to any position along the length of the mounting slot, and can then be secured relative to the mounting bracket 310 by the above-noted nut).

The above-noted bracket ends 312 may be characterized as being spaced along a length dimension of the mounting bracket 310 (e.g., the spacing between the bracket ends 312 may define the length of the mounting bracket 310). When the mounting bracket 310 is positioned on a corrugated panel 302 (e.g., FIG. 11A), the length dimension of the mounting bracket 310 will be aligned or coincide with (e.g., parallel to) the length dimension of the corresponding panel valley 308 (e.g., one bracket end 312 will be at one location along the length dimension of the corresponding panel valley 308, while the opposite bracket end 312 will be at a different location along the length dimension of this same panel valley 308).

The mounting bracket 310 further includes a pair of bracket legs 320a, 320b. The bracket leg 320a extends from one side of the valley section 314 (the upper wall 316 in the illustrated embodiment), while the other bracket leg 320b extends from the opposite side of the valley section 314 (the upper wall 316 in the illustrated embodiment). Each bracket leg 320a, 320b may be characterized as extending both downwardly and away from its corresponding side of the valley section 314 when the mounting bracket 320 is in an upright position. Another characterization is that the bracket leg 320a extends from the valley section 314 at least generally in the direction of one panel crown 304 of a corrugated panel 302 on which the mounting bracket 310 is positioned, while the bracket leg 320b extends from the valley section 314 at least generally in the direction of another panel crown 304 of a corrugated panel 302 on which the mounting bracket 310 is positioned.

The mounting bracket 310 further includes a third bracket leg 334a that extends from the first bracket leg 320a, along with a fourth bracket leg 334b that extends from the second bracket leg 320b. The bracket legs 334a, 334b may converge to define a panel valley engagement section 332. Stated another way, the intersection of the third bracket leg 334a and the fourth bracket leg 334b may define a panel valley engagement section 332 for the mounting bracket 310. This defines an included angle 336 between the third bracket leg 334a and the fourth bracket leg 334b. In the illustrated embodiment, the magnitude of this included angle 336 is less than 90°.

The panel valley engagement section 332 includes what may be characterized as a panel valley interface surface 338—the surface of the panel valley engagement section 332 that interfaces with a panel valley 308 of a corrugated panel 302 when the mounting bracket 310 is positioned on such a corrugated panel 302. In the illustrated embodiment, the panel valley interface surface 338 is convex or of a "rounded" configuration.

The upper wall 316 of the mounting bracket 310 may be characterized as being disposed in overlying relation to the panel valley engagement section 332. The upper wall 316 may also be characterized as being separated from the panel valley engagement section 332 by an open space 342 (the open space 342 being within or part of the hollow interior of the mounting bracket 310). In one embodiment, the vertical extent of this open space 342 (i.e., "vertical" being when the mounting bracket 310 is disposed in an upright position, and also coinciding with the dimension that is orthogonal/perpendicular to the pitch of a roofing defined by a corrugated panel 302 on which the mounting bracket 310 is positioned) is at least about 1 inch. That is, the underside of the upper wall 316 may be separated from the panel valley engagement section 332 by a distance of at least about 1 inch in at least one embodiment.

The mounting hole 318 in the upper wall 316 may be characterized as being aligned in the vertical dimension with the panel valley engagement section 332 when the mounting bracket 310 is disposed in an upright position. The open space 342 also therefore exists between the mounting hole 318 and the panel valley engagement section 332 (e.g., the mounting hole 318 may be aligned with the open space 342 in the vertical dimension; the open space 342 may be characterized as being below the mounting hole 318). As such, an attachment fastener may be directed within the mounting hole 318, may extend through the upper wall 316, and may terminate within the open space 342. That is, such an attachment fastener could extend beyond the underside of the upper wall 316 a distance of at least about 1" in the noted embodiment before contacting another portion of the mounting bracket 310 (e.g., the side of the panel valley engagement section 332 that is opposite of the panel valley interface surface 338).

The mounting bracket 310 also includes a pair of panel crown engagement sections 324. Initially, each panel crown engagement section 324 is offset or spaced in the vertical dimension from the panel valley engagement section 332. Stated another way and when the mounting bracket 314 is disposed in an upright position, the panel valley engagement section 332 is disposed at a different elevation than each panel crown engagement section 324 (each panel crown engagement section 324 being disposed at a higher elevation than the panel valley engagement section 332). Moreover, the panel valley engagement section 332 is offset from each panel crown engagement section 324 in a lateral dimension that is orthogonal to the above-noted vertical dimension.

The first bracket leg 320a extends between one of the panel crown engagement sections 324 and the valley section 314. Similarly, the second bracket leg 320b extends between the other panel crown engagement section 324 and the valley section 314. One panel crown engagement section 324 of the mounting bracket 310 may be positioned on one panel crown 304 of a corrugated panel 302 (located on one side of a panel valley 308 engaged by the panel valley engagement section 332), while the other panel crown engagement section 324 may be positioned on a different panel crown 304 of a corrugated panel 302 (located on the opposite side of a panel valley 308 engaged by the panel valley engagement section 332). In the illustrated embodiment, each panel crown engagement section 324 engages the adjacent-most panel crown 304 to the panel valley 308 contacted by the panel valley engagement section 332 of the mounting bracket 310, although such may not be required in all instances.

Each panel crown engagement section 324 may engage a panel crown 304 of a corrugated panel 302 on which the mounting bracket 310 is positioned. In the illustrated embodiment, there may be two discrete zones of contact between each panel crown engagement section 324 and its corresponding panel crown 304. In this regard, each panel crown engagement section 324 may include a pair of rails, projections, or dimples 328 that may extend between the two ends 312 of the mounting bracket 310. If the spacing between the two ends 312 is characterized as the length dimension for the mounting bracket 310, each projection 328 may be characterized as extending along at least part of the length of the mounting bracket 310. Each projection 328 may be convex or rounded where engaged with a corresponding panel crown 304.

Each projection 328 may provide a discrete zone of contact (e.g., extending along a line or axial path) between the corresponding panel crown engagement section 324 and its corresponding panel crown 304 of a corrugated panel 302. Generally, the use of the projections 328 reduces the area of contact between the mounting bracket 310 and a panel crown 304 of a corrugated panel 302, which should reduce the potential for capillary entrapment (e.g., should reduce the potential of water "wicking" into interfacing surfaces of the mounting bracket 310 and a corrugated panel 302, which could lead to the development of corrosion and premature failure of a building surface 300 incorporating such a corrugated panel 302).

A gasket pocket or receptacle 326 is defined between the projections 328 on each of the panel crown engagement sections 324. At least one bracket fastener hole 330 extends through each of the panel crown engagement sections 324 and intersects the corresponding gasket pocket 326. In the illustrated embodiment, there are two bracket fastener holes 330 that are aligned with the gasket pocket 326 for each of the panel crown engagement sections 324. Any appropriate number of bracket fastener holes 330 may be utilized by each panel crown engagement section 324. In one embodiment, each bracket fastener hole 330 is un-threaded. An appropriate bracket fastener (e.g., threaded screw, rivet) may be directed through each bracket fastener hole 330 and through the aligned portion of a corrugated panel 302 to secure the mounting bracket 310 relative to the corrugated panel 302. Various options in this regard will be discussed in more detail below in relation to FIGS. 16D-F.

A gasket of any appropriate type (e.g., an EPDM gasket—not shown) may be disposed within each of the gasket pockets 326. The projections 328 on each panel crown engagement section 324 should confine the corresponding gasket therebetween. In one embodiment, each gasket that is positioned within a gasket pocket 326 is thicker than the depth of its corresponding gasket pocket 326 prior to the mounting bracket 310 being secured relative to a corrugated panel 302. As such, the gaskets may be compressed between the mounting bracket 310 and the corresponding panel crown 304 as the mounting bracket 310 is secured relative to a corrugated panel 302. The above-described projections 328 may also provide the function of reducing the potential of these gaskets being "over-compressed" while securing the mounting bracket 310 relative to a corrugated panel 302.

Each gasket may be installed within its corresponding gasket pocket 326 prior to installing the mounting bracket 310 on a corrugated panel 302. Any appropriate way of maintaining a gasket within its corresponding gasket pocket 326 may be utilized (e.g., by being press fit within the corresponding gasket pocket 326; adhering a gasket 326 to an inner surface of its corresponding gasket pocket 326). When the mounting bracket 310 is secured relative to a corrugated panel 302, each gasket may compress to bring the above-noted projections 328 into contact with the corresponding panel crown 304 of the corrugated panel 302. However, the projections 328 should still at least substantially confine the corresponding gasket within its corresponding gasket pocket 326, and furthermore should reduce the potential for the gaskets being over-compressed during installation as noted.

Figure 12A:
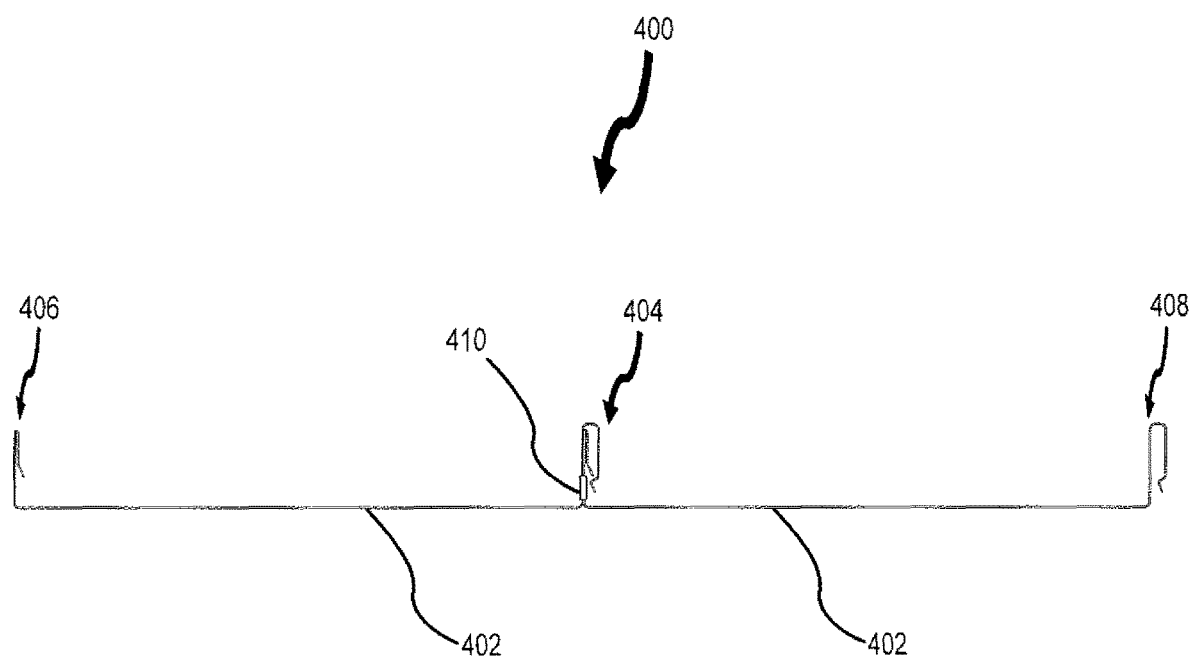
FIG. 12A is an end view of one embodiment of a standing seam panel assembly.
Figure 12B:
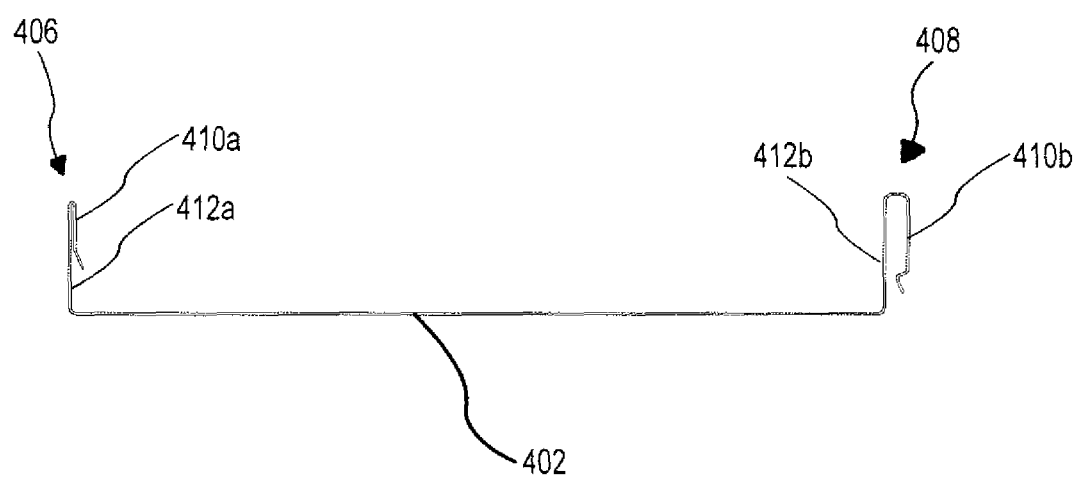
FIG. 12B is an end view of a panel used by the standing seam panel assembly of FIG. 12A.

A panel assembly may be defined by an edge portion of one panel being interconnected with an edge portion of an adjacent panel to define a standing seam, as noted above. Various types of standing seam configurations exist. One embodiment of a standing seam panel assembly is illustrated in FIGS. 12A and 12B and is identified by reference numeral 400. The panel assembly 400 includes a plurality of panels 402 (e.g., metal or metal alloy) that are interconnected with one another. The interconnection between each adjacent pair of panels 402 of the panel assembly 400 defines a standing seam 404 (a length dimension of the standing seam 404 typically being orthogonal to a lateral dimension addressed below, and would typically coincide with a pitch of a roofing surface that includes the panel assembly 400). It should be appreciated any appropriate number of panels 402 may be interconnected in the manner embodied by FIGS. 12A and 12B to define a standing seam panel assembly 400 of any appropriate size and/or configuration.

Continuing to refer to FIGS. 12A and 12B, a right edge section 408 of one panel 402 may be disposed over a left edge section 406 of an adjacent panel 402 to define a standing seam 404. The left edge section 406 includes a sidewall 412$a$ that extends upwardly when the corresponding panel 402 is horizontally disposed (e.g., disposed orthogonal to the pitch of the corresponding roofing surface; extending away from a reference plane that contains the main body of the corresponding panel 402), along with an end section 410$a$ that extends downwardly when the corresponding panel 402 is horizontally disposed (extending toward a reference plane that contains the main body of the corresponding panel 402). The sidewall 412$a$ and the end section 410$a$ of the left edge section 406 are interconnected by an arcuate section, and with the end section 410$a$ being disposed "inwardly" of the sidewall 412$a$ in a lateral dimension.

The right edge section 408 includes a sidewall 412$b$ that extends upwardly when the corresponding panel 402 is horizontally disposed (e.g., disposed orthogonal to the pitch of the corresponding roofing surface; extending away from a reference plane that contains the main body of the corresponding panel 402), along with an end section 410$b$ that extends downwardly when the corresponding panel 402 is horizontally disposed (extending toward a reference plane that contains the main body of the corresponding panel 402). The sidewall 412$b$ and the end section 410$b$ of the right edge section 408 are interconnected by an arcuate section, and with the end section 410$b$ being disposed "outwardly" of the sidewall 412$b$ in a lateral dimension. In the illustrated embodiment, the spacing between the sidewall 412$b$ and its corresponding end section 410$b$ is larger than the spacing between the sidewall 412$a$ and its corresponding end section 410$a$.

Each panel 402 further includes a first lateral edge (the horizontal edge shown in FIG. 12B for the panel 402) and a second lateral edge that are spaced from one another, and each of which coincides with a lateral dimension. Typically the lateral dimension will be that which coincides with a constant elevation when proceeding along a line in the lateral dimension and when the panel assembly 400 is in an installed configuration on a sloped roofing surface. In any case and as noted, a right edge section 408 of one panel 402 is disposed over a left edge section 406 of an adjacent panel 402 to define a standing seam 404 in the case of the panel assembly 400. At this time, the sidewall 412$b$ of the right edge section 408 of one panel 402 may be disposed in closely spaced relation (and/or actually in interfacing relation) with the sidewall 412$a$ of the left edge section 406 of the adjacent panel 402. An electrical bonding clip 410 may be installed on the standing seam 404 of the panel assembly 400, namely on corresponding portions of the sidewall 412$b$ of one panel 402 and the corresponding sidewall 412*a* of the adjacent panel 402 that collectively define a standing seam 404. In the case of the standing seam panel assembly 400, the electrical bonding clip 410 may be characterized as being installed in a vertical orientation. In any case, at least one electrical bonding clip 104 may be installed on each standing seam 404 of the panel assembly 400, including on each adjacent pair of panels 402 for the standing seam panel assembly 400. Generally, each electrical bonding clip 410 of the panel assembly 400 electrically connects the corresponding pair of panels 402.

Figure 12C:
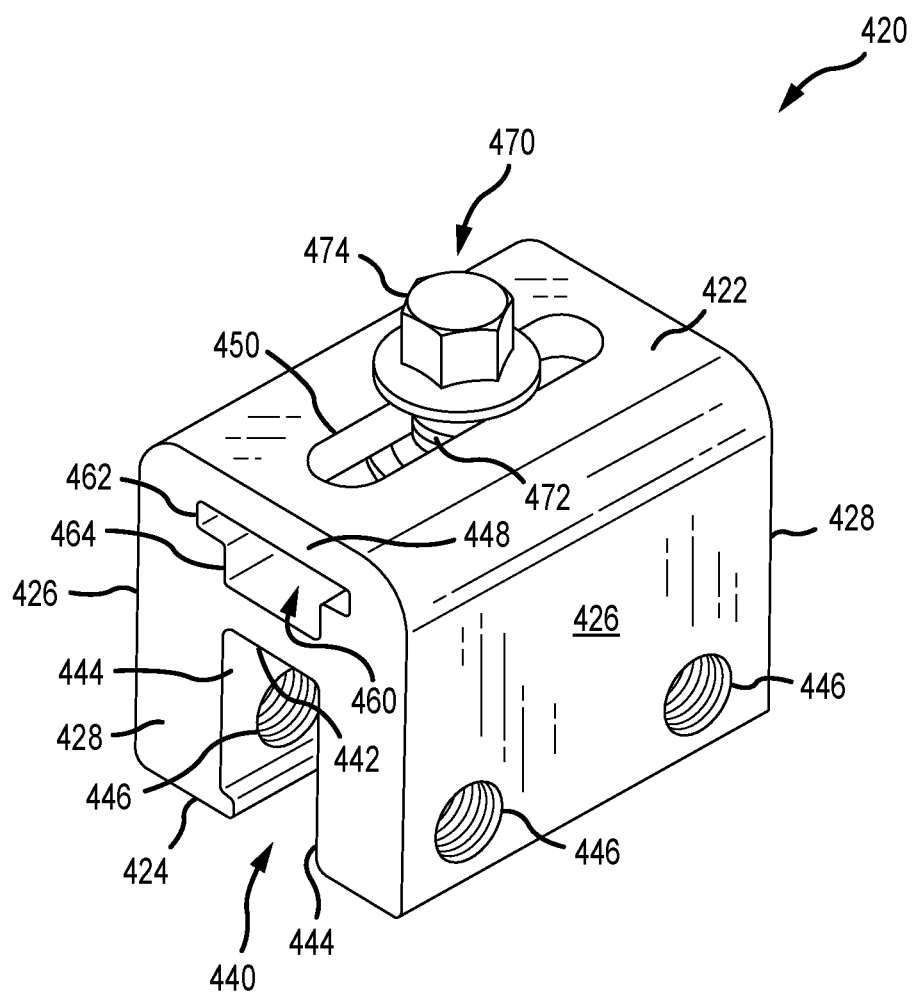
FIG. 12C is a perspective view of a representative embodiment of a mounting device that may be installed on a standing steam, including of the type shown in FIGS. 12A and 12B.

One embodiment of a mounting device that may be installed on a standing seam of a panel assembly (e.g., standing seam 404 shown in FIGS. 12A and 12B) is illustrated in FIG. 12C and is identified by reference numeral 420. The mounting device 420 includes an upper surface 422 and an oppositely disposed bottom surface 424, a pair of oppositely disposed side surfaces 426, and a pair of oppositely disposed ends 428. The bottom surface 424 includes a slot 440 that extends between the two ends 428 of the mounting device 420. The slot 440 on the bottom surface 424 of the mounting device 420 includes a base 442 and a pair of sidewalls 444 that are spaced apart to receive at least an end section of a standing seam (e.g., an upper section of the standing seam 404 shown in FIG. 12A).

One or more threaded holes 446 extend from at least one of the side surfaces 426 and to the slot 440 for securing the mounting device 420 to a corresponding standing seam. In the illustrated embodiment, multiple threaded holes 446 extend from each of the side surfaces 426 of the mounting device 420 and to the slot 440. Each threaded hole 446 on one of the slot sidewalls 444 is disposed in opposing relation to a threaded hole 446 on the other slot sidewall 444. However, the mounting device 420 could be configured such that only one of the slot sidewalls 444 has one or more threaded holes 446. Moreover, the mounting device 420 could be configured such that each threaded hole 446 on one slot sidewall 444 is not aligned with a threaded hole 446 on the other slot sidewall 444. One or more seam fasteners may be directed through a threaded hole 446 of the mounting device 420 and into the slot 440 to engage the standing seam and secure the same against the opposing slot sidewall 444. In one embodiment, each seam fastener only interfaces with an exterior surface of the standing seam. For instance, the end of the seam fastener that interfaces with the standing seam may be convex, rounded, or of a blunt-nosed configuration to provide a desirable interface with the standing seam.

The upper surface 422 of the mounting device 420 of FIG. 12C further includes an elongated mounting slot 450 that extends to a receptacle 460. Generally, the receptacle 460 is located between the upper surface 422 of the mounting device 420 and the base 442 of the slot 440, and furthermore extends between the two ends 428 of the mounting device 420. This additionally may be viewed as defining an upper wall 448 for the mounting device 420, with the mounting slot 450 extending entirely through this upper wall 448 and to the receptacle 460. In any case, the receptacle 460 includes a fastener flange receptacle 462 and a fastener head receptacle 464 that each extend between the ends 428 of the mounting device 420 in the illustrated embodiment.

As should be appreciated, the elongated mounting slot 450 allows for adjustment of the location of an attachment fastener 470 relative to the mounting device 420, which may be of significant benefit for at least certain installations on a building/roofing surface. Even after the mounting device 420 is anchored relative to the building/roofing surface in the above-noted manner, the attachment fastener 470 can be moved to any position along the length of the mounting slot 450. The length of the mounting slot 450 accommodates a significant number of different positions of the attachment fastener 470 relative to the mounting device 420—the attachment fastener 470 may assume a number of different positions between the two ends 428 of the mounting device 420 and that is accommodated by the elongated mounting slot 450.

The attachment fastener 470 in the illustrated embodiment is in the form of bolt having a threaded shaft 472 that is fixed relative to and extends from a bolt head 474. The bolt head 474 is positioned on/above the upper surface 422 of the mounting device 420, while the threaded shaft 472 extends through the mounting slot 450 for engagement with a nut that is positioned within the receptacle 460. An attachment that is positioned between the bolt head 474 and the upper surface 422 of the mounting device 420 may then be anchored relative to the mounting device 420 by the attachment fastener 470. It should be appreciated that the bolt head 474 could instead be positioned in the receptacle 460, for instance by extending the mounting slot 450 to the two ends 428 of the mounting device 420. In any case, the shaft 472 would extend upwardly through the mounting slot 450 in this instance and a nut could be located externally of the mounting device 420 to secure an attachment relative to the mounting device 420.

Figure 13A:
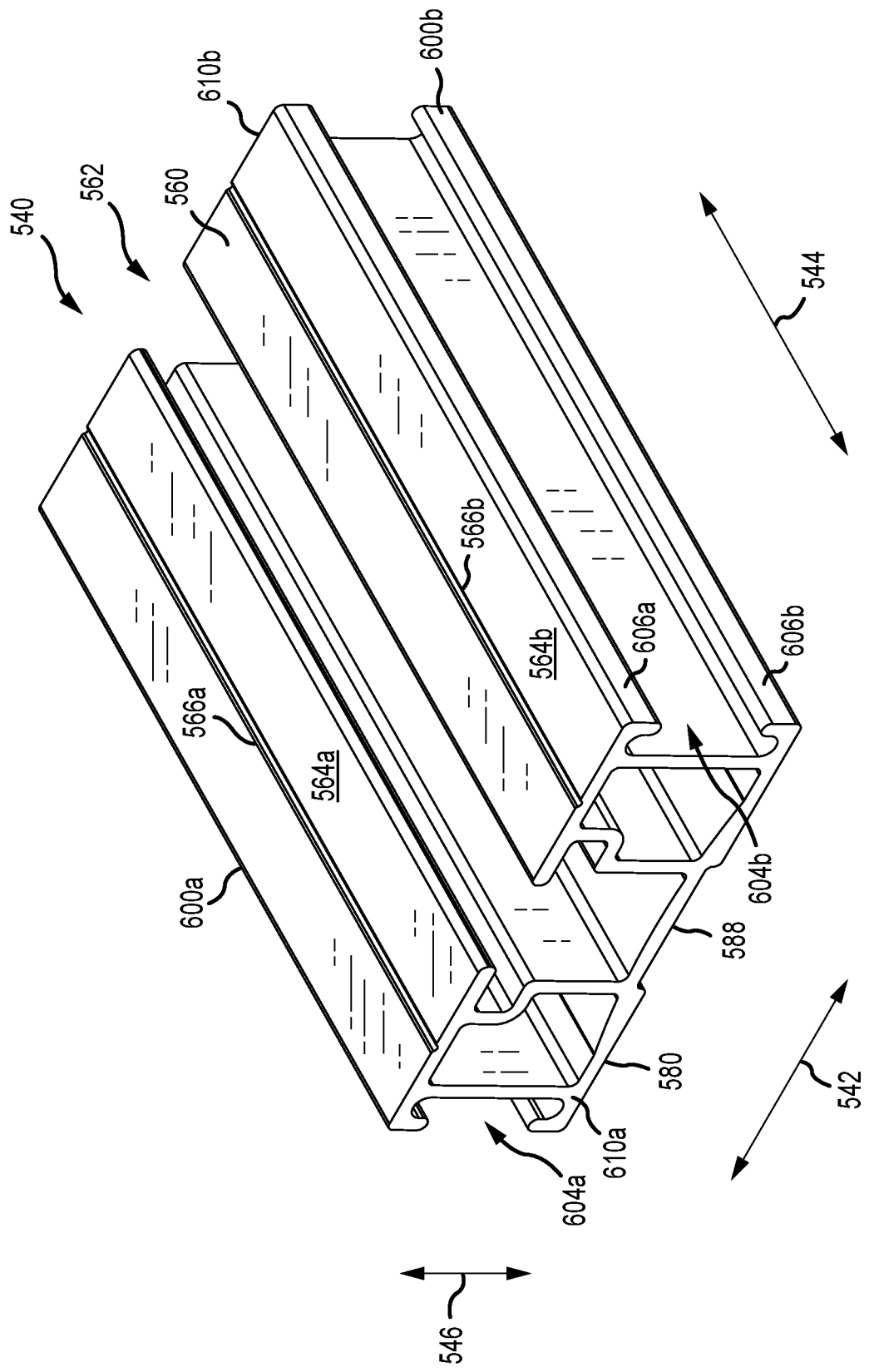
FIG. 13A is a perspective view of one embodiment of a rail that may be secured relative to a building/roofing surface, with an attachment being securable relative to this rail.
Figure 13B:
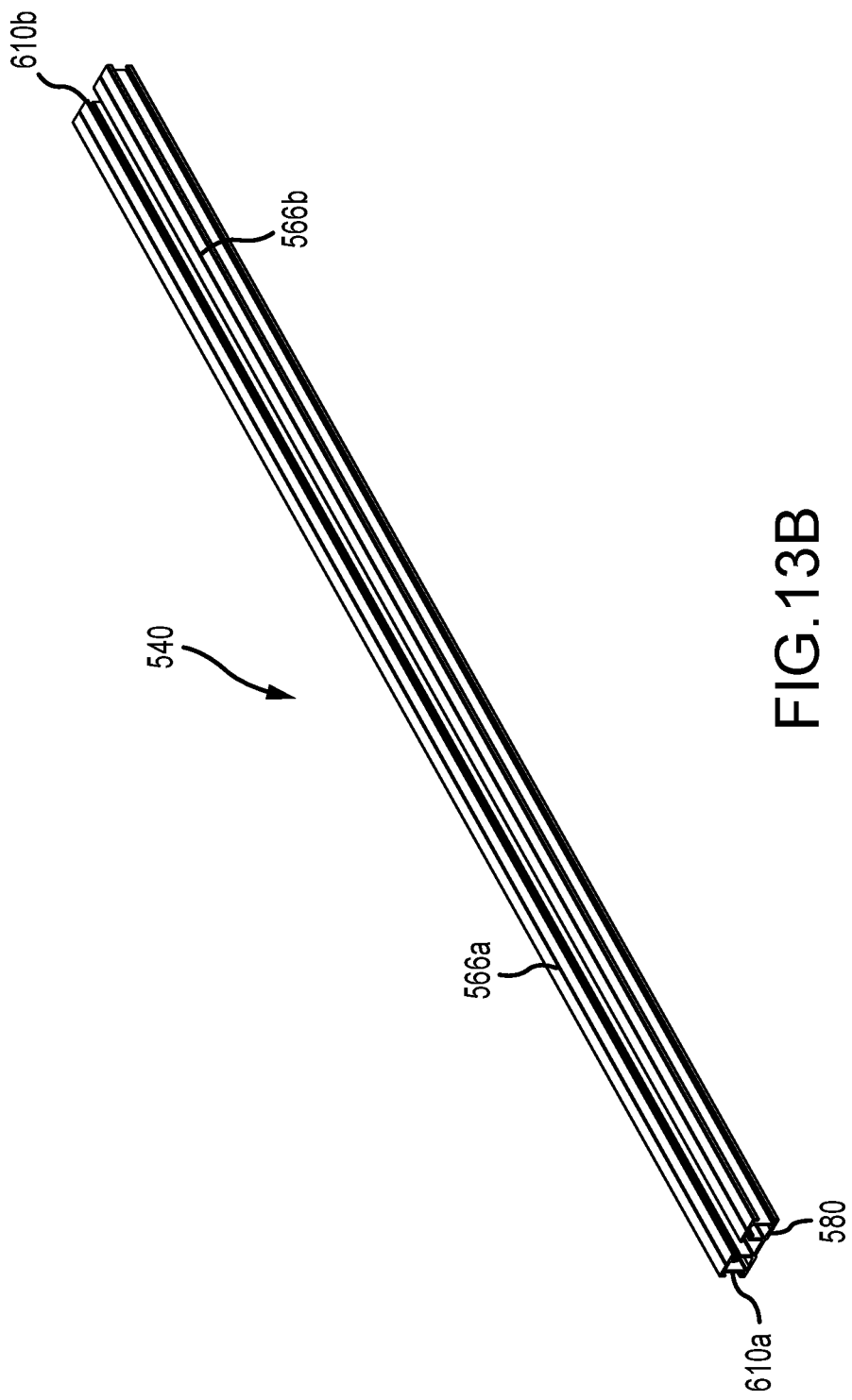
FIG. 13B is another perspective view of the rail of FIG. 13A.
Figure 14:
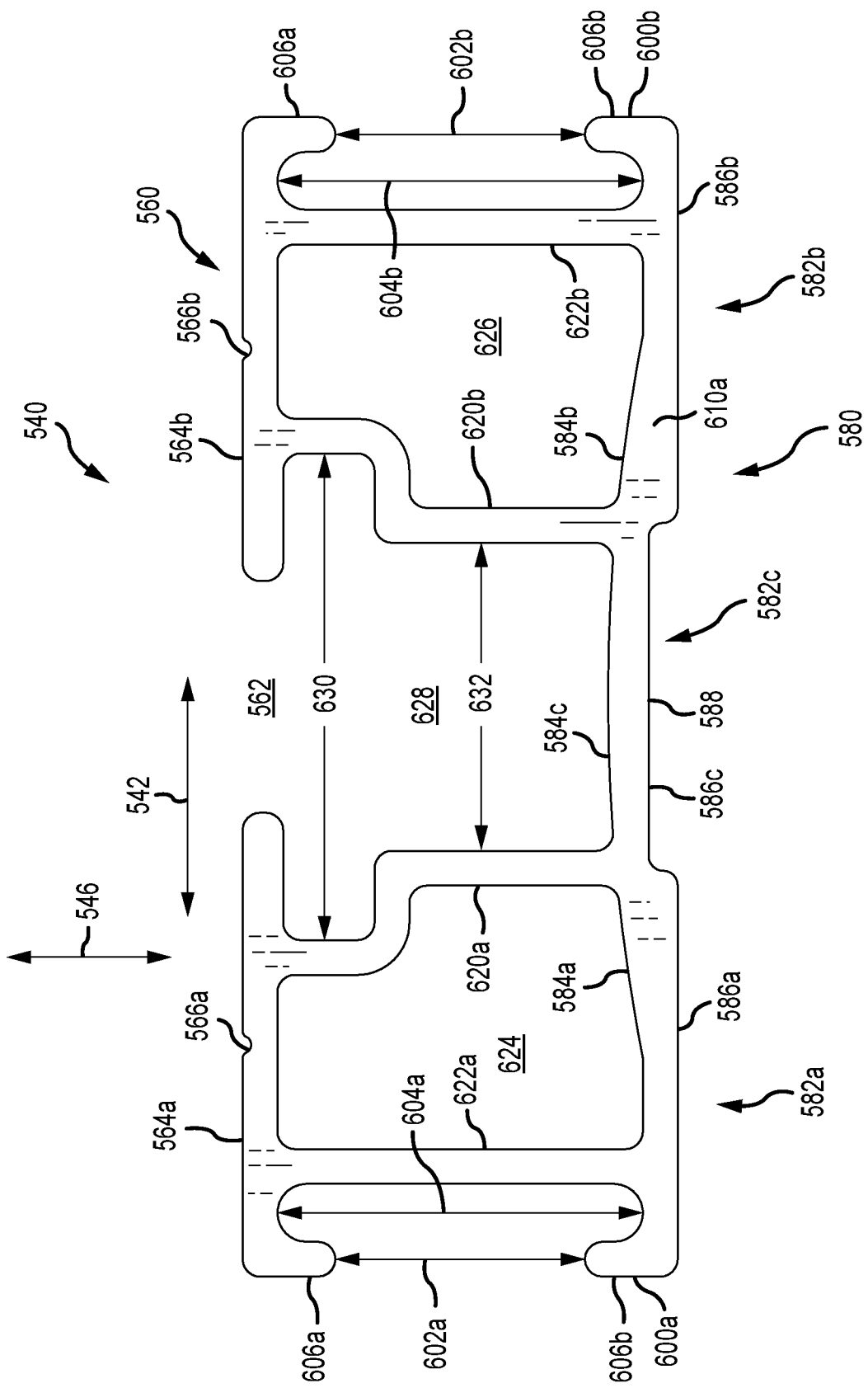
FIG. 14 is an end view of the rail of FIG. 13A.

One embodiment of a rail that may be secured relative to a building/roofing surface, and to which an attachment may be secured, is illustrated in FIGS. 13A, 13B and 14 and is identified by reference numeral 540. Such a rail 540 may be used to mount any appropriate component onto a building/roofing surface, including various types of equipment such as an air conditioning unit. As will be discussed in more detail below, one way in which this may be done is through a mounting device and a mounting adapter or clip 640 (e.g., an indirect anchoring of the rail 540 relative to the building/roofing surface). Any of the above-noted mounting devices may be used for such an installation. Generally, the mounting adapter 640 is interconnected with and extends from the rail 540, and the mounting adapter 640 is also mounted to a mounting device that is spaced from the rail 540, all as will be discussed in more detail. The anchoring or securement of the mounting adapter 640 to a mounting device may be done in any appropriate manner. For instance, one or more threaded fasteners may extend through the mounting adapter 640 and may be threadably engaged with the mounting device. Such a threaded fastener could be threadably engaged with the mounting adapter 640, or such a threaded fastener may only be threadably engaged with the mounting device (e.g., a bolt or stud). The shaft of one or more fasteners may extend through a non-threaded aperture (e.g., a hole or slot) of the mounting adapter 640 and through a non-threaded aperture (e.g., a hole or slot) in the mounting device. One head of such a fastener may be positioned above the mounting adapter 640, and another head of this fastener may be disposed within an appropriate receptacle of the mounting device. At least one of these fastener heads is movable relative to the other fastener head. For instance, the fastener could be in the form a movable nut and a bolt having a threaded shaft that extends from a bolt head that is fixed to this shaft (the nut being threadably engaged with this shaft to change the spacing between the nut and bolt head by rotation of the nut relative to the shaft). Either the bolt head or the rotatable nut could be positioned above the mounting adapter 640 and the other could be positioned within the noted receptacle of the mounting device. The fastener could also be in the form of a pair of nuts that are threadably engaged with a threaded stud (one rotatable nut could be positioned above the mounting adapter 640 and the other rotatable nut could be positioned within the noted receptacle of the mounting device). Each of the above-noted mounting devices may be configured for use with each of these types of fasteners for securing the mounting adapter 640 to the mounting device.

The rail 540 shown in FIGS. 13A, 13B and 14 may be in the form of a one-piece body (e.g., of an integral construction such that there are no joints between adjacent portions of the rail 540). For instance, the rail 540 may be in the form of extrusion, may be formed from any appropriate material or combination of materials (e.g., a metal or metal alloy), and may be of any appropriate length for the particular attachment application. Features of the rail 540 include a rail top 560 and a rail bottom 580 that are spaced from one another in a vertical dimension 546 for the rail 540, a pair of rail sides 600a, 600b that are spaced from one another in a vertical dimension 546 for the rail 540, and a pair of rail ends 610a, 610b that are spaced from one another in a longitudinal dimension 544 for the rail 540. The length of the rail 540 is measured in the longitudinal dimension 544, and thereby corresponds with the spacing between the rail ends 610a, 610b. The width of the rail 540 is measured in the lateral dimension 542, and thereby corresponds with the spacing between the rail sides 600a, 600b. The height of the rail 540 is measured in the vertical dimension 546, and thereby corresponds with the spacing between the rail top 560 and the rail bottom 580. The rail 540 may be characterized as being of a low profile configuration. One way in which this may be quantified is by a profile ratio for the rail 540, where the rail width is the numerator and the rail height is the denominator. A profile ratio of a maximum width of the rail 540 to a maximum height of the rail 540 is at least 2.5 in one embodiment, is at least 2.6 in another embodiment, and is between 2.6 and 2.7 in another embodiment.

The rail top 560 includes an attachment fastener slot 562 that extends along the entire length of the rail 540 (the attachment fastener slot 562 extends from the rail end 610a to the rail end 610b). This attachment fastener slot 562 extends in the vertical dimension 546 to an open, interior space of the rail 540 that will be discussed in more detail below (third pocket 628). A first rail top section 564a is positioned on one side of the attachment fastener slot 562, while a second rail top section 564b is positioned on the opposite side of the attachment fastener slot 562. A first groove 566a extends along the entire length of the rail 540 on the rail top section 564a, while a second groove 566b extends along the entire length of the rail 540 on the rail top section 564b (each extends the entire distance from rail end 610a to rail end 610b). One or more appropriate fasteners, such as a self-tapping or self-drilling screws, may be directed through the first rail top section 564a within the first groove 566a (for termination within a first pocket 624, discussed in more detail below) and/or may be directed through the second rail top section 564b within the second groove 566b (for termination within a second pocket 626, discussed in more detail below) to secure an attachment relative to the rail 540. The attachment option may be employed in appropriate circumstances, including for the case of shorter rails 540. In any case and for the illustrated embodiment, the rail top sections 564a, 564b are the mirror image of one another. Each of the rail top sections 564a, 564b may be of any appropriate width, although typically the rail top sections 564a, 564b will be of a common width that is of a sufficient magnitude for the particular attachment application.

The first rail side 600a includes a first rail slot 602a and a corresponding first rail channel 604a that each extend along the entire length of the rail 540 (the first rail slot 602a and channel 604a each extend from the rail end 610a to the rail end 610b). The first rail channel 604a is defined by corresponding portions of the rail top 560 and rail bottom 580, along with a pair of rail lips 606a, 606b that are spaced from a first interior wall 622a that extends from the first rail top section 564a to the rail bottom 580 (the rail lips 606a and 606b on the first rail side 600a, along with the first interior wall 622a, all extend the entire length of the rail 540). The first rail side slot 602a may be characterized as being defined by the spacing between the rail lips 606a, 606b (on the first rail side 600a) in the vertical dimension 546, and which provides access to the first rail channel 604a. The first rail channel 604a may be characterized as being at least generally C-shaped.

The second rail side 600b includes a second rail slot 602b and a corresponding second rail channel 604b that each extend along the entire length of the rail 540 (the second rail slot 602b and channel 604b each extend from the rail end 610a to the rail end 610b). The second rail channel 604b is defined by corresponding portions of the rail top 560 and rail bottom 580, along with a pair of rail lips 606a, 606b that are spaced from a second interior wall 622b that extends from the second rail top section 564b to the rail bottom 580 (the rail lips 606a and 606b on the second rail side 600b, along with the second interior wall 622b, all extend the entire length of the rail 540). The second rail side slot 602b may be characterized as being defined by the spacing between the rail lips 606a, 606b (on the second rail side 600b) in the vertical dimension 546, and which provides access to the second rail channel 604b. The second rail channel 604b may be characterized as being at least generally C-shaped.

The rail bottom 580 is again spaced from the rail top 560 in the vertical dimension 546 for the rail 540, and may be characterized as including a first rail bottom portion 582a, a second rail bottom portion 582b, and a third rail bottom portion 582c, with the third rail bottom portion 582c being located between the first rail bottom portion 582a and the second bottom rail portion 582b in the lateral dimension 542 for the rail 540. The first rail bottom portion 582a is defined by an upper surface 584a and a bottom surface 586a that are spaced from one another in the vertical dimension 546 to define a thickness for the corresponding portion of the rail bottom 580, with at least part of the upper surface 584a being convex relative to the first pocket 624 (e.g., a portion thereof that extends from the interior wall 620a). The second rail bottom portion 582b is defined by an upper surface 584b and a bottom surface 586b that are spaced from one another in the vertical dimension 546 to define a thickness for the corresponding portion of the rail bottom 580, with at least part of the upper surface 584b being convex relative to the second pocket 628 (e.g., a portion thereof that extends from the interior wall 620b). The third rail bottom portion 582c is defined by an upper surface 584c and a bottom surface 586c that are spaced from one another in the vertical dimension 546 to define a thickness for the corresponding portion of the rail bottom 580, with at least part of the upper surface 584c being convex relative to the third pocket 624 (the entirety of the upper surface 584c being convex relative to the third pocket 624 in the illustrated embodiment). The bottom surface 586c of the third rail bottom portion 582c is spaced in the direction of the rail top 560 relative to both the first rail bottom portion 582a and the second rail bottom portion 582b to define a rail bottom recess 588. In the illustrated embodiment, the rail bottom recess 588 is centrally disposed in the lateral dimension 542 for the rail 540. An appropriate seal or gasket may be positioned within this rail bottom recess 588.

The rail 540 further includes a third interior wall 620a and a fourth interior wall 620b that each extend from the rail top 560 (more specifically, the first rail top section 564a and the second rail top section 564b, respectively) to the rail bottom 580. The first interior wall 622a and the third interior wall 620a are spaced from one another in the lateral dimension 542 for the rail 540, with a first pocket 624 being defined by these walls 622a, 620a and corresponding portions of the rail top 560 (more specifically the first rail top section 564a) and the rail bottom 580. The first pocket 624 is defined by a closed perimeter and extends the entire length of the rail 540 from the rail end 610a to the rail and 610b. The second interior wall 622b and the fourth interior wall 620b are similarly spaced from one another in the lateral dimension 542 for the rail 540, with a second pocket 626 being defined by these walls 622b, 620b and corresponding portions of the rail top 560 (more specifically the second rail top section 564b) and the rail bottom 580. The second pocket 626 is defined by a closed perimeter and extends the entire length of the rail 540 from the rail end 610a to the rail end 610b.

The first pocket 624 is isolated from a third pocket 628 by the third interior wall 620a, while the second pocket 626 is isolated from this same third pocket 628 by the fourth interior wall 620b, with the third interior wall 620a being spaced in the lateral dimension 542 from the fourth interior wall 620b. A lower extreme of the third pocket 628 is closed by the third rail bottom portion 582c, and as such the rail bottom recess 588 is aligned with the third pocket 628 in the vertical dimension 546 for the rail 540. The third pocket 628 is also aligned in the vertical dimension 546 with the attachment fastener slot 562, and includes an upper section 630 and a lower section 632. The upper section 630 is wider than both the attachment fastener slot 562 and the lower section 632, and furthermore is located between the attachment fastener slot 562 and the lower section 632 in the vertical dimension 546 for the rail 540.

In summary, features of the rail 540 include: a first rail top section 564a and associated first groove 566a; a second rail top section 564b and associated second groove 566b; an attachment fastener slot 562; a first rail side 600a and an associated first rail side slot 602a and first rail channel 604a; a second rail side 600b and an associated second rail side slot 602b and second rail channel 604b; a first pocket 624 and associated interior walls 622a and 620a; a second pocket 626 and associated interior walls 622b and 620b; a third pocket 628 and associated interior walls 620a and 620b; a first rail bottom portion 582a; a second rail bottom portion 582b; and a third rail bottom portion 582c. Each of these features of the rail 540 extend the entire length of the rail 540, namely from the rail end 610a to the rail and 610b.

Figure 15B:
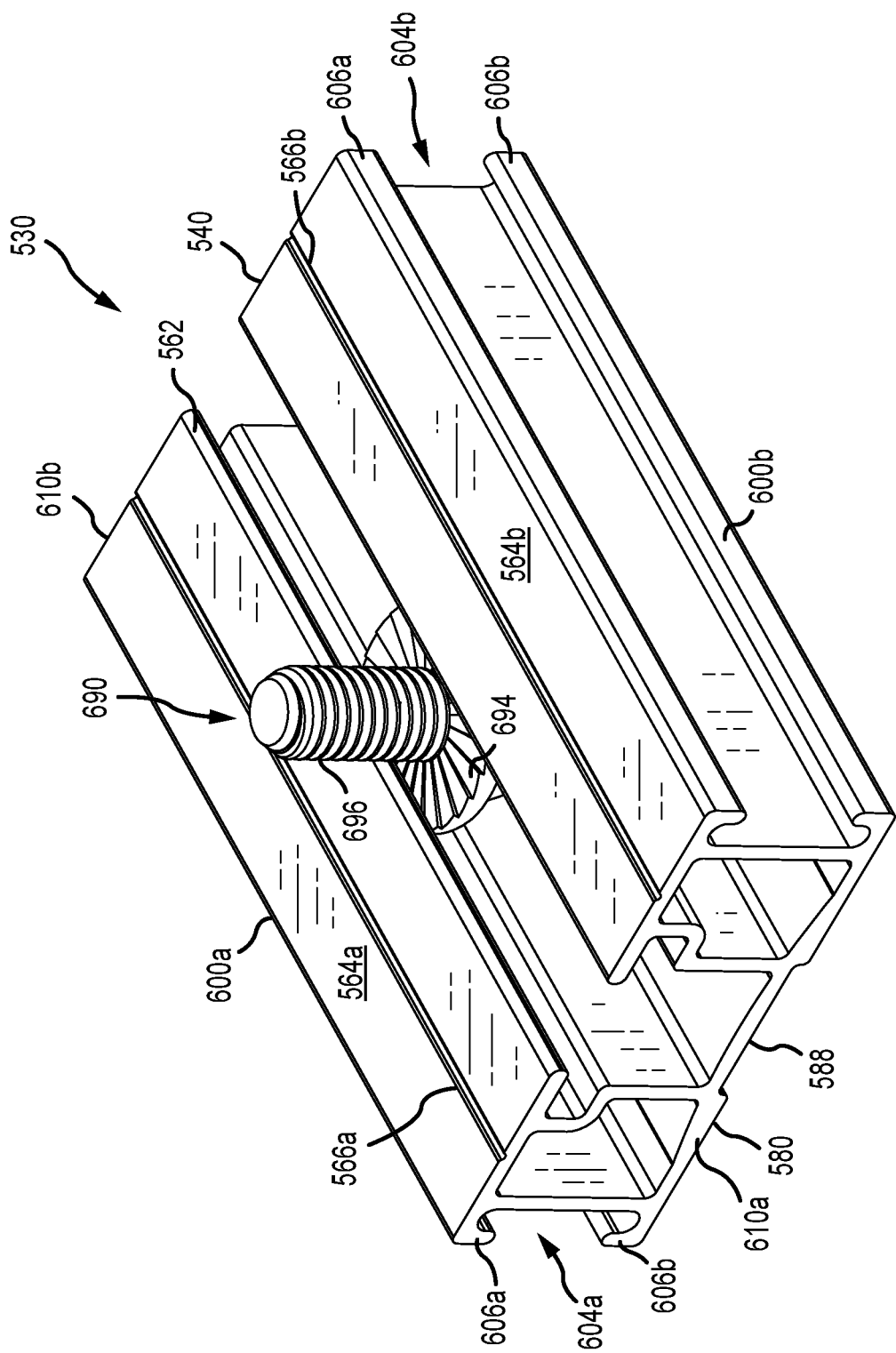
FIG. 15B is a perspective view showing the attachment fastener configuration of FIG. 15A.

FIGS. 15A and 15B show one embodiment of a fastener configuration for securing an attachment relative to the rail 540. A rail assembly 530 includes the rail 540 and one or more attachment fasteners 690 that may be spaced along the length dimension of the rail 540 for securing an attachment to the rail 540, namely the rail top 560. The illustrated attachment fastener 690 includes a head 692, a flange 694, a threaded shaft 696, and another nut (not shown, but see FIG. 16A). The head 692 for the attachment fastener 690 is positioned in the lower section 632 of the third pocket 628 for the rail 540 (by directing the attachment fastener 690 into the third pocket 620 through the rail end 610a or the rail end 610b). Preferably the width of the lower section 632 of the third pocket 628 limits the amount that the attachment fastener head 692 is able to rotate relative to the rail 540 (e.g., the attachment fastener head 692 is unable to rotate a full 360° relative to the rail 540). In the case where the head 692 includes a plurality of intersecting flats that define its perimeter, one flat may be disposed at least generally parallel to the fourth interior wall 620b, while another oppositely disposed flat may be disposed at least generally parallel to the second interior wall 620a. These flats may be in contact with or closely spaced from the corresponding interior walls 620a, 620b to limit the amount that the attachment fastener head 692 may rotate relative to the rail 540 prior to at least one of these flats engaging the corresponding interior wall 620a, 620b to thereafter preclude further rotation of the attachment fastener head 692 relative to the rail 540.

The flange 694 for the attachment fastener 690 has a larger effective diameter than the head 692, and is disposed within the upper section 630 of the third pocket 628. The shaft 696 is fixed relative to each of the head 692 and the flange 694, and extends upwardly through the attachment fastener slot 562 (e.g., for engagement with an attachment, such as by passing through an aperture of any type in the attachment). A nut (e.g., nut 698, shown in FIG. 16A) may be threaded onto the free end of the shaft 696 to clamp a corresponding portion of the attachment between this nut and the rail top 560.

Figure 16A:
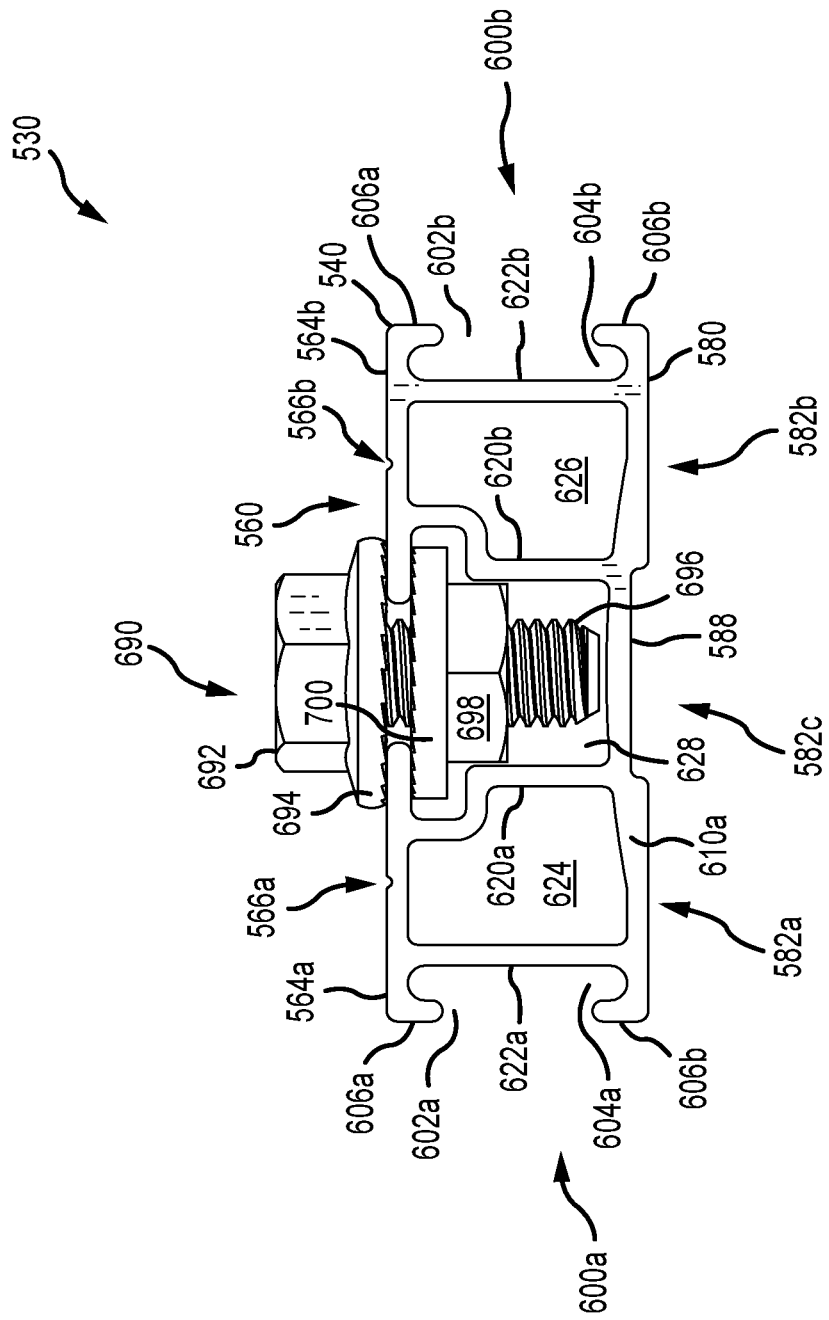
FIG. 16A is an end view of the rail shown in FIG. 13A, using another fastener configuration for securing an attachment relative to the rail.
Figure 16B:
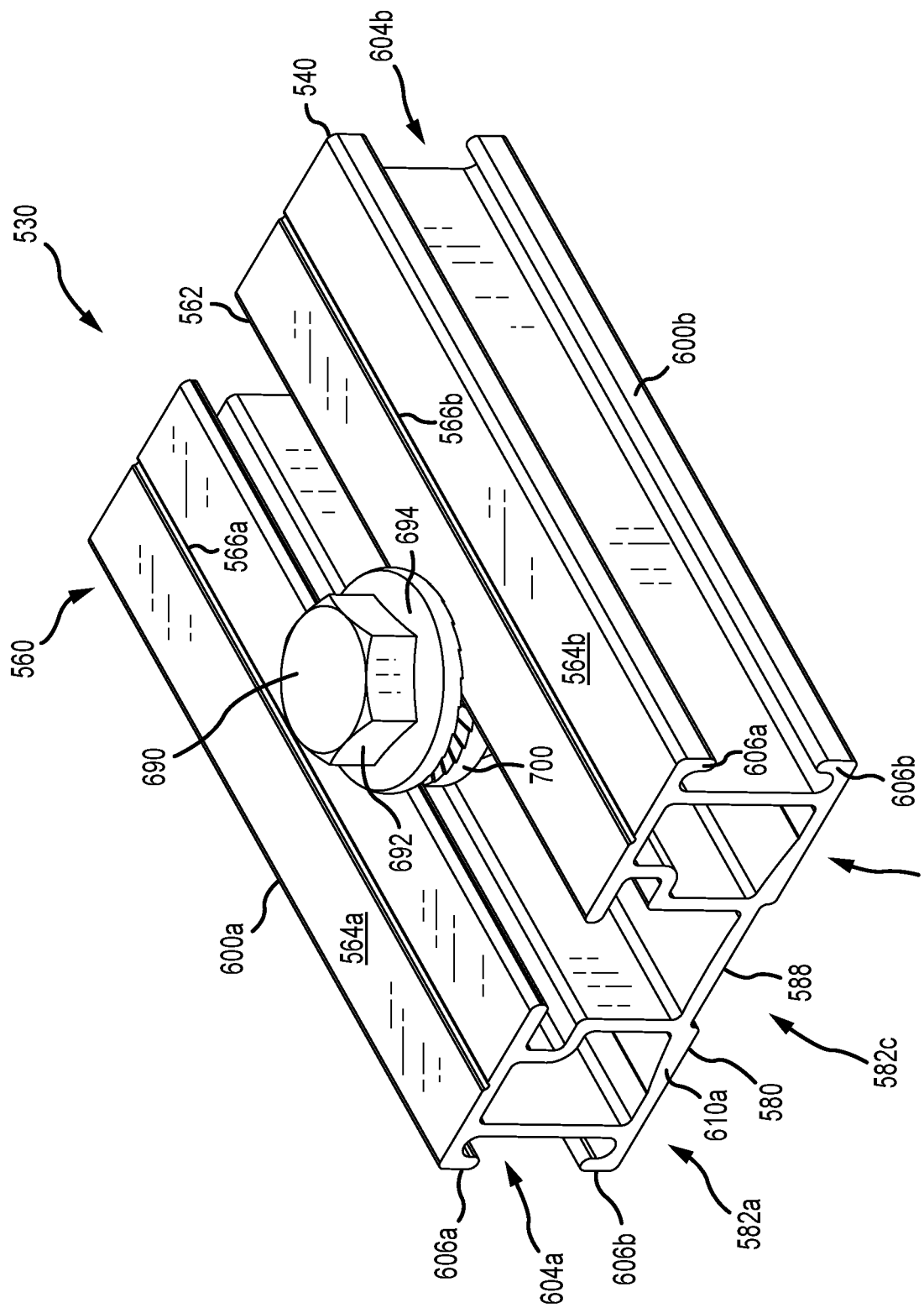
FIG. 16B is a perspective view showing the attachment fastener configuration of FIG. 16A.

FIGS. 16A and 16B show another embodiment of a fastener configuration for securing an attachment relative to the rail 540. Here, the rail assembly 530 uses one or more of the same general attachment fastener(s) 690, but the attachment fastener 690 in the FIG. 16A/B configuration is inverted compared to the FIG. 15A/B. Again, one or more attachment fasteners 690 that may be spaced along the length dimension of the rail 540 for securing an attachment to the rail 540 for the rail assembly 530 of FIGS. 16A and 16B, namely the rail top 560. The illustrated attachment fastener 690 again includes a head 692, a flange 694, and a shaft 696. However in this case, a nut 698 is positioned in the third pocket 628 for the rail 540 (by directing the nut 698 into the third pocket 628 either through the rail end 610a or the rail end 610b). This nut 698 includes a nut body that is disposed in the lower section 632 of the third pocket 628, along with a nut flange 700 that is disposed within the upper section 630 of the third pocket 628. Preferably the width of the lower section 632 of the third pocket 620 limits the amount that the nut 698 is able to rotate relative to the rail 540 (e.g., the nut 698 is unable to rotate a full 360° relative to the rail 540). In the case where the nut body 698 includes a plurality of intersecting flats on its perimeter, one flat may be disposed at least generally parallel to the fourth interior wall 620b, while another oppositely disposed flat may be disposed at least generally parallel to the second interior wall 620a. These flats may be in contact with or closely spaced from the corresponding interior walls 620a, 620b to limit the amount that the nut 698 may rotate relative to the rail 540 prior to at least one of these flats engaging the corresponding interior wall 620a, 620b to thereafter preclude further rotation of the nut 698 relative to the rail 540.

The flange 700 for the nut 698 has a larger effective diameter than the nut body, and is disposed within the upper section 630 of the third pocket 628. Again, the shaft 696 is fixed relative to each of the head 692 and the flange 694, but in this case the shaft 696 extends downwardly through the attachment fastener slot 562 (e.g., for engagement with an attachment, such as by first passing through an aperture of any type in the attachment) and then through the attachment fastener slot 562. The free end of the shaft 696 may then be threaded into the nut 698 to clamp a corresponding portion of the attachment between the fastener head 692 and the rail top 560.

Typically one or more attachment fasteners 690 in accordance with the foregoing will be used to secure an attachment to a rail 540, or one or more self-tapping or self-drilling screws may be used to secure an attachment to a rail 540 (e.g., using grooves 566a and/or 566b). However, there may be instances where one or more attachment fasteners 690 in accordance with the foregoing, along with one or more self-tapping or self-drilling screws (e.g., within grooves 566a and/or 566b), may be used to secure an attachment to a rail 540.

Figure 17A:
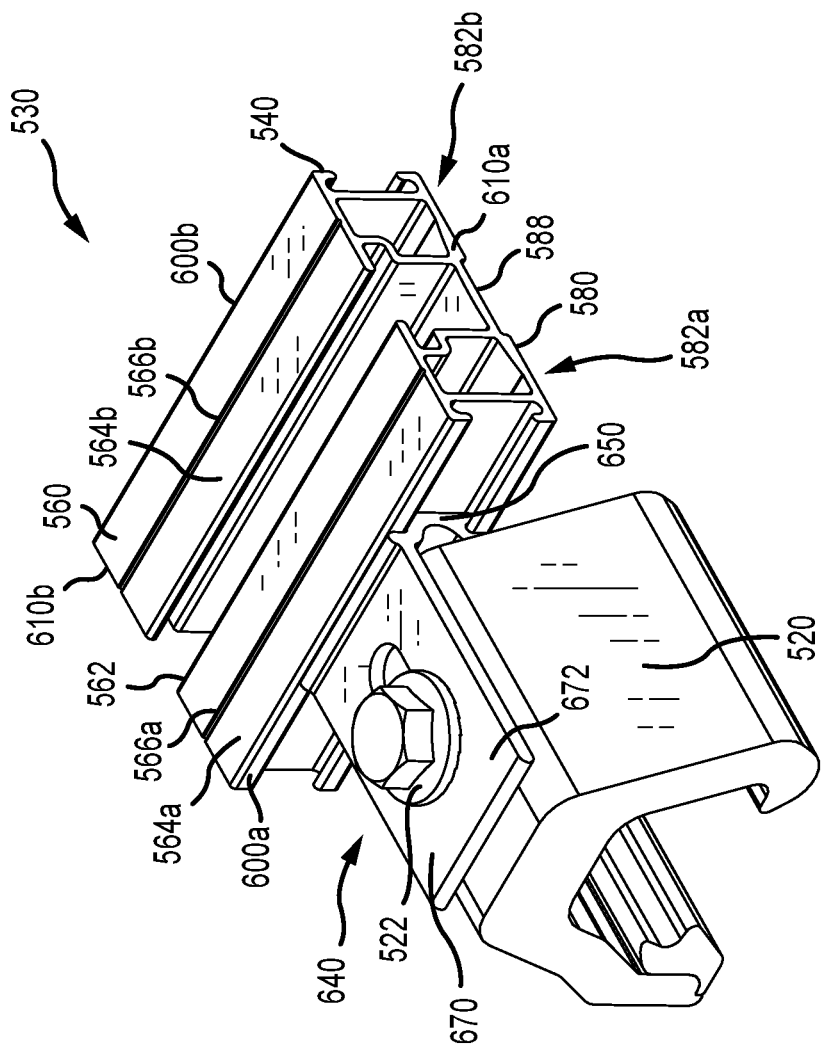
FIG. 17A is a perspective view of a rail assembly that uses the rail of FIG. 13A, a mounting adapter, and one embodiment of a mounting configuration for securing the rail relative to a building surface.
Figure 17B:
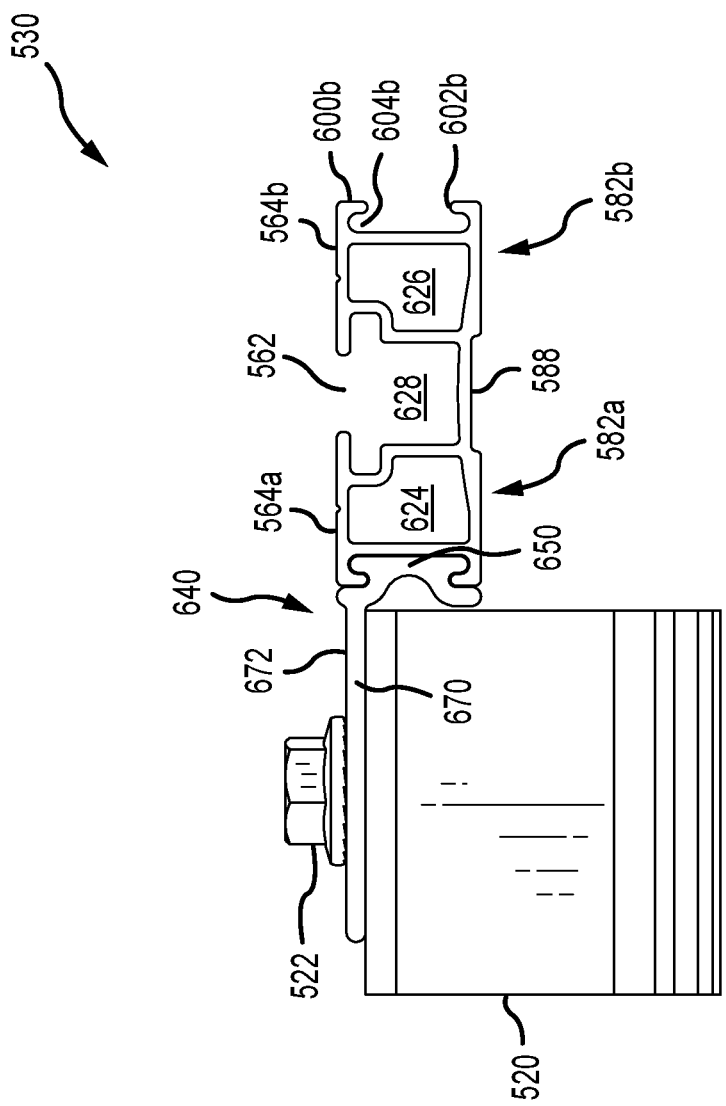
FIG. 17B is a side view of the rail assembly shown in FIG. 17A.
Figure 19A:
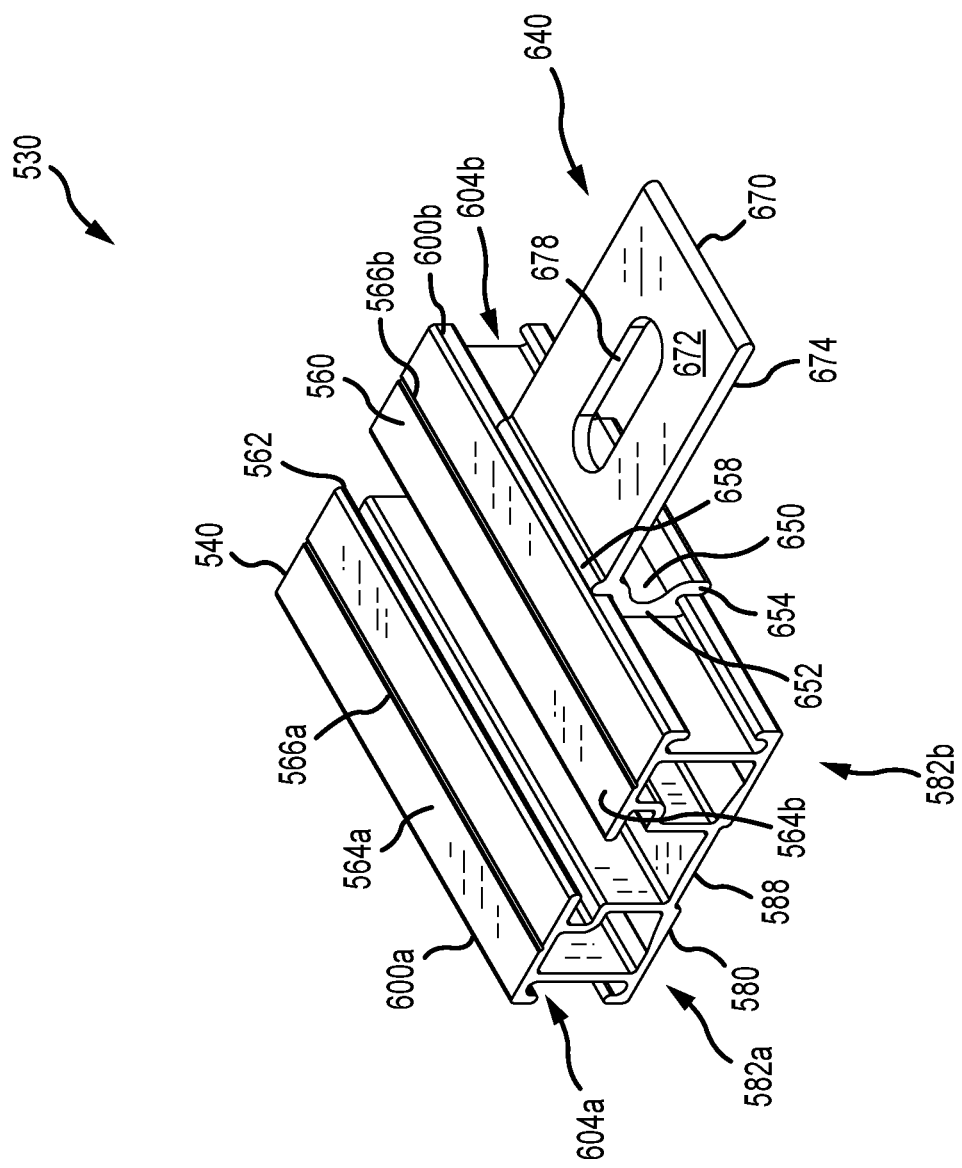
FIG. 19A is a perspective view of the rail assembly and mounting configuration shown in FIG. 17A, but without the mounting device.
Figure 19B:
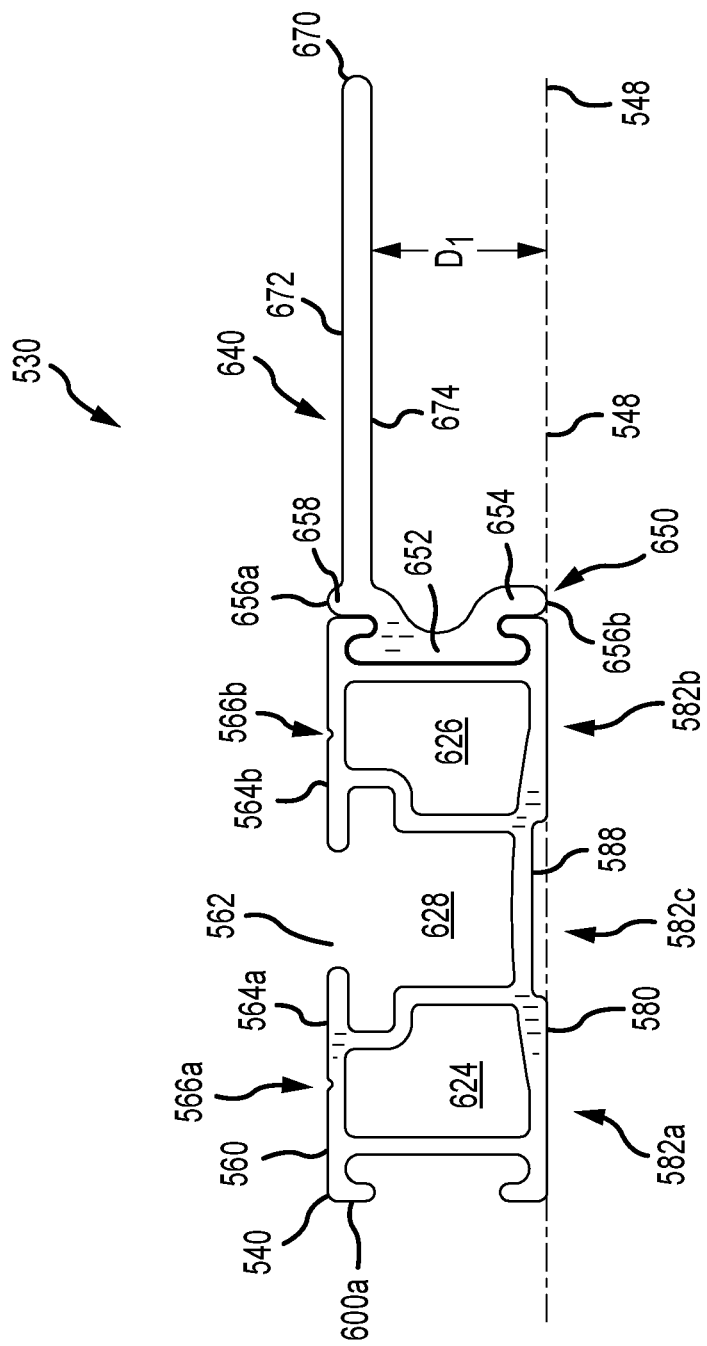
FIG. 19B is an end view of the rail assembly and mounting configuration shown in FIG. 19A.

One embodiment of a mounting configuration for indirectly securing the rail 540 relative to a building/roofing surface is illustrated in FIGS. 17A and 17B. Here the rail assembly 530 further includes a mounting adapter or clip 640, along with a mounting device 520 that is at least generally in accordance with the mounting device 100 discussed above in relation to FIGS. 2-9B. As such, the mounting device 520 would be positioned on a rib of a building/roofing surface, with the length dimension of the rail 540 being disposed at least generally perpendicular to the length dimension of such a rib. The adapter 640 is movably interconnected (e.g., slidably) with the rail 540 along its longitudinal dimension 544 and is detachably connected with the mounting device 520 by a mounting device anchoring fastener 522 and in accordance with the foregoing (including with regard to the attachment fastener 190 discussed above in relation to FIGS. 2-9B). Some time after the mounting adapter 640 has been slid along the rail 540 to the desired position, the position of the mounting adapter 640 could be fixed related to the rail 540 (e.g., by crimping one more portions of the corresponding rail channel 604a, 604b).

Additional details regarding the mounting adapter or clip 640 are presented in FIGS. 18A-18C. The adapter includes a coupling section 650 and a mounting flange 670. The coupling section 650 includes an inner coupling section 652 and an outer coupling section 654. The inner coupling section 652 may be slidably interconnected with the rail 540 on either the first rail side 600a (via first rail channel 604a) or the second rail side 600b (via second rail channel 604b). The inner coupling section 652 may be directed into either of the rail channels 604a or 604b through either the rail end 610a or the rail end 610b. The inner coupling section 652 may engage (or be disposed in closely spaced relation to) the inner surfaces of the lips or tabs 606a, 606b on the relevant rail side 600a, 600b, while the outer coupling section 654 may engage (or be disposed in closely spaced relation to) the outer surfaces of the lips or tabs 606a, 606b on the relevant rail side 600a, 600b.

The mounting flange 670 is at least generally in the form of a plate and has a first mounting flange surface 672 (e.g., planar or flat) and a second mounting flange surface 674 (e.g., planar or flat) that is spaced from the first mounting flange surface 672 in the vertical dimension 546. The mounting flange 670 may include an elongated mounting slot 678 (e.g., un-threaded) that extends entirely through the mounting flange 670 to facilitate interconnection of the adapter 640 with and underlying building/roofing surface (FIG. 18C), or the mounting flange 670 may include one or more mounting holes 676 (e.g., un-threaded) that extend entirely through the mounting flange 670 to facilitate interconnection of the adapter 640 with an underlying building/roofing surface. Self-tapping or self-drilling screws could be used to secure the mounting flange 670 to an underlying mounting device. In the case of using a threaded fastener with at least two heads positioned on a fastener shaft (with at least one of these heads being rotatable relative to the shaft to change the spacing between these two heads), it may be that the mounting slot 678 (FIG. 18C) or mounting hole(s) 676 (FIG. 18D) are not threaded).

The mounting adapter 640 not only may be installed on either the first rail side 600a or the second rail side 600b, but the mounting adapter 640 may be disposed in two different orientations relative to the rail 540 in order to accommodate two different mounting configurations. When the mounting adapter 640 is slidably interconnected with either the first rail channel 604a or the second rail channel 604b in the orientation shown in FIG. 18A (see also FIGS. 17A-17B and 19A-19B, which illustrate this same mounting configuration), the mounting adapter 640 is indirectly coupled with or attached to an underlying building/roofing surface through an intermediate mounting device, such as the mounting device 520 of FIGS. 17A and 17B (by directing one or more threaded fasteners through either the slot 678 (FIG. 18C) or hole 676 (FIG. 18D) and at least into the underlying mounting device 520. However and as noted, the mounting adapter 640 could be configured to be interconnected with a building/roofing surface using any of the mounting devices or brackets disclosed herein.

It should be appreciated that the rail 540 need not be entirely supported by one or more mounting devices that are interconnected with a given rail 540 by a corresponding mounting adapter 640. At least certain spaced portions of the rail bottom 580 could also be positioned directly on the underlying building/roofing surface (e.g., on upper ends of ribs incorporated by the building/roofing surface). Consider the case where the rail bottom 580 is positioned on a reference plane 548 (e.g., the bottom surface 586a of the first rail bottom portion 582a and the bottom surface 586b of the second rail bottom portion 582b would be contained within this reference plane 548). The second mounting flange surface 674 (which is the portion of the mounting flange 670 that is closest to this reference plane 548 for this mounting configuration) is separated from this reference plane 548 by a distance $D_1$ for the mounting configuration shown in each of FIG. 18A, 17A-17B, and 19A-19B.

The mounting adapter 640 may also be directly attached to an underlying building/roofing surface. In this case, the mounting adapter 640 would be disposed in the orientation shown in FIG. 18B (as well as in FIGS. 20A and 20B). Typically this mounting configuration will be used when the building/roofing surface includes a plurality of ribs that each have flat upper end (such that the adapter mounting or anchoring fastener(s) will pass through the mounting flange 670 and thereafter will be directed through the flat upper end of an underlying rib). The mounting adapter 640 would extend from the rail 540 along the length dimension of the corresponding rib in overlying relation to its flat upper end, and as previously noted with the length dimension of rail 540 typically being disposed at least generally perpendicular to the length dimension of these ribs. The rail 540 will typically be disposed over at least two of these ribs for this mounting configuration. It should be appreciated that the rail bottom 580 (more specifically the first rail bottom portion 582a and the second rail bottom portion 582b) may be directly position on the flat upper end of two or more ribs of the building/roofing surface.

A seal 720 is disposed between the first mounting flange surface 672 and the underlying building/roofing surface for the illustrated embodiment. The seal 720 could actually be attached to the first mounting flange surface 672 at some point in time prior to installing the rail assembly 530 on a building/roofing surface. In any case, one or more mounting fasteners (e.g., screws) may be directed through the mounting flange 670 (e.g., slot 678, hole 676) and into the underlying building surface. Typically each such screw will extend through a flat upper end of an underlying rib of the building surface, and may terminate within a hollow interior of such a rib.

Figure 20A:
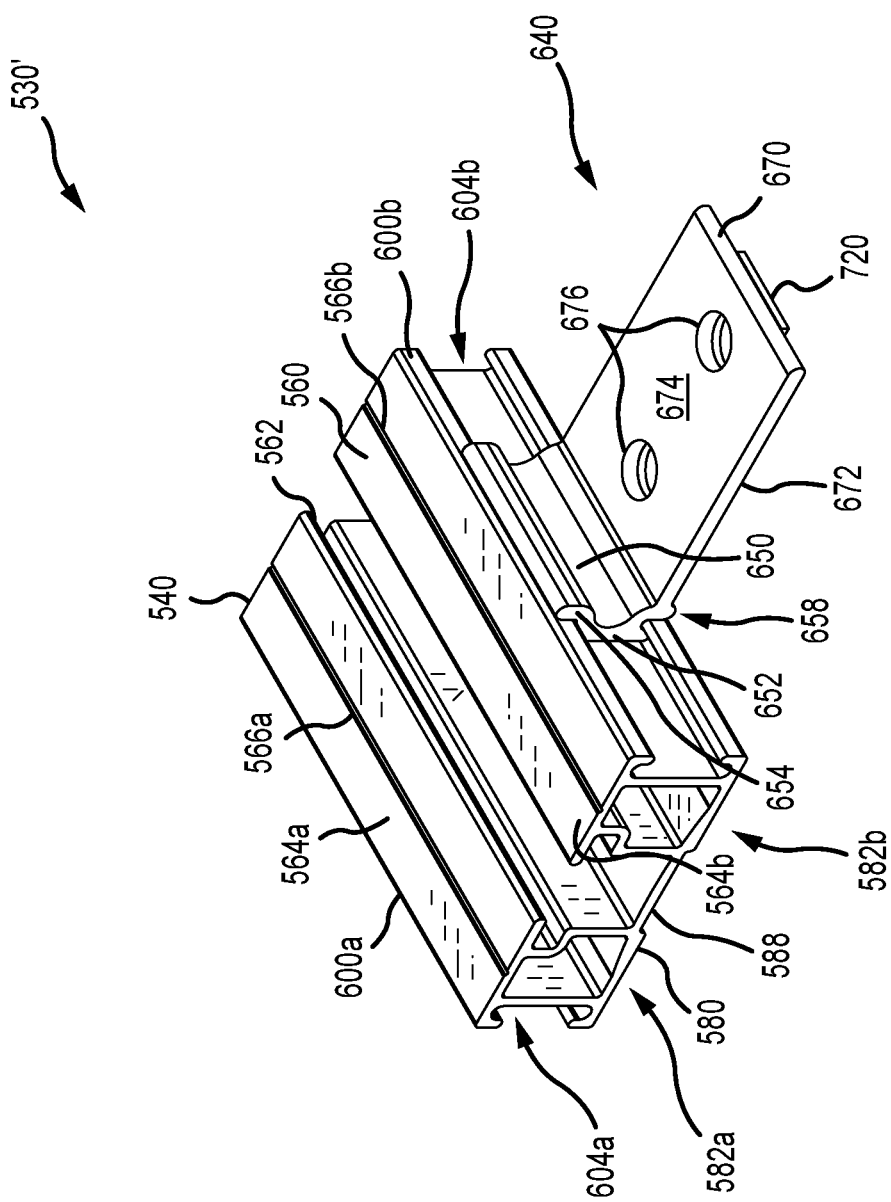
FIG. 20A is a perspective view of a rail assembly that uses the rail of FIG. 13A and the adapter of FIG. 17A, but with the adapter being inverted relative to the rail to provide the mounting configuration shown in FIG. 18B.
Figure 20B:
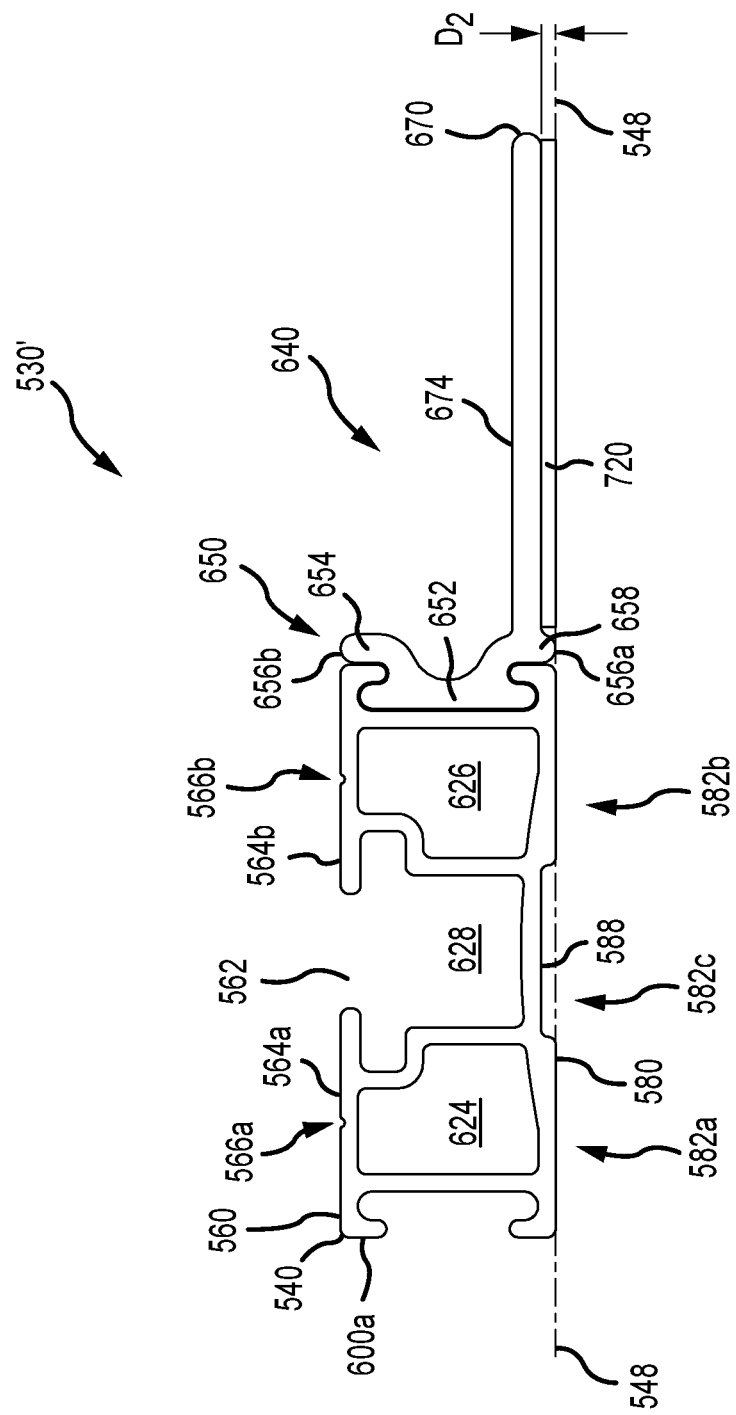
FIG. 20B is an end view of the rail assembly shown in FIG. 20A.

The mounting flange 670 for the rail assembly 530 is disposed or located between opposing ends 656a, 656b of the outer coupling section 654 in the vertical dimension 546 for the rail 540. Stated another way, the outer coupling section 654 includes a projection 658 that protrudes relative to the first mounting flange surface 672. This projection 658 is disposed adjacent to the first surface 672 of the mounting flange 670, and is located between this first surface 672 and the rail 540 in its lateral dimension 542. The apex of this projection 658 may be disposed within the above-noted reference plane 548, which again contains the bottom surface 586a of the first rail bottom portion 582a and the bottom surface 586b of the second rail bottom portion 582b. In any case, the first mounting flange surface 672 (which is the portion of the mounting flange 670 that is closest to this reference plane 548 for this mounting configuration) is separated from this reference plane 548 by a distance $D_2$ for the mounting configuration shown in each of FIGS. 18B, 20A, in 20B. One embodiment has this distance $D_2$ being within a range of 0.050" to about 0.055". The distance $D_2$ for the mounting configuration of FIGS. 18B, 20A, and 20B is substantially less than the distance $D_1$ for the mounting configuration of FIGS. 17A, 17B, 18A, 19A, and 19B. The ratio of $D_2/D_1$ may be at least 9 in one embodiment, may be at least 10 in another embodiment, and may be between about 10-11 in another embodiment.

Figure 21:
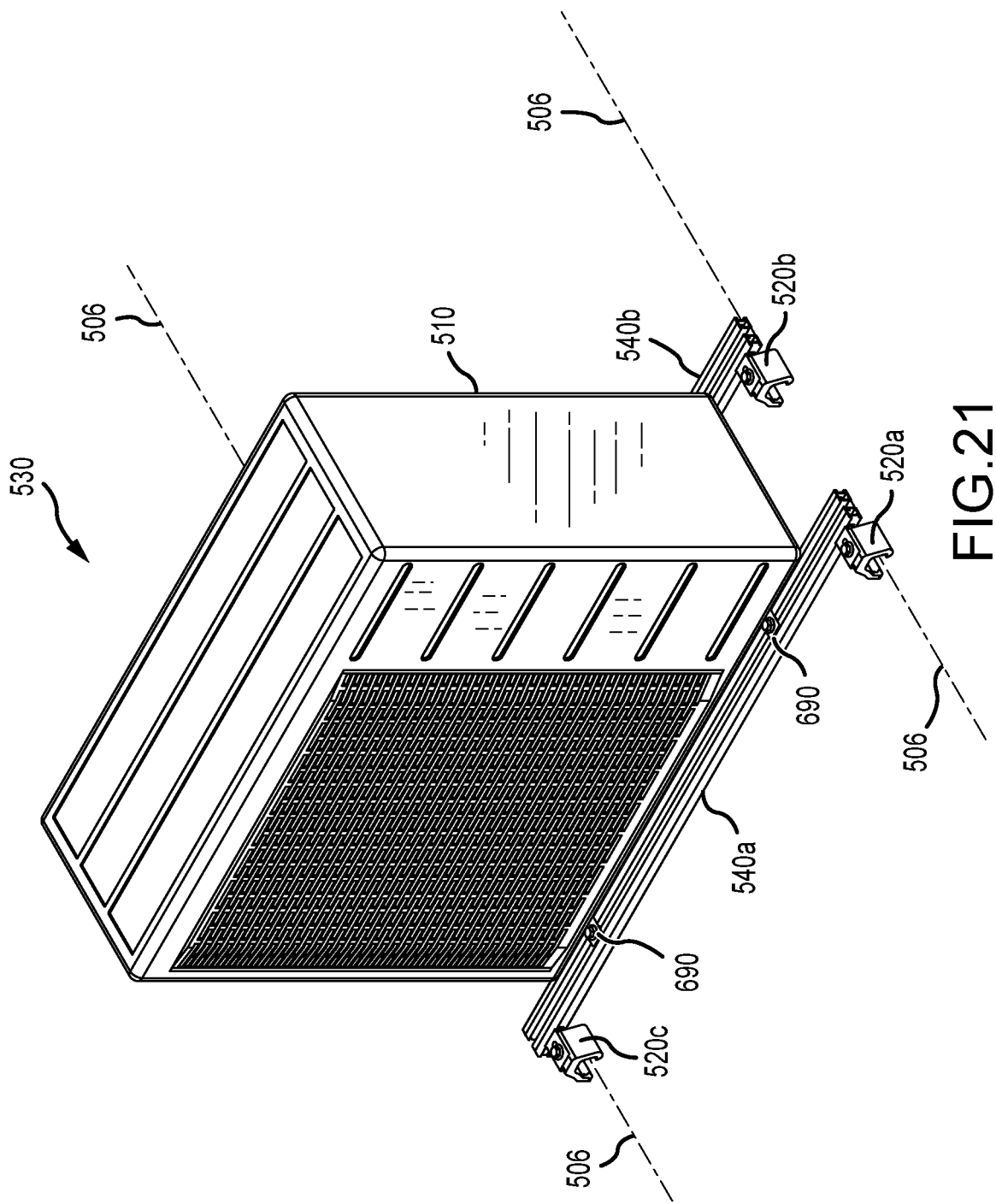
FIG. 21 is a perspective view of an air-conditioning unit being installed on a pair of rails using adapters and mounting devices using the mounting configuration shown in FIGS. 17A and 17B.

FIG. 21 illustrates using the rail assembly 530 to install an air conditioning unit 510 on a building/roofing surface that has a plurality of ribs (the rail assembly 530, mounting devices 520, and air conditioning unit 510 may be characterized as collectively defining a building/roofing system). The length dimension for these ribs is represented by dashed lines 506 in FIG. 21. In this embodiment, first and second mounting devices 520a, 520b are each attached to one rib at locations that are spaced along its length dimension and are also interconnected with rails 540a, 540b, respectively, by a corresponding mounting adapter 640 in accordance with the foregoing. A third mounting devices 520c and a fourth mounting device 520 (not shown in FIG. 21) are each attached to another rib at locations that are spaced along its length dimension, with the third mounting device 520 being interconnected with the rails 540a by a corresponding mounting adapter 640 in accordance with the foregoing and with the fourth mounting device 520 being interconnected with the rail 540b by a corresponding mounting adapter 640 in accordance with the foregoing.

Figure 22A:
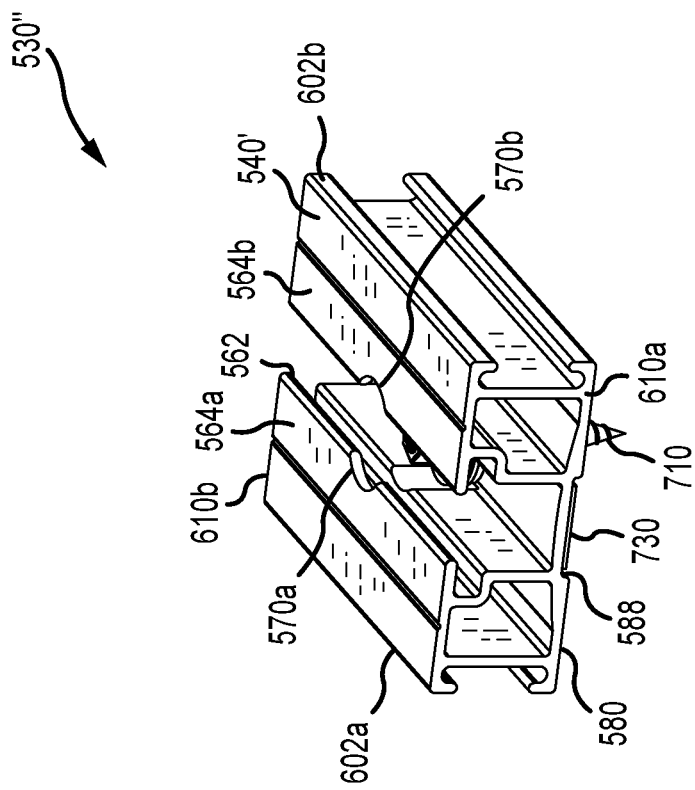
FIG. 22A is a perspective view of a variation of the rail shown in FIG. 13A that provides a third embodiment of a mounting configuration for directly securing the rail to a building/roofing surface.
Figure 22B:
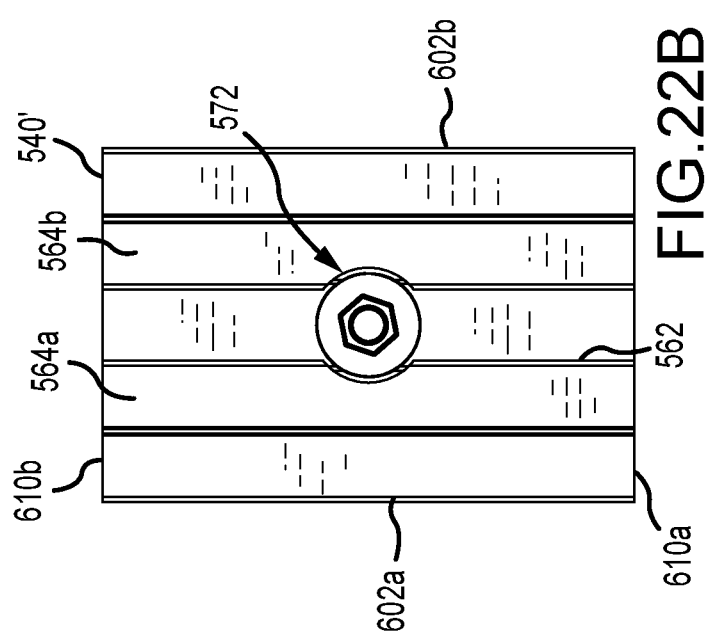
FIG. 22B is a top view of the rail shown in FIG. 22A.
Figure 22C:
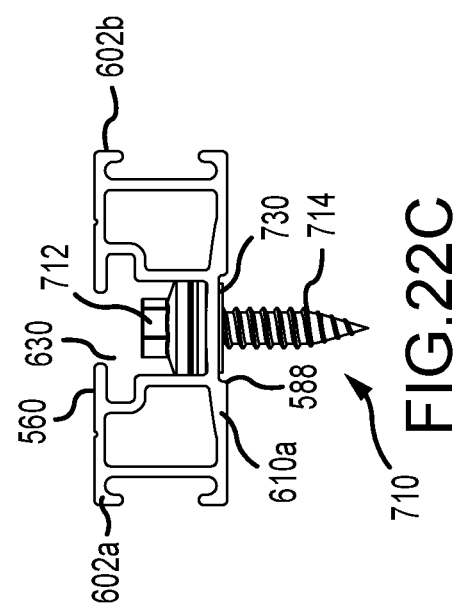
FIG. 22C is an end view of the rail shown in FIG. 22A, and illustrates using at least one threaded rail mounting fastener that extends through the bottom of the rail and into the underlying building/roofing surface.

A rail 540 may be mounted (indirectly) to a building surface using at least one mounting device, and more typically a plurality of mounting devices, using a corresponding mounting adapter 640, again where each such mounting device is mounted/secured to the building/roofing surface and where a mounting adapter 640 is mounted/secured to a mounting device. A rail may be adapted for direct attachment to a building surface. One such rail is disclosed in FIGS. 22A-22C and is identified by reference numeral 540'. The rail 540' includes one or more rail mounting fastener accesses 572 that are spaced along its longitudinal dimension 544 (see FIGS. 23A and 23B). Each rail mounting fastener access 572 is defined by a cutout 570a in the first rail top section 564a that intersects the attachment fastener slot 562, along with an oppositely disposed cutout 570b in the second rail top section 564b that also intersects with the attachment fastener slot 562. As such, each rail mounting fastener access 572 is collectively defined by corresponding cutouts 570a, 570b and a portion of the attachment fastener slot 562 that is disposed therebetween. An effective diameter of each rail mounting fastener access 572 is larger than a width of the attachment fastener slot 562 that does not include any rail mounting fastener access 572. Stated another way, an effective diameter of each rail mounting fastener access 572 is larger than a width of the two portions of the attachment fastener slot 562 that extend from the corresponding rail mounting fastener access 572.

A rail mounting fastener 710 (e.g., a screw, and including a self-tapping or self-drilling screw) may be directed through a mounting rail fastener access 572 on the rail top 560, may be directed through the third rail bottom portion 582c, and may be directed through an underlying portion of a building surface (e.g., a flat upper end of a rib). The rail mounting fastener 710 may include a head 712 and a shaft 714 that is fixed relative to and extends from this head 712. The head 712 could be configured so as to be entirely retained within the lower section 632 of the third pocket 628 for the rail 540 so as to not interfere with an attachment fastener 690 that is used to secure an attachment to the rail 540, although such need not always be the case. A rail seal 730 may be disposed within the rail bottom recess 588 such that the shaft 714 of the rail mounting fastener 710 would also extend through this rail seal 730.

Figure 23A:
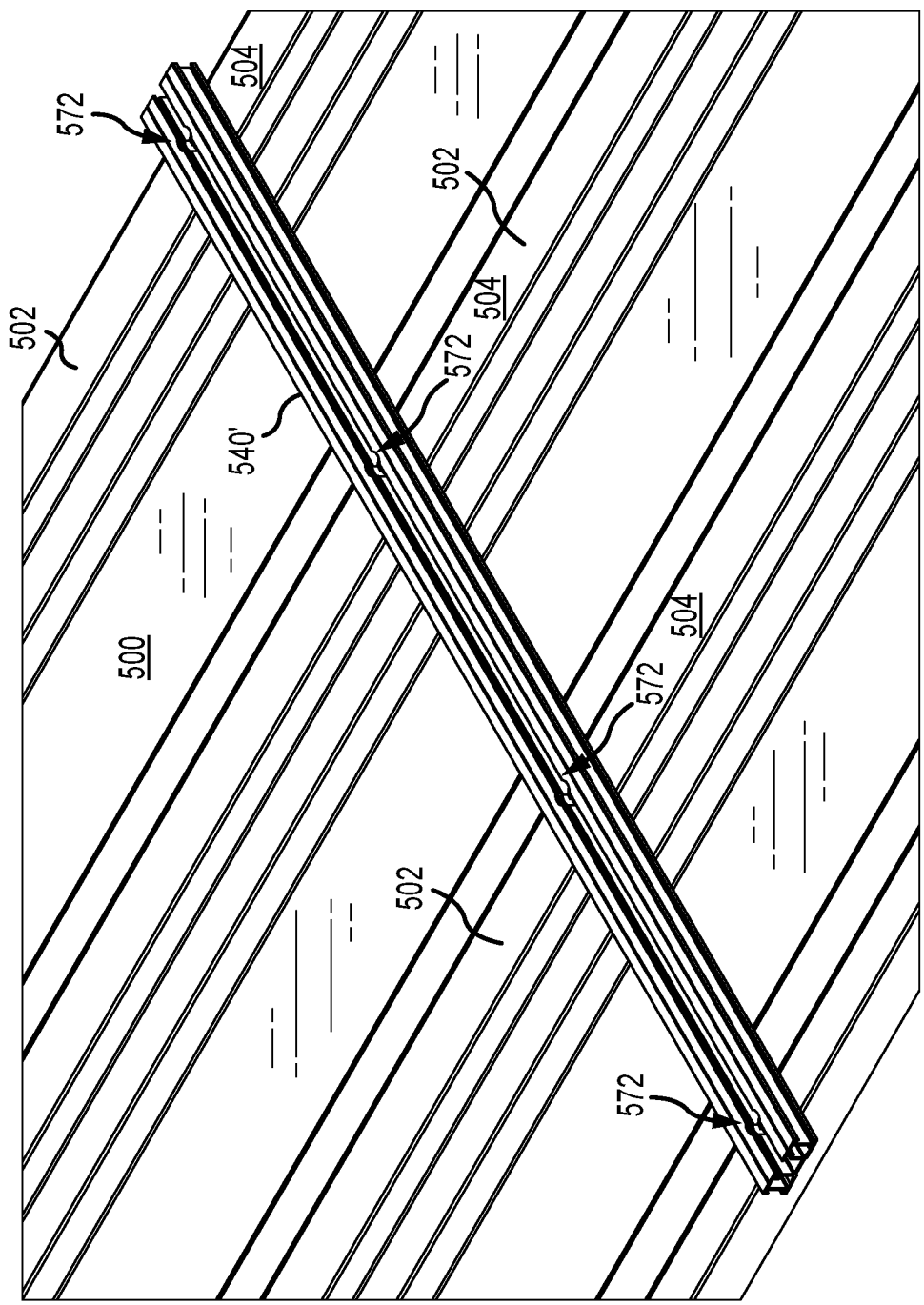
FIG. 23A is a perspective view of the rail shown in FIG. 22A, in position on a building/roofing surface having a plurality of ribs.
Figure 23B:
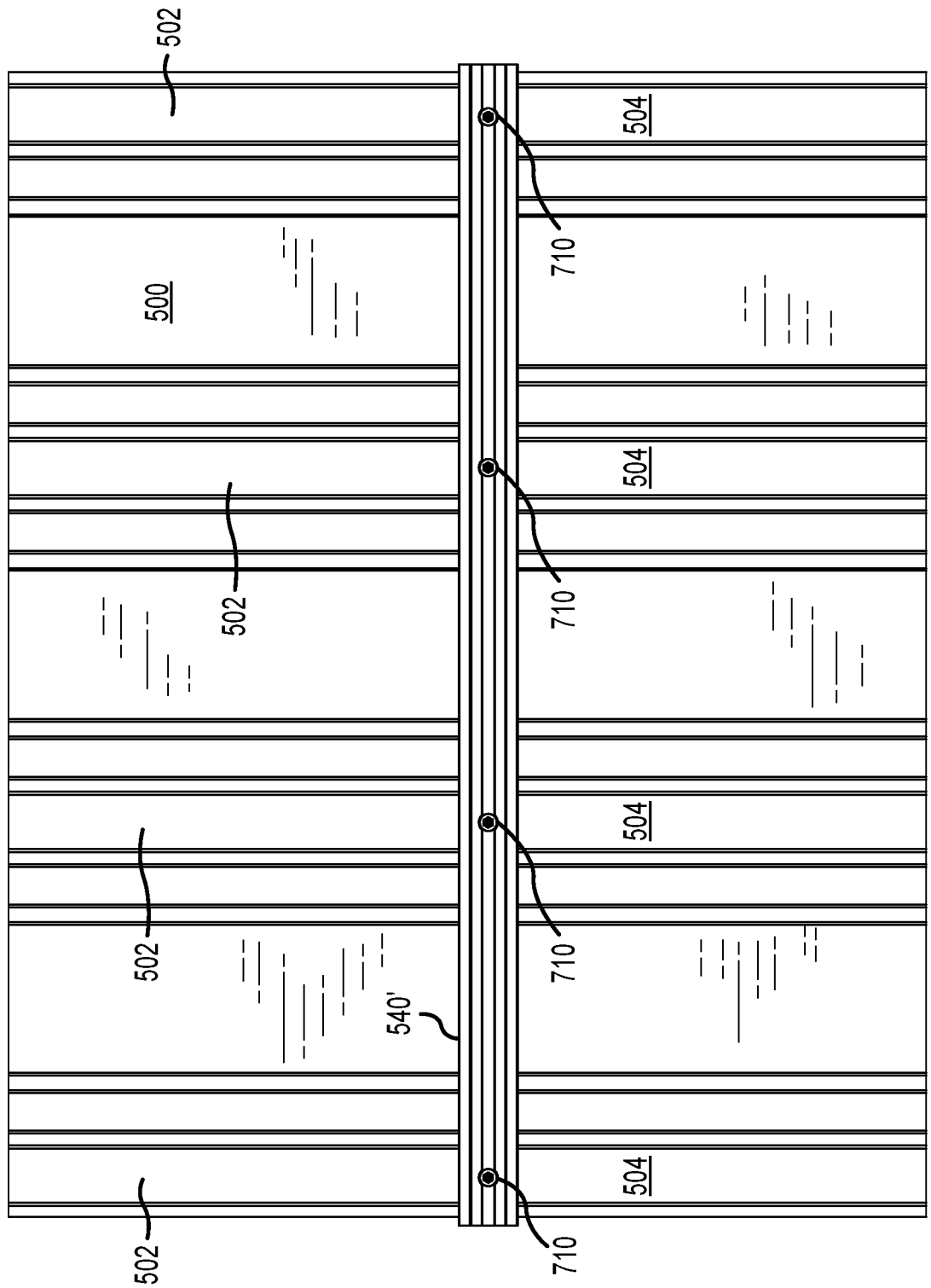
FIG. 23B is a top view of the rail shown in FIG. 22A secured to a building/roofing surface having a plurality of ribs.

FIGS. 23A and 23B show a rail 540' positioned on a building/roofing surface 500 having a plurality of ribs 502. These ribs 502 are parallel to one another and each such rib 502 includes a flat upper end 504. The rail 540' is positioned directly on at least two of these ribs 502, more specifically a corresponding part of its first rail bottom portion 582a and a corresponding part of it second rail bottom portion 582b. Again, the length dimension of the rail 540' (as well as the rail 540 discussed above, including for each of the mounting configuration shown in FIG. 17A/19A and the mounting configuration shown in FIG. 20A) will typically be oriented so as to be at least generally perpendicular to the length dimension of the ribs 502. The rail 540' will be directly attached to at least two of these ribs 502 using a suitable rail mounting fastener 710 that extends through a flat upper end 504 of a corresponding rib 502 (and that may terminate within a hollow interior of the corresponding rib 502).

Figure 24A:
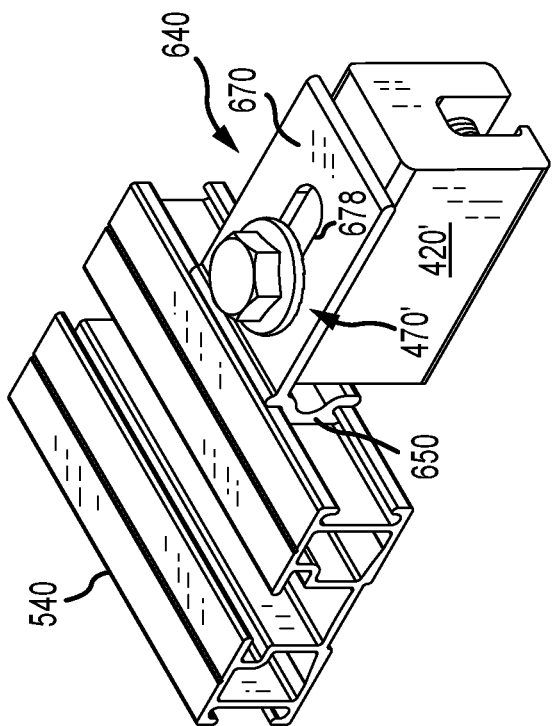
FIGS. 24A-24C are perspective, side, and end views, respectively, of a rail assembly that uses a mounting device at least generally of the type shown in FIG. 12C.
Figure 24B:
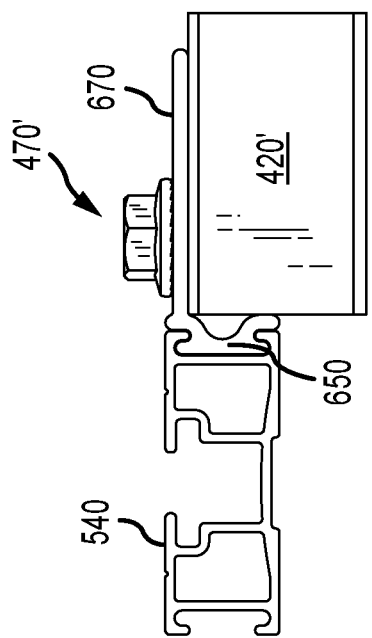
Figure 24C:
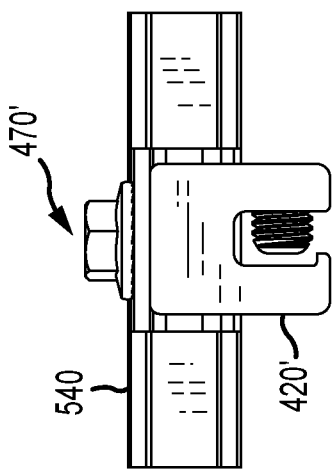

FIGS. 24A-C illustrate a rail assembly uses a rail 540, a mounting adapter 640, and a mounting device 420' that is at least generally similar to the mounting device 420 discussed above in relation to FIG. 12C. However, the mounting device 420' does not utilize a receptacle 460 (and thereby the "single prime" designation in relation to mounting device 420'). In addition, the mounting fastener 470' shown in FIGS. 24A-24C may extend though the mounting slot 678 of the mounting flange 670 and may threadably engage with the body of the mounting device 420'.

Figure 25A:
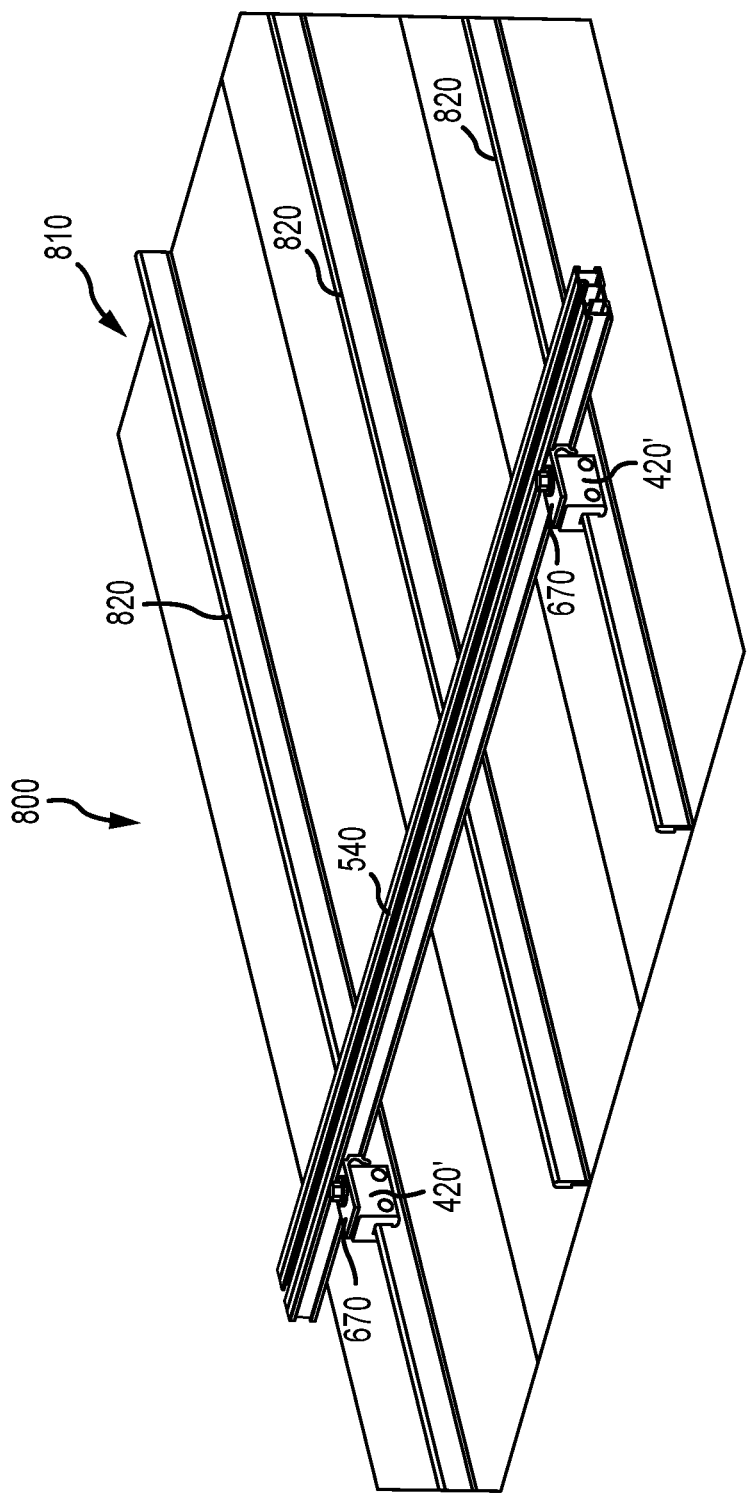
FIG. 25A illustrates a rail assembly in accordance with FIGS. 24A-24C installed on a standing seam panel assembly.
Figure 25B:
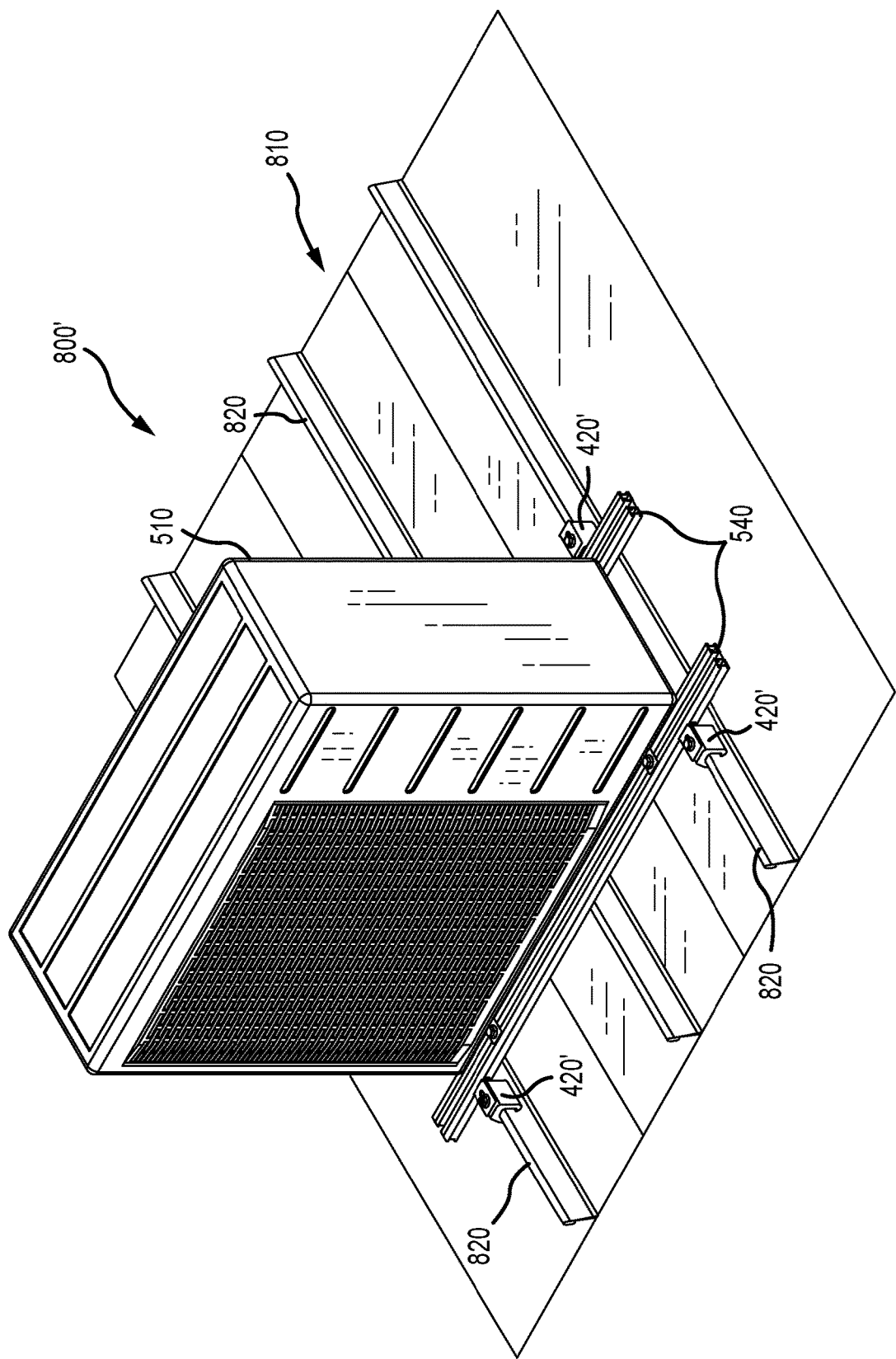
FIG. 25B illustrates a building/roofing system that uses a pair of rail assemblies in accordance with FIGS. 24A-24C to install an air conditioning unit on a standing seam panel assembly.

FIG. 25A shown a building/roofing system 800 that includes a panel assembly 810, which in turn incorporates a plurality of standing seams 820. The rail assembly shown in FIGS. 24A-24C is mounted on two of these standing seams 820. FIG. 25B shows a building/roofing system 800' that uses a pair of the rail assembly shown in FIGS. 24A-24C to support an air conditioning unit 510.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A rail assembly attachable to a building surface, wherein the rail assembly comprises a rail that in turn comprises a one-piece body, wherein the one-piece body comprises:
   a rail top comprising an attachment fastener slot that extends along an entire length of the one-piece body that is within a longitudinal dimension;
   a rail bottom that is spaced from the rail top in a vertical dimension;
   a first rail side comprising a first rail channel that extends along the entire length of the one-piece body;
   a second rail side comprising a second rail channel that extends along the entire length of the one-piece body, wherein the first and second rail sides are spaced from one another in a lateral dimension that is orthogonal to the longitudinal dimension;
   a first pocket having a closed perimeter and that extends along the entire length of the one-piece body, wherein a first rail bottom portion of the rail bottom defines a lower extreme of the first pocket;
   a second pocket having a closed perimeter and that extends along the entire length of the one-piece body, wherein a second rail bottom portion of the rail bottom defines a lower extreme of the second pocket; and
   a third pocket that is disposed between the first pocket and the second pocket in the lateral dimension and that extends along the entire length of the one-piece body, the third pocket comprising:
      an upper section which is of a first width; and
      a lower section which is of a second width, wherein the second width is of a smaller magnitude than the first width, and wherein the attachment fastener slot extends to the upper section such that the upper section is located between the attachment fastener slot and the lower section in the vertical dimension; wherein a third rail bottom portion of the rail bottom defines a lower extreme of the third pocket;
   wherein the first rail channel is adjacent to but isolated from the first pocket, and wherein the second rail channel is adjacent to but isolated from the second pocket; and
   wherein the first pocket is spaced from the second pocket by a distance greater than the second width.

2. The rail assembly of claim 1, further comprising:
   a first wall between the first pocket and the third pocket;
   a second wall between the second pocket and the third pocket; and
   a first outer wall between the first pocket and the first rail channel, the first outer wall extending from the rail top to the rail bottom.

3. The rail assembly of claim 1, further comprising a seal within a recess defined by the third rail bottom portion being recessed in a direction of the rail top relative to each of the first and second rail bottom portions.

4. The rail assembly of claim 1, further comprising:
   a first groove on the rail top that extends along the entire length of the rail in alignment with the first pocket within the vertical dimension; and
   a second groove on the rail top that extends along the entire length of the rail in alignment with the second pocket within the vertical dimension.

5. The rail assembly of claim 1, wherein a ratio of a maximum width of the rail to a maximum height of the rail is at least 2.6.

6. The rail assembly of claim 1, further comprising an attachment fastener that is movable along the attachment fastener slot in the longitudinal dimension and that comprises a first head, a threaded shaft, and a second head, wherein at least one of the first and the second heads is rotatable relative to the threaded shaft, wherein the threaded shaft is extendable through the attachment fastener slot and the first head is positionable beyond the rail top, wherein the second head is positionable within the third pocket.

7. A rail assembly attachable to a building surface, comprising:
   a rail that in turn comprises a one-piece body, the one-piece body comprising:
      a rail top, comprising:
         an attachment fastener slot that extends along an entire length of the one-piece body that is within a longitudinal dimension; and
         first and second cutouts that intersect the attachment fastener slot to collectively define a rail mounting fastener access through the rail top, wherein an effective diameter of the rail mounting fastener access is larger than a width of an entirety of the attachment fastener slot outside of the rail mounting fastener access;
      a rail bottom that is spaced from the rail top in a vertical dimension;
      a first rail side comprising a first rail channel that extends along the entire length of the one-piece body;
      a second rail side comprising a second rail channel that extends along the entire length of the one-piece body, wherein the first and second rail sides are spaced from one another in a lateral dimension that is orthogonal to the longitudinal dimension;
      a first pocket having a closed perimeter and that extends along the entire length of the one-piece body, wherein a first rail bottom portion of the rail bottom defines a lower extreme of the first pocket, and wherein the first rail channel is adjacent to but isolated from the first pocket;
      a second pocket having a closed perimeter and that extends along the entire length of the one-piece body, wherein a second rail bottom portion of the rail bottom defines a lower extreme of the second pocket, and wherein the second rail channel is adjacent to but isolated from the second pocket; and
      a third pocket that is located between the first pocket and the second pocket in the lateral dimension, wherein the third pocket is isolated from each of the first and second pockets, wherein the third pocket extends along the entire length of the one-piece body, wherein the third pocket comprises:
- an upper section which is of a first width; and
- a lower section which is of a second width, wherein the second width is of a smaller magnitude than the first width, and wherein the attachment fastener slot extends to the upper section such that the upper section is located between the attachment fastener slot and the lower section in the vertical dimension, wherein the first pocket is spaced from the second pocket by a distance greater than the second width, and wherein a lower extreme of the third pocket is defined by a third rail bottom portion of the rail bottom; and, a threaded rail mounting fastener, where a maximum diameter of the threaded rail mounting fastener is less than the effective diameter of the rail mounting fastener access.

8. The rail assembly of claim 1, wherein the first and second rail channels are of a common configuration and are the mirror image of one another.

9. The rail assembly of claim 1, wherein the first pocket is located between the first rail side and the third pocket in the lateral dimension, and wherein the second pocket is located between the second rail side and the third pocket in the lateral dimension.

10. The rail assembly of claim 1, wherein the attachment fastener slot has a third width, and wherein the third width is of a smaller magnitude than the first width.

11. The rail assembly of claim 10, further comprising an attachment fastener that is movable along the attachment fastener slot in the longitudinal dimension and that comprises a first head, a threaded shaft, and a second head, wherein at least one of the first and the second heads is rotatable relative to the threaded shaft, wherein the threaded shaft is extendable through the attachment fastener slot and the first head is positionable beyond the rail top, wherein the second head comprises a flange and a body, wherein the flange is positionable within the upper section of the third pocket, and wherein the body is positionable at least partially within the lower section of the third pocket.

12. The rail assembly of claim 11, wherein the second width of the lower section of the third pocket is selected to limit rotation of the body of the second head.

13. The rail assembly of claim 10, wherein the third width is of a smaller magnitude than the second width.

14. The rail assembly of claim 1, further comprising an adapter that is slidably engageable with the first rail channel, comprising:
- a coupling section with an inner coupling portion positionable within the first rail channel; and
- a mounting flange;
- an outer coupling portion spaced from the inner coupling portion, and wherein the first rail channel is defined in part by a first rail lip captured between the inner and outer coupling portions when the adapter is slidably engaged with the first rail channel.

15. The rail assembly of claim 1, wherein the rail does not intersect a reference plane defined by an upper surface of the rail top.

16. A rail assembly attachable to a building surface, comprising:
- a rail that comprises a one-piece body, the one-piece body comprising:
  - a rail top comprising an attachment fastener slot that extends along an entire length of the one-piece body that is within a longitudinal dimension;
  - a rail bottom that is spaced from the rail top in a vertical dimension;
  - a first rail side comprising a first rail channel that extends along the entire length of the one-piece body;
  - a second rail side comprising a second rail channel that extends along the entire length of the one-piece body, wherein the first and second rail sides are spaced from one another in a lateral dimension that is orthogonal to the longitudinal dimension;
  - a first pocket having a closed perimeter and that extends along the entire length of the one-piece body, wherein a first rail bottom portion of the rail bottom defines a lower extreme of the first pocket, and wherein the first rail channel is adjacent to but isolated from the first pocket;
  - a second pocket having a closed perimeter and that extends along the entire length of the one-piece body, wherein a second rail bottom portion of the rail bottom defines a lower extreme of the second pocket, and wherein the second rail channel is adjacent to but isolated from the second pocket; and
  - a third pocket that is disposed between the first pocket and the second pocket in the lateral dimension and that extends along the entire length of the one-piece body, the third pocket comprising:
    - an upper section which is of a first width; and
    - a lower section which is of a second width that is of a smaller magnitude than the first width, wherein the attachment fastener slot extends to the upper section such that the upper section is located between the attachment fastener slot and the lower section in the vertical dimension; and wherein a third rail bottom portion of the rail bottom defines a lower extreme of the third pocket; and
- an attachment fastener that is movable along the attachment fastener slot in the longitudinal dimension and that comprises a first head, a threaded shaft, and a second head, wherein at least one of the first and the second heads is rotatable relative to the threaded shaft, wherein the threaded shaft is extendable through the attachment fastener slot and the first head is positionable beyond the rail top, wherein the second head comprises a flange and a body, wherein the flange is positionable within the upper section of the third pocket, and wherein the body is positionable at least partially within the lower section of the third pocket.

17. The rail assembly of claim 16, wherein the attachment fastener slot has a third width, and wherein the third width is of a smaller magnitude than the first width.

18. The rail assembly of claim 17, wherein the third width is of a smaller magnitude than the second width.

19. The rail assembly of claim 16, wherein the second width of the lower section of the third pocket is selected to limit rotation of the body of the second head.

20. The rail assembly of claim 16, wherein the first pocket is spaced from the second pocket by a distance greater than the second width.

* * * * *